(12) United States Patent
Boon et al.

(10) Patent No.: US 8,634,670 B2
(45) Date of Patent: *Jan. 21, 2014

(54) METHOD, APPARATUS AND PROGRAM FOR EFFICIENT GENERATION OF PREDICTION SIGNALS

(75) Inventors: Choong Seng Boon, Yokohama (JP); Yoshinori Suzuki, Saitama (JP); Thiow Keng Tan, Singpore (SG)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,928

(22) Filed: Sep. 12, 2012

(65) Prior Publication Data

US 2013/0003854 A1 Jan. 3, 2013

Related U.S. Application Data

(63) Continuation of application No. 12/298,854, filed as application No. PCT/JP2007/058723 on Apr. 23, 2007, now Pat. No. 8,326,063.

(30) Foreign Application Priority Data

Apr. 28, 2006 (JP) .................................. 2006-126480
Oct. 3, 2006 (JP) .................................. 2006-271984

(51) Int. Cl.
*G06K 9/36* (2006.01)
*H04N 7/34* (2006.01)
*G06K 9/46* (2006.01)

(52) U.S. Cl.
USPC ...................................... 382/238; 375/240.16

(58) Field of Classification Search
USPC ......... 382/209, 218–220, 232, 233, 235, 238, 382/243; 375/240.01, 240.08, 240.12, 375/240.16; 358/429; 704/219, 278, 500
See application file for complete search history.

(56) References Cited

U.S. PATENT DOCUMENTS 6,259,739 B1 * 7/2001 Kondo ..................... 375/240.23
6,289,052 B1 * 9/2001 Faryar et al. ............. 375/240.16
(Continued)

FOREIGN PATENT DOCUMENTS

CN 1674680 A 9/2005
EP 0 889 653 A2 1/1999
(Continued)

OTHER PUBLICATIONS

Office Action issued on Jun. 11, 2012 in the corresponding Korean Patent Application No. 10-2010-7015343 (with English translation).

(Continued)

*Primary Examiner* — Amir Alavi
(74) *Attorney, Agent, or Firm* — Oblon, Spivak, McClelland, Maier & Neustadt, L.L.P.

(57) ABSTRACT

A block divider divides an input image into a plurality of regions. A prediction signal generator generates a prediction signal for the pixel signal contained in an object region, which is the object of processing, among the plurality of regions, and generates a prediction signal by using a texture synthesis method for forming a texture signal for the object region. A subtracter determines a residual signal between the pixel signal of the object region and the prediction signal, and a transformer and a quantizer encode the residual signal to generate a compressed signal.

44 Claims, 42 Drawing Sheets

(56) References Cited

U.S. PATENT DOCUMENTS

| | | | |
|---|---|---|---|
| 6,359,929 B1 * | 3/2002 | Boon | 375/240.16 |
| 6,466,697 B1 * | 10/2002 | Boon | 382/233 |
| 6,665,445 B1 * | 12/2003 | Boon | 382/243 |
| 6,735,344 B2 * | 5/2004 | Boon | 382/243 |
| 6,751,357 B2 | 6/2004 | Boon | |
| 6,765,964 B1 | 7/2004 | Conklin | |
| 7,003,035 B2 | 2/2006 | Tourapis et al. | |
| 7,822,119 B2 | 10/2010 | Boon et al. | |
| 8,077,776 B1 | 12/2011 | Lo | |
| 8,326,063 B2 * | 12/2012 | Boon et al. | 382/238 |
| 2004/0184666 A1 | 9/2004 | Sekiguchi et al. | |
| 2008/0152243 A1 | 6/2008 | Min et al. | |
| 2009/0116759 A1 | 5/2009 | Suzuki et al. | |
| 2009/0116760 A1 | 5/2009 | Boon et al. | |
| 2009/0180538 A1 | 7/2009 | Visharam et al. | |
| 2009/0185747 A1 | 7/2009 | Segall et al. | |
| 2009/0190780 A1 | 7/2009 | Nagaraja et al. | |
| 2009/0192790 A1 | 7/2009 | El-Maleh et al. | |

FOREIGN PATENT DOCUMENTS

| | | |
|---|---|---|
| EP | 0 889 653 A3 | 1/1999 |
| EP | 1 455 536 A1 | 9/2004 |
| EP | 1 919 223 A1 | 5/2008 |
| JP | 2005-191706 | 7/2005 |
| KR | 10-2004-0036943 | 5/2004 |
| WO | WO 97/46021 A1 | 12/1997 |
| WO | WO 2005/022919 A1 | 3/2005 |
| WO | WO 2005/022920 A1 | 3/2005 |

OTHER PUBLICATIONS

Chinese Office Action issud Jun. 26, 2012 in Patent Application No. 200780015355.6 (with English translation).
Notice of Preliminary Rejection issued Feb. 15, 2013 in Korean Patent Application No. 10-2012-7031974 (with English translation).
Search Report issued Apr. 6, 2011 in European Patent Application No. 11155017.4-2223.
Office Action issued Aug. 9, 2011 in Canadian Patent Application No. 2,656,123.
Japanese Office Actin issued on Jun. 14, 2011 in corresponding Japanese Application No. P2006-126480 (with an English translation).
Office Action issued Sep. 26, 2011 in Chinese Patent Application No. 200780015355.6 (with English language translation).
Ian Richardson, "Video Encoding H. 264 and MPEG-4", Standards of New Generation, The World of Digital Processing, Technosphera Publishers, 2005, pp. 169-178 (with English translation).
Extended European Search Report issued Apr. 17, 2012, in European Patent Application No. 11188239.5.
Australian Office Action issued Mar. 5, 2012 in patent application No. 2011250781.
Korean Office Action issued Jul. 16, 2013 in Patent Application No. 10-2012-7031974 with English Translation.
Japanese Office Action issued Aug. 6, 2013 in Patent Application No. 2011-177615 with English Translation.
Office Action issued Apr. 9, 2013, in Chinese Patent Application No. 200780015355.6 with English translation.
European Search Report issued Oct. 15, 2013 in European Patent Application No. 12189415.8-1908/2595381, 10 pages.

* cited by examiner

METHOD, APPARATUS AND PROGRAM FOR EFFICIENT GENERATION OF PREDICTION SIGNALS

CROSS-REFERENCE TO RELATED APPLICATIONS

This application is a continuation of and is based upon and claims the benefit of priority under 35 U.S.C. §120 for U.S. Ser. No. 12/298,854, filed Jan. 21, 2009, now Pat. No. 8,326,063 the entire contents of which is incorporated herein by reference which is the national stage of PCT/JP2007/058723 filed Apr. 23, 2007, and claims the benefit of priority under 35 U.S.C. §119 from Japanese Patent Application Nos. 2006-126480, filed Apr. 28, 2006 and 2006-271984, filed Oct. 3, 2006.

TECHNICAL FIELD

The present invention relates to an image predictive encoding apparatus, an image predictive encoding method, an image predictive encoding program, an image predictive decoding apparatus, an image predictive decoding method and an image predictive decoding program, and more particularly, to an image predictive encoding apparatus, an image predictive encoding method, an image predictive encoding program, an image predictive decoding apparatus, an image predictive decoding method and an image predictive decoding program for performing predictive encoding and decoding by using a texture synthesis method.

BACKGROUND ART

Compression and encoding technology is used in order to transmit and store still image data and moving image data with good efficiency. In the case of moving images, the methods MPEG-1 to 4 or ITU (International Telecommunication Union) H.261 to H.264 are widely used.

In encoding methods of this kind, encoding and decoding processes are carried out by dividing the image that is the object of encoding into a plurality of blocks. In predictive encoding within a frame, a prediction signal is generated by using an already reproduced image signal (compressed image data that has been decompressed) which is situated adjacently within the same frame as the object block, and the differential signal obtained by subtracting this prediction signal from the signal of the object block is encoded. In predictive encoding between frames, a prediction signal is generated by referring to an already reproduced image signal which is situated adjacently in a different frame to the object block and performing movement correction, and the differential signal obtained by subtracting this prediction signal from the signal of the object block is encoded.

For example, H.264 intra-frame predictive encoding uses a method where a prediction signal is generated by extrapolating already reproduced pixel values which are situated adjacently to the block which is the object of encoding, in a prescribed direction. FIGS. 18A to 18I are schematic drawings for describing an intra-frame prediction method which is used in ITU H.264. In FIG. 18A, the object block 1802 is the block which is the object of encoding, and the pixel group 1801 consisting of pixels A to M which are situated adjacently to the boundaries of this object block 1802 is the adjacent region, which is an image signal that has already been reproduced in a previous processing step.

In this case, a prediction signal is generated by extrapolating downwards the pixel group 1801 consisting of adjacent pixels which are situated directly above the object block 1802. Furthermore, in FIG. 18B, a prediction signal is generated by extrapolating rightwards the already reproduced pixels (I to L) which are situated to the left of the object block 1804. The actual method of generating the prediction signal is described in Patent Document 1, for example. The differential with respect to the pixel signal of the object block is found for each of the nine respective prediction signals generated by the methods shown in FIGS. 18A to 18I in this way, and the prediction signal having the smallest differential is taken to be the optimal prediction signal. As described above, in this way, it is possible to generate a prediction signal by extrapolating pixels. The contents described above are explained in Patent Document 1.

In normal predictive encoding between frames, a prediction signal is generated by a method which searches for and finds a signal resembling the pixel signal of the block that is the object of encoding, from amongst frames which have already been reproduced. A motion vector which indicates the amount of spatial displacement between the object block and the region constituted by the selected signal is encoded together with the residual signal between the pixel signal of the object block and the prediction signal. The technique of searching for a motion vector for each block in this way is called block matching.

FIG. 4 is a schematic drawing for describing a block matching process. Here, the procedure for generating a prediction signal will be described by taking as an example the object block 402 of the frame 401 which is the object of encoding. The frame 403 has already been reproduced, and the region 404 is a region which is in the same spatial position as the object block 402. In block matching, a search range 405 surrounding the region 404 is established, and the region 406 having the smallest sum of absolute differences between the pixel signal of the search range and the pixel signal of the object block 402 is determined. The signal of this region 406 becomes the prediction signal, and the amount of displacement from the region 404 to the region 406 is determined as the motion vector 407. In H.264, in order to correspond to characteristic local changes in the image, a plurality of prediction types having different block sizes are prepared for encoding the motion vector. The prediction types in H.264 are described in Patent Document 2, for example.

In compression encoding of moving image data, the respective frames can be encoded in any desired sequence. Therefore, there are three different methods in terms of the encoding sequence which can be employed in inter-frame prediction for generating prediction signals by referring to already reproduced frames. The first method is forward prediction which generates a prediction signal by referring to an already reproduced frame which is in the past in the reproduction sequence, the second method is backward prediction which refers to an already reproduced frame which is in the future in the reproduction sequence, and the third method is bidirectional prediction which carries out both forward prediction and backward prediction and finds the average of the two prediction signals. The types of inter-frame prediction are described in Patent Document 3, for example.

Patent Document 1: U.S. Pat. No. 6,765,964
Patent Document 2: U.S. Pat. No. 7,003,035
Patent Document 3: U.S. Pat. No. 6,259,739

DISCLOSURE OF THE INVENTION

Problem to be Solved by the Invention

However, in the prior art, since the prediction signals of the respective pixels are generated by copying reproduced pixel values which include distortion (for example, quantization noise) due to the encoding process, then the prediction signals also include this distortion. The prediction signals which include distortion due to encoding cause a decline in the encoding efficiency, such as an increase in the encoded volume of the residual signal, and degradation of the reproduction image quality, and the like.

The effects of the distortion due to encoding can be suppressed by smoothing the prediction signal, and can also be suppressed by bidirectional prediction which takes the average of the two prediction signals. However, since bidirectional prediction generates two prediction signals on the reproduction side, then it is necessary to encode two motion vectors and therefore if the number of signals which are averaged is increased in order to raise the effect of smoothing the prediction signals, then the number of motion vectors that have to be encoded also increases.

Furthermore, if an intra-frame prediction signal is generated by the method of generating a prediction signal by extrapolation as used in the prior art, there is a problem in that the prediction accuracy declines for the pixels which are distant from the boundaries of the object block. Moreover, the method of extrapolating pixel values in the geometrical directions shown in FIGS. 18A to 18I is problematic in that an image signal having a complicated texture signal (pattern) cannot be predicted efficiently. Moreover, as shown in FIGS. 18A to 18I, the group of adjacent pixels (for example, 1801, 1803, 1805, . . . ) are decoded pixel values and since they contain distortion (for instance, quantization noise) due to encoding, then when a prediction signal is generated on the basis of these values, the prediction signal will also include encoding distortion.

Therefore, in order to resolve the problems described above, it is an object of the present invention to provide an image predictive encoding apparatus, an image predictive encoding method, an image predictive encoding program, an image predictive decoding apparatus, an image predictive decoding method and an image predictive decoding program whereby prediction signals can be generated with good efficiency.

Means for Solving the Problem

In order to achieve the aforementioned object, the image predictive encoding apparatus according to the present invention is characterized in comprising: a region dividing means for dividing an input image into a plurality of regions; a prediction signal generating means for generating a prediction signal for an object pixel signal of an object region which is a processing object, of the plurality of regions divided by the region dividing means; a residual signal generating means for generating a residual signal between the prediction signal generated by the prediction signal generating means and the object pixel signal; and an encoding means for encoding the residual signal generated by the residual signal generating means; wherein the prediction signal generating means comprises: a prediction related information generating means for generating, as prediction related information, a method for generating a signal having a high correlation with the object pixel signal of the object region from an already reproduced signal; and a texture synthesis means for generating a prediction signal for the object region on the basis of the prediction related information generated by the prediction related information generating means; the texture synthesis means generates a template signal of a specified region which is determined on the basis of the prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method; and the encoding means encodes the prediction related information generated by the prediction related information generating means.

Furthermore, the image predictive encoding method according to the present invention is characterized in comprising: a region dividing step in which an image predictive encoding apparatus divides an input image into a plurality of regions; a prediction signal generating step in which the image predictive encoding apparatus generates a prediction signal for an object pixel signal of an object region which is a processing object, of the plurality of regions divided in the region dividing step; a residual signal generating step in which the image predictive encoding apparatus generates a residual signal between the prediction signal generated in the prediction signal generating step and the object pixel signal; and an encoding step in which the image predictive encoding apparatus encodes the residual signal generated in the residual signal generating step; wherein the prediction signal generating step comprises: a prediction related information generating step of generating, as prediction related information, a method for generating a signal having a high correlation with the object pixel signal of the object region from an already reproduced signal; and a texture synthesis step of generating a prediction signal for the object region on the basis of the prediction related information generated in the prediction related information generating step; the texture synthesis step generates a template signal of a specified region which is determined on the basis of the prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method; and the encoding means step the prediction related information generated in the prediction related information generating step.

Furthermore, the image predictive encoding program according to the present invention is characterized in that it causes a computer to implement the functions of: a region dividing means for dividing an input image into a plurality of regions; a prediction signal generating means for generating a prediction signal for an object pixel signal of an object region which is a processing object, of the plurality of regions divided by the region dividing means; a residual signal generating means for generating a residual signal between the prediction signal generated by the prediction signal generating means and the object pixel signal; and an encoding means for encoding the residual signal generated by the residual signal generating means; wherein the prediction signal generating means comprises: a prediction related information generating means for generating, as prediction related information, a method for generating a signal having a high correlation with the object pixel signal of the object region from an already reproduced signal; and a texture synthesis means for generating a prediction signal for the object region on the basis of the prediction related information generated by the prediction related information generating means; the texture synthesis means generates a template signal of a specified region which is determined on the basis of the prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method; and the encoding means encodes the prediction related information generated by the prediction related information generating means.

According to the image predictive encoding apparatus, the image predictive encoding method and the image predictive encoding program of this kind, an input image is divided into a plurality of regions, a prediction signal is generated for an object pixel signal of an object region that is an object of processing among the divided plurality of regions, a residual signal between this prediction signal and the object pixel signal is generated, and this residual signal is encoded. Here, the prediction signal is generated by processing the plurality of texture signals generated on the basis of the prediction related information, by means of a specified texture synthesis method. The generated prediction related information is also encoded, similarly to the residual signal. Since a prediction signal is generated in this way on the basis of a plurality of texture signals, it is possible to reduce the noise contained in the prediction signal. Furthermore, it is also possible to generate the plurality of texture signals efficiently by means of a small amount of prediction related information. Consequently, a low-noise prediction signal can be generated in an efficient manner.

In the image predictive encoding apparatus according to the present invention, desirably, the specified region and the object region have the same shape. By making this regions have the same shape, it is possible to generate a prediction signal more easily.

In the image predictive encoding apparatus according to the present invention, desirably, the texture synthesis means divides the object region into a plurality of small regions, generates a template signal of a specified region determined on the basis of the prediction related information from the already reproduced signal, for each of the small regions obtained by dividing, searches a pre-determined reproduced image to find a plurality of similar regions having a high correlation to the specified region, generates a plurality of texture signals relating to the small regions on the basis of the plurality of similar regions, generates prediction signals for the small regions by processing the plurality of texture signals by using a pre-determined texture synthesis method, and generates a prediction signal for the object region by synthesizing the prediction signals of the respective small regions thus generated.

In this case, a prediction signal for the object region is generated by dividing the object region, generating prediction signals for each of the small regions obtained by this division, and synthesizing the prediction signals of the respective small regions. Therefore, it is possible to further improve the characteristics of the prediction signal of the object region that is ultimately generated. More specifically, it is possible to generate a prediction signal having lower noise.

In the image predictive encoding apparatus according to the present invention, desirably, the template signal is included in the plurality of texture signals.

The template signal is generated on the basis of prediction related information which includes the method for generating a signal having a high correlation to the object pixel signal of the object region. In other words, the template signal is a signal which has the smallest error with respect to the pixel signal of the object region. Therefore, by using texture signals which include this template signal, it is possible to generate a prediction signal having lower noise.

In the image predictive encoding apparatus according to the present invention, desirably, the texture synthesis means generates a prediction signal by applying a weighted averaging process using pre-determined weighting coefficients to the texture signals. In this case, since the texture signals are averaged when generating the prediction signal, then it is possible to generate a prediction signal having a statistically low level of error.

In the image predictive encoding apparatus according to the present invention, desirably, the prediction related information includes a motion vector which indicates the spatial amount of displacement of the object region. By using this motion vector, it is possible more easily to derive a signal having a high correlation with respect to the object pixel signal of the object region, and therefore a prediction signal can be generated more readily.

In the image predictive encoding apparatus according to the present invention, desirably, the texture synthesis means searches a pre-determined plurality of already reproduced images to find a plurality of similar regions having a high correlation with the specified region.

In this case, since a similar region is found from amongst a plurality of already reproduced images, it is possible to extract a similar region having a high correlation to the specified region. As a result of this, it is possible to generate a prediction signal having lower noise.

The image predictive decoding apparatus according to the present invention comprises: a data analysis means for extractings encoded data of prediction related information relating to an object region that is a processing object, and encoded data of a residual signal, from compressed data; a residual signal restoring means for restoring a reproduction residual signal from the encoded data of the residual signal extracted by the data analysis means; a prediction signal generating means for generating a prediction signal relating to an object pixel signal of the object region; and an image restoring means which restores the pixel signal of the object region by adding the prediction signal generated by the prediction signal generating means to the reproduction residual signal restored by the residual signal restoring means; wherein the prediction signal generating means restores prediction related information from the encoded data of the prediction related information extracted by the data analysis means, generates a template signal of a specified region which is determined on the basis of the restored prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method.

Furthermore, the image predictive decoding method according to the present invention is characterized in comprising: a data analysis step in which an image predictive decoding apparatus extracts encoded data of prediction related information relating to an object region that is a processing object, and encoded data of a residual signal, from compressed data; a residual signal restoring step in which the image predictive decoding apparatus restores a reproduction residual signal from the encoded data of the residual signal extracted in the data analysis step; a prediction signal generating step in which the image predictive decoding apparatus generates a prediction signal relating to an object pixel signal of the object region; and an image restoring step in which the image predictive decoding apparatus restores the pixel signal of the object region by adding the prediction signal generated in the prediction signal generating step to the reproduction residual signal restored in the residual signal restoring step; wherein the prediction signal generating step restores prediction related information from the encoded data of the prediction related information extracted by the data analysis step, generates a template signal of a specified region which is determined on the basis of the restored prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method.

Furthermore, the image predictive decoding program according to the present invention is characterized in that it causes a computer to implement the functions of: a data analysis means for extracting encoded data of prediction related information relating to an object region that is a processing object, and encoded data of a residual signal, from compressed data; a residual signal restoring means for restoring a reproduction residual signal from the encoded data of the residual signal extracted by the data analysis means; a prediction signal generating means for generating a prediction signal relating to an object pixel signal of the object region; and an image restoring means for restoring the pixel signal of the object region by adding the prediction signal generated by the prediction signal generating means to the reproduction residual signal restored by the residual signal restoring means; wherein the prediction signal generating means restores prediction related information from the encoded data of the prediction related information extracted by the data analysis means, generates a template signal of a specified region which is determined on the basis of the restored prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method.

According to the image predictive decoding apparatus, the image predictive decoding method and the image predictive decoding program of this kind, a prediction signal is generated from the encoded data of the prediction related information extracted from the compressed data, and furthermore, a reproduction residual signal is restored from the encoded data of the residual signal extracted from this compressed data, and a pixel signal of the object region is restored by adding together the prediction signal and the reproduction prediction signal. Here, the prediction signal is generated by processing the plurality of texture signals generated on the basis of the restored prediction related information, by means of a specified texture synthesis method. Since a prediction signal is generated in this way on the basis of a plurality of texture signals, it is possible to reduce the noise contained in the prediction signal. Furthermore, it is also possible to generate the plurality of texture signals efficiently by means of a small amount of prediction related information. Consequently, a low-noise prediction signal can be generated in an efficient manner.

In the image predictive decoding apparatus according to the present invention, desirably, the specified region and the object region have the same shape. In this case, since the specified region and the object region are set to be similar, then it is possible to generate a prediction signal more readily.

In the image predictive decoding apparatus according to the present invention, desirably, the prediction signal generating means restores prediction related information from encoded data of the prediction related information, divides the object region into a plurality of small regions, generates a template signal of a specified region determined on the basis of the prediction related information from an already reproduced signal, for each of the small regions obtained by dividing, searches a pre-determined reproduced image to find a plurality of similar regions having a high correlation to the specified region, generates a plurality of texture signals relating to the small regions on the basis of the plurality of similar regions, generates prediction signals for the small regions by processing the plurality of texture signals by using a pre-determined texture synthesis method, and generates a prediction signal for the object region by synthesizing the prediction signals of the respective small regions thus generated.

In this case, a prediction signal for the object region is generated by dividing the object region, generating prediction signals for each of the small regions obtained by this division, and synthesizing the prediction signals of the respective small regions. Therefore, it is possible to further improve the characteristics of the prediction signal of the object region that is ultimately generated. More specifically, it is possible to generate a prediction signal having lower noise.

In the image predictive decoding apparatus according to the present invention, desirably, the template signal is included in the plurality of texture signals.

The template signal is generated on the basis of prediction related information which includes the method for generating a signal having a high correlation to the object pixel signal of the object region. In other words, the template signal is a signal which has the smallest error with respect to the pixel signal of the object region. Therefore, by using texture signals which include this template signal, it is possible to generate a prediction signal having lower noise.

In the image predictive decoding apparatus according to the present invention, desirably, the prediction signal generating means generates a prediction signal by applying a weighted averaging process using pre-determined weighting coefficients to the texture signals. In this case, since the texture signals are averaged when generating the prediction signal, then it is possible to generate a prediction signal having a statistically low level of error.

In the image predictive decoding apparatus according to the present invention, desirably, the prediction related information includes a motion vector which indicates the spatial amount of displacement of the object region. By using this motion vector, it is possible more easily to derive a signal having a high correlation with respect to the object pixel signal of the object region, and therefore a prediction signal can be generated more readily.

In the image predictive decoding apparatus according to the present invention, desirably, the prediction signal generating means searches a pre-determined plurality of already reproduced images to find a plurality of similar regions having a high correlation with the specified region.

In this case, since a similar region is found from amongst a plurality of already reproduced images, it is possible to extract a similar region having a high correlation to the specified region. As a result of this, it is possible to generate a prediction signal having lower noise.

Furthermore, the image predictive encoding apparatus according to the present invention is characterized in that it comprises: a region dividing means for dividing an input image into a plurality of regions; a prediction signal generating means for generating a prediction signal for an object pixel signal of an object region which is a processing object, of the plurality of regions divided by the region dividing means; a residual signal generating means for generating a residual signal between the prediction signal generated by the prediction signal generating means and the object pixel signal; and an encoding means for generating compressed data by encoding the residual signal generated by the residual signal generating means; wherein the prediction signal generating means generates a texture signal on the basis of an adjacent region comprising an already reproduced pixel signal adjacent to the object pixel signal, and generates a prediction signal by processing the generated texture signal by using a pre-determined texture synthesis method.

According to this invention, an input image is divided into a plurality of regions, a prediction signal is generated for an object pixel signal of an object region which is the object of processing amongst the plurality of divided regions, a residual signal between the generated prediction signal and the object pixel signal is generated, and compressed data can be generated by encoding the residual signal thus generated. Here, in the present invention, a texture signal is generated on the basis of an adjacent region comprising an already reproduced pixel signal adjacent to the object pixel signal, and a prediction signal can be generated by processing the generated texture signal by using a pre-determined texture synthesis method. By this means, since the prediction signal is generated by using an image texture synthesis method, it is possible to prevent decline in the prediction accuracy in relation to pixels which are situated distantly from the boundaries of the object region, and hence a prediction signal can be generated efficiently even in the case of complex texture signals.

Furthermore, desirably, the prediction signal generating means in the image predictive encoding apparatus according to the present invention generates a plurality of texture signals having a high correlation to an adjacent region on the basis of the adjacent region comprising an already reproduced pixel signal adjacent to the object pixel signal, and generates a prediction signal by processing the plurality of generated texture signals by using a pre-determined synthesis method.

According to this invention, a plurality of texture signals having a high correlation to an adjacent region are generated on the basis of an adjacent region comprising an already reproduced pixel signal adjacent to the object pixel signal, and a prediction signal can be generated by processing the plurality of generated texture signals by using a pre-determined synthesis method. By this means, it is possible to use characteristics which show a high correlation between the object region and an adjacent region adjacent to the object region, and therefore it is possible to prevent decline in prediction accuracy in relation to pixels that are situated distantly from the boundaries of the object region and a prediction signal can be generated efficiently even in the case of complex texture signals.

Furthermore, desirably, the prediction signal generating means of the image predictive encoding apparatus according to the present invention generates a plurality of texture signals each having a high correlation to one of a plurality of adjacent regions on the basis of the plurality of adjacent regions which each comprise an already reproduced pixel signal adjacent to the object pixel signal, and generates a prediction signal by processing the plurality of generated texture signals by using a pre-determined synthesis method.

According to the present invention, a plurality of texture signals each respectively having a high correlation to a one of a plurality of adjacent regions are generated on the basis of the plurality of adjacent regions each comprising an already reproduced pixel signal adjacent to the object pixel signal, and a prediction signal can be generated by processing the plurality of generated texture signals by using a pre-determined synthesis method. By this means, it is possible to use characteristics which show a high correlation between the object region and an adjacent region adjacent to the object region, and therefore it is possible to prevent decline in prediction accuracy in relation to pixels that are situated distantly from the boundaries of the object region and a prediction signal can be generated efficiently even in the case of complex texture signals.

Furthermore, desirably, the prediction signal generating means of the image predictive encoding apparatus according to the present invention also generates an extrapolated texture signal by forming pixels by repeating an already reproduced pixel value which is adjacent to the object pixel signal, and generates a prediction signal by synthesizing the texture signal and the extrapolated texture signal by using a pre-determined synthesis method.

According to the present invention, an extrapolated texture signal is generated by forming pixels by repeating an already reproduced pixel value which is adjacent to an object pixel signal, and a prediction signal can be generated by synthesizing the texture signal and the extrapolated texture signal by using a pre-determined synthesis method. By this means, it is possible to prevent decline in the prediction accuracy in relation to pixels which are situated distantly from the boundaries of the object region, and a prediction signal can be generated efficiently even in the case of complex texture signals.

Furthermore, desirably, the prediction signal generating means of the image predictive encoding apparatus according to the present invention searches a search region which is a pre-determined image that has already been reproduced to find a predicted adjacent region having a high correlation to the adjacent region comprising an already reproduced pixel signal that is adjacent to the object pixel signal, and sets an image region specified on the basis of the predicted adjacent region thus found, as a texture signal.

Furthermore, according to the present invention, a search region which is a pre-determined image that has already been reproduced is searched to find a predicted adjacent region having a high correlation to the adjacent region comprising an already reproduced pixel signal that is adjacent to the object pixel signal, and an image region specified on the basis of the predicted adjacent region thus found can be set as a texture signal. Consequently, by using characteristics which show a high correlation between the object block and an adjacent region which is adjacent to the object block, the region having the smallest error with respect to the adjacent region is determined as a predicted adjacent region from the already reproduced image region, and the group of pixels which correspond to the object region and also lie adjacently to this predicted adjacent region are taken as a texture signal for the object region. By this means, it is possible to generate a prediction signal having the same pattern as the adjacent region, even in the case of complex texture, and furthermore, it is also possible to generate a texture signal of the same pattern even at a distant position from the boundaries of the object region.

Furthermore, desirably, the encoding means of the image predictive encoding apparatus according to the present invention encodes related information indicating the texture synthesis method, and comprises a transmission means for sending an encoded signal which has been encoded by the encoding means as well as the related information which has been encoded.

According to the present invention, it is possible to encode the related information indicating the texture synthesis method and to send the encoded related information as well as the encoded signal. By this means, since the image texture synthesis method can be reported to the receiving side and the receiving side can generate a prediction signal by using the image texture synthesis method thus reported, it is possible to prevent decline in the prediction accuracy in relation to pixels which are situated distantly from the boundaries of the object region, and hence a prediction signal can be generated efficiently even in the case of complex texture signals.

Furthermore, desirably, the prediction signal generating means of the image predictive encoding apparatus according to the present invention generates a prediction signal by synthesizing the plurality of texture signals relating to the object pixel signal by performing a weighted averaging process using pre-determined weighting coefficients.

According to the present invention, a prediction signal can be generated by synthesizing the plurality of texture signals relating to the object pixel signal by performing a weighted averaging process using pre-determined weighting coefficients. By this means, a beneficial effect is obtained in that a prediction signal having low statistical error can be generated, by synthesizing (averaging) the texture signals thus generated.

Moreover, in respect of the issue of uncertainty in cases where there is no large difference in the differential values with respect to the already reproduced image region on the basis of the adjacent region, for example, a beneficial effect is obtained in that a prediction signal having low statistical error can be generated by synthesizing (averaging) the texture signals which have been generated by template matching so as achieve a high correlation. Furthermore, according to the present invention, by applying a weighted averaging process to a plurality of texture signals, a beneficial effect is obtained in suppressing coding distortion contained in the respective textures, and hence a prediction signal having low error can be generated.

Furthermore, desirably, the prediction signal generating means of the image predictive encoding apparatus according to the present invention generates at least one texture signal having a high correlation to an adjacent region on the basis of the adjacent region comprising an already reproduced pixel signal that is adjacent to the object pixel signal, from a first search region which is within the same frame as the object pixel signal, generates at least one texture signal having a high correlation to an adjacent region on the basis of the adjacent region comprising an already reproduced pixel signal that is adjacent to the object pixel signal, from a second search region which is in a different frame to the first search region, and generates a prediction signal by synthesizing the respectively generated texture signals by using a pre-determined texture synthesis method.

According to the present invention, desirably, at least one texture signal having a high correlation to an adjacent region is generated on the basis of an adjacent region comprising an already reproduced pixel signal that is adjacent to the object pixel signal, from a first search region which is within the same frame as the object pixel signal, at least one texture signal having a high correlation to an adjacent region is generated on the basis of an adjacent region comprising an already reproduced pixel signal that is adjacent to the object pixel signal, from a second search region which is in a different frame to the first search region, and a prediction signal can be generated by synthesizing the respectively generated texture signals by using a pre-determined texture synthesis method. By this means, since the prediction signal is generated by using an image texture synthesis method, it is possible to prevent decline in the prediction accuracy in relation to pixels which are situated distantly from the boundaries of the object region, and hence a prediction signal can be generated efficiently even in the case of complex texture signals.

Furthermore, the image predictive encoding apparatus according to the present invention is characterized in that it comprises: a region dividing means for dividing an input image into a plurality of regions; a prediction signal generating means for generating a prediction signal for an object pixel signal of an object region which is a processing object, of the plurality of regions divided by the region dividing means; a residual signal generating means for generating a residual signal between the prediction signal generated by the prediction signal generating means and the object pixel signal; and an encoding means for generating a compressed signal by encoding the residual signal generated by the residual signal generating means; wherein the prediction signal generating means generates an extrapolated texture signal by forming pixels by repeating an already reproduced pixel value which is adjacent to an object pixel signal, and generates a prediction signal by synthesizing the extrapolated texture signal by using a pre-determined synthesis method.

According to this invention, an input image is divided into a plurality of regions, a prediction signal is generated for an object pixel signal of an object region which is the object of processing amongst the plurality of divided regions, a residual signal between the generated prediction signal and the object pixel signal is generated, and a compressed signal can be generated by encoding the residual signal thus generated. Furthermore, an extrapolated texture signal is generated by forming pixels by repeating an already reproduced pixel value which is adjacent to an object pixel signal, and a prediction signal can be generated by synthesizing the extrapolated texture signal by using a pre-determined synthesis method. By this means, it is possible to prevent decline in the prediction accuracy in relation to pixels which are situated distantly from the boundaries of the object region, and a prediction signal can be generated efficiently even in the case of complex texture signals.

Furthermore, the image predictive decoding apparatus according to the present invention is characterized in that it comprises: a residual signal restoring means for restoring a reproduction residual signal by extracting a residual signal relating to an object region that is an object of processing, from compressed data; a prediction signal generating means for generating a prediction signal relating to an object pixel signal of the object region; and an image restoring means for restoring the pixel signal of the object region by adding the prediction signal generated by the prediction signal generating means to the reproduction residual signal restored by the residual signal restoring means; wherein the prediction signal generating means generates a texture signal on the basis of an adjacent region comprising an already reproduced pixel signal adjacent to the object pixel signal, and generates a prediction signal by processing the generated texture signal by using a pre-determined synthesis method.

According to the present invention, a residual signal relating to an object region which is the object of the processing is extracted from the compressed data, a reproduction residual signal is restored, a prediction signal relating to the object pixel signal of the object region is generated, the pixel signal of the object region is restored by adding the generated prediction signal to the reproduction residual signal restored by the residual signal restoring means, and the restored pixel signal can be stored as a reference image. Thereupon, a texture signal is generated on the basis of an adjacent region comprising an already reproduced pixel signal adjacent to the object pixel signal, which has been stored, and is able to generate a prediction signal by processing the generated texture signal by using a pre-determined synthesis method.

Furthermore, desirably, the prediction signal generating means in the image predictive decoding apparatus according to the present invention generates a plurality of texture signals having a high correlation to an adjacent region on the basis of the adjacent region comprising an already reproduced pixel signal adjacent to the object pixel signal, and generates a prediction signal by processing the plurality of generated texture signals by using a pre-determined synthesis method.

According to this invention, a plurality of texture signals having a high correlation to an adjacent region are generated on the basis of an adjacent region comprising an already reproduced pixel signal adjacent to the object pixel signal, and a prediction signal can be generated by processing the plurality of generated texture signals by using a pre-determined synthesis method. By this means, it is possible to use characteristics which show a high correlation between the object region and an adjacent region adjacent to the object region, and therefore it is possible to prevent decline in prediction accuracy in relation to pixels that are situated distantly from the boundaries of the object region and a prediction signal can be generated efficiently even in the case of complex texture signals.

Furthermore, desirably, the prediction signal generating means of the image predictive decoding apparatus according to the present invention generates a plurality of texture signals each having a high correlation to one of a plurality of adjacent regions on the basis of the plurality of adjacent regions which each comprise an already reproduced pixel signal adjacent to the object pixel signal, and generates a prediction signal by processing the plurality of generated texture signals by using a pre-determined synthesis method.

According to the present invention, a plurality of texture signals each respectively having a high correlation to a one of a plurality of adjacent regions are generated on the basis of the plurality of adjacent regions each comprising an already reproduced pixel signal adjacent to the object pixel signal, and a prediction signal can be generated by processing the plurality of generated texture signals by using a pre-determined synthesis method.

By this means, it is possible to use characteristics which show a high correlation between the object region and an adjacent region adjacent to the object region, and therefore it is possible to prevent decline in prediction accuracy in relation to pixels that are situated distantly from the boundaries of the object region and a prediction signal can be generated efficiently even in the case of complex texture signals.

Furthermore, desirably, the prediction signal generating means of the image predictive decoding apparatus according to the present invention also generates an extrapolated texture signal by forming pixels by repeating an already reproduced pixel value which is adjacent to the object pixel signal, and generates a prediction signal by synthesizing the texture signal and the extrapolated texture signal by using a pre-determined synthesis method.

According to the present invention, an extrapolated texture signal is generated by forming pixels by repeating an already reproduced pixel value which is adjacent to an object pixel signal, and a prediction signal can be generated by synthesizing the texture signal and the extrapolated texture signal by using a pre-determined synthesis method. By this means, it is possible to prevent decline in the prediction accuracy in relation to pixels which are situated distantly from the boundaries of the object region, and a prediction signal can be generated efficiently even in the case of complex texture signals.

Furthermore, desirably, the prediction signal generating means of the image predictive decoding apparatus according to the present invention searches a search region which is a pre-determined image that has already been reproduced to find a predicted adjacent region having a high correlation to the adjacent region comprising an already reproduced pixel signal that is adjacent to the object pixel signal, and sets an image region specified on the basis of the predicted adjacent region thus found, as a texture signal.

Furthermore, according to the present invention, a search region which is a pre-determined image that has already been reproduced is searched to find a predicted adjacent region having a high correlation to the adjacent region comprising an already reproduced pixel signal that is adjacent to the object pixel signal, and an image region specified on the basis of the predicted adjacent region thus found can be set as a texture signal. Consequently, by using characteristics which show a high correlation between the object block and an adjacent region which is adjacent to same, the region having the smallest error with respect to the object adjacent region is determined as a predicted adjacent region from the already reproduced image region, and the group of pixels which correspond to the object region and also lie adjacently to this predicted adjacent region are taken as a texture signal for the object region. By this means, it is possible to generate a prediction signal having the same pattern as the object adjacent region, even in the case of complex texture, and furthermore, it is also possible to generate a texture signal of the same pattern even at a distant position from the boundaries of the object region.

Furthermore, desirably, the compressed data in the image predictive decoding apparatus according to the present invention includes related information which indicates the texture synthesis method, and the prediction signal generating means uses this related information to form the texture signal of the object region.

According to this invention, the compressed data includes related information which indicates the texture synthesis method, and a texture signal for the object region can be formed by using this related information. By this means, since the texture synthesis method can be reported to the receiving side and the receiving side can generate a prediction signal by using the image texture synthesis method thus reported, it is possible to prevent decline in the prediction accuracy in relation to pixels which are situated distantly from the boundaries of the object region, and hence a prediction signal can be generated efficiently even in the case of complex texture signals.

Furthermore, desirably, the prediction signal generating means of the image predictive decoding apparatus according to the present invention generates a prediction signal by synthesizing the plurality of texture signals relating to the object pixel signal by performing a weighted averaging process using pre-determined weighting coefficients.

According to the present invention, a prediction signal can be generated by synthesizing the plurality of texture signals relating to the object pixel signal by performing a weighted averaging process using pre-determined weighting coefficients. By this means, a beneficial effect is obtained in that a prediction signal having low statistical error can be generated, by synthesizing (averaging) texture signals generated by template matching, for example, so as to achieve a high correlation.

Moreover, in respect of the issue of uncertainty in cases where there is no large difference in the differential values with respect to the already reproduced image region on the basis of the adjacent region, for example, a beneficial effect is obtained in that a prediction signal having low statistical error can be generated by synthesizing (averaging) the texture signals which have been generated by template matching so as achieve a high correlation. Furthermore, according to the present invention, by applying a weighted averaging process to a plurality of texture signals, a beneficial effect is obtained in suppressing coding distortion contained in the respective textures, and hence a prediction signal having low error can be generated.

Furthermore, desirably, the prediction signal generating means of the image predictive decoding apparatus according to the present invention generates at least one texture signal having a high correlation to an adjacent region on the basis of the adjacent region comprising an already reproduced pixel signal that is adjacent to the object pixel signal, from a first search region which is within the same frame as the object pixel signal, generates at least one texture signal having a high correlation to an adjacent region on the basis of the adjacent region comprising an already reproduced pixel signal that is adjacent to the object pixel signal, from a second search region which is in a different frame to the first search region, and generates a prediction signal by synthesizing the respectively generated texture signals.

According to the present invention, desirably, at least one texture signal having a high correlation to an adjacent region is generated on the basis of an adjacent region comprising an already reproduced pixel signal that is adjacent to the object pixel signal, from a first search region which is within the same frame as the object pixel signal, at least one texture signal having a high correlation to an adjacent region is generated on the basis of an adjacent region comprising an already reproduced pixel signal that is adjacent to the object pixel signal, from a second search region which is in a different frame to the first search region, and a prediction signal can be generated by synthesizing the respectively generated texture signals by using a pre-determined texture synthesis method. By this means, since the prediction signal is generated by using an image texture synthesis method, it is possible to prevent decline in the prediction accuracy in relation to pixels which are situated distantly from the boundaries of the object region, and hence a prediction signal can be generated efficiently even in the case of complex texture signals.

Furthermore, the image predictive decoding apparatus according to the present invention is characterized in that it comprises: a residual signal restoring means for restoring a reproduction residual signal by extracting a residual signal relating to an object region, from compressed data; a prediction signal generating means for generating a prediction signal relating to an object pixel signal of the object region; and an image restoring means for restoring a pixel signal of the object region by adding the prediction signal to the reproduction residual signal; wherein the prediction signal generating means generates an extrapolated texture signal by forming pixels by repeating an already reproduced pixel value which is adjacent to an object pixel signal, and generates a prediction signal by synthesizing the extrapolated texture signal by using a pre-determined synthesis method.

According to this invention, a residual signal relating to the object region is extracted from the compressed data and restored to a reproduction residual signal, a prediction signal relating to the object pixel signal of the object region is generated, and the pixel signal of the object region can be restored by adding together the prediction signal and the reproduction residual signal. Furthermore, an extrapolated texture signal is generated by forming pixels by repeating an already reproduced pixel value which is adjacent to an object pixel signal, and a prediction signal can be generated by synthesizing the extrapolated texture signal by using a pre-determined synthesis method. By this means, it is possible to prevent decline in the prediction accuracy in relation to pixels which are situated distantly from the boundaries of the object region, and a prediction signal can be generated efficiently even in the case of complex texture signals.

In addition to being described as an invention relating to an image predictive decoding apparatus and an image predictive decoding apparatus as stated above, the present invention can also be described as an invention relating to a moving image encoding method, a moving image encoding program, a moving image decoding method and a moving image decoding program. Such inventions are substantially the same invention, only differing in terms of category, and the like, and they display similar actions and beneficial effects.

The image predictive encoding method according to the present invention comprises: a region dividing step of dividing an input image into a plurality of regions; a prediction signal generating step of generating a prediction signal for an object pixel signal of an object region which is a processing object, of the plurality of regions divided in the region dividing step; a residual signal generating step of generating a residual signal between the prediction signal generated in the prediction signal generating step and the object pixel signal; and an encoding step of generating compressed data by encoding the residual signal generated in the residual signal generating step; wherein the prediction signal generating step generates a texture signal on the basis of an adjacent region comprising an already reproduced pixel signal adjacent to the object pixel signal, and generates a prediction signal by processing the generated texture signal by using a pre-determined texture synthesis method.

Furthermore, the image predictive encoding method according to the present invention is characterized in comprising: a region dividing step of dividing an input image into a plurality of regions; a prediction signal generating step of generating a prediction signal for an object pixel signal of an object region which is a processing object, of the plurality of regions divided in the region dividing step; a residual signal generating step of generating a residual signal between the prediction signal generated in the prediction signal generating step and the object pixel signal; and an encoding step of generating a compressed signal by encoding the residual signal generated in the residual signal generating step; wherein the prediction signal generating step generates an extrapolated texture signal by forming pixels by repeating an already reproduced pixel value which is adjacent to an object pixel signal, and generates a prediction signal by synthesizing the extrapolated texture signal by using a pre-determined synthesis method.

Furthermore, the image predictive decoding method according to the present invention is characterized in comprising: a residual signal restoring step of restoring a reproduction residual signal by extracting a residual signal relating to an object region that is an object of processing, from compressed data; a prediction signal generating step of generating a prediction signal relating to an object pixel signal of the object region; and an image restoring step of restoring the pixel signal of the object region by adding the prediction signal generated in the prediction signal generating step to the reproduction residual signal restored in the residual signal restoring step; wherein the prediction signal generating step generates a texture signal on the basis of an adjacent region comprising an already reproduced pixel signal adjacent to the object pixel signal, and generates a prediction signal by processing the generated texture signal by using a pre-determined synthesis method.

Furthermore, the image predictive decoding method according to the present invention is characterized in comprising: a residual signal restoring step of restoring a reproduction residual signal by extracting a residual signal relating to an object region, from compressed data; a prediction signal generating step of generating a prediction signal relating to an object pixel signal of the object region; and an image restoring step of restoring a pixel signal of the object region by adding the prediction signal to the reproduction residual signal; wherein the prediction signal generating step generates an extrapolated texture signal by forming pixels by repeating an already reproduced pixel value which is adjacent to an object pixel signal, and generates a prediction signal by synthesizing the extrapolated texture signal by using a pre-determined synthesis method.

Furthermore, the image predictive encoding program according to the present invention is characterized in comprising: a region dividing module for dividing an input image into a plurality of regions; a prediction signal generating module for generating a prediction signal for an object pixel signal of an object region which is a processing object, of the plurality of regions divided by the region dividing module; a residual signal generating module for generating a residual signal between the prediction signal generated by the prediction signal generating module and the object pixel signal; and an encoding module for generating compressed data by encoding the residual signal generated by the residual signal generating module; wherein the prediction signal generating module generates a texture signal on the basis of an adjacent region comprising an already reproduced pixel signal adjacent to the object pixel signal, and generates a prediction signal by processing the generated texture signal by using a pre-determined texture synthesis method.

Furthermore, the image predictive encoding program according to the present invention is characterized in comprising: a region dividing module for dividing an input image into a plurality of regions; a prediction signal generating module for generating a prediction signal for an object pixel signal of an object region which is a processing object, of the plurality of regions divided by the region dividing module; a residual signal generating module for generating a residual signal between the prediction signal generated by the prediction signal generating module and the object pixel signal; and an encoding module for generating a compressed signal by encoding the residual signal generated by the residual signal generating module; wherein the prediction signal generating module generates an extrapolated texture signal by forming pixels by repeating an already reproduced pixel value which is adjacent to an object pixel signal, and generates a prediction signal by synthesizing the extrapolated texture signal by using a pre-determined synthesis method.

Furthermore, the image predictive decoding program according to the present invention is characterized in comprising: a residual signal restoring module for restoring a reproduction residual signal by extracting a residual signal relating to an object region that is an object of processing, from compressed data; a prediction signal generating module for generating a prediction signal relating to an object pixel signal of the object region; and an image restoring module for restoring the pixel signal of the object region by adding the prediction signal generated by the prediction signal generating module to the reproduction residual signal restored by the residual signal restoring module; wherein the prediction signal generating module generates a texture signal on the basis of an adjacent region comprising an already reproduced pixel signal adjacent to the object pixel signal, and generates a prediction signal by processing the generated texture signal by using a pre-determined synthesis method.

Furthermore, the image predictive decoding method according to the present invention is characterized in comprising: a residual signal restoring module for restoring a reproduction residual signal by extracting a residual signal relating to an object region, from compressed data; a prediction signal generating module for generating a prediction signal relating to an object pixel signal of the object region; and an image restoring module for restoring a pixel signal of the object region by adding the prediction signal to the reproduction residual signal; wherein the prediction signal generating module generates an extrapolated texture signal by forming pixels by repeating an already reproduced pixel value which is adjacent to an object pixel signal, and generates a prediction signal by synthesizing the extrapolated texture signal by using a pre-determined synthesis method.

Effects of the Invention

According to the image predictive encoding apparatus, the image predictive encoding method, the image predictive encoding program, the image predictive decoding apparatus, the image predictive decoding method and the image predictive decoding program of the present invention, it is possible to generate a plurality of texture signals on the basis of a small amount of prediction related information, such as one motion vector, and therefore it is possible efficiently to generate a prediction signal which includes a smoothing process of the texture signals.

Furthermore, according to the present invention, since a prediction signal is generated by using an image texture synthesis method, it is possible to prevent decline in the prediction accuracy in relation to pixels which are situated distantly from the boundaries of the object region, and hence a prediction signal can be generated efficiently even in the case of complex texture signals.

BRIEF DESCRIPTION OF THE DRAWINGS

FIG. 4A shows a reference image and FIG. 4B shows a frame that is the object of encoding;

FIG. 6A shows a reference image and FIG. 6B shows a frame that is the object of encoding;

FIG. 7A shows a reference image and FIG. 7B shows a frame that is the object of encoding;

FIG. 8A shows a reference image and FIG. 8B shows a frame that is the object of encoding;

FIG. 9A shows a reference image and FIG. 9B shows a frame that is the object of encoding;

FIG. 10A shows a reference image and FIG. 10B shows a frame that is the object of encoding;

FIG. 11A shows a reference image and FIG. 11B shows a frame that is the object of encoding;

FIG. 12A shows a reference image and FIG. 12B shows a frame that is the object of encoding;

FIG. 13A shows a reference image and FIG. 13B shows a frame that is the object of encoding;

Figure 1:
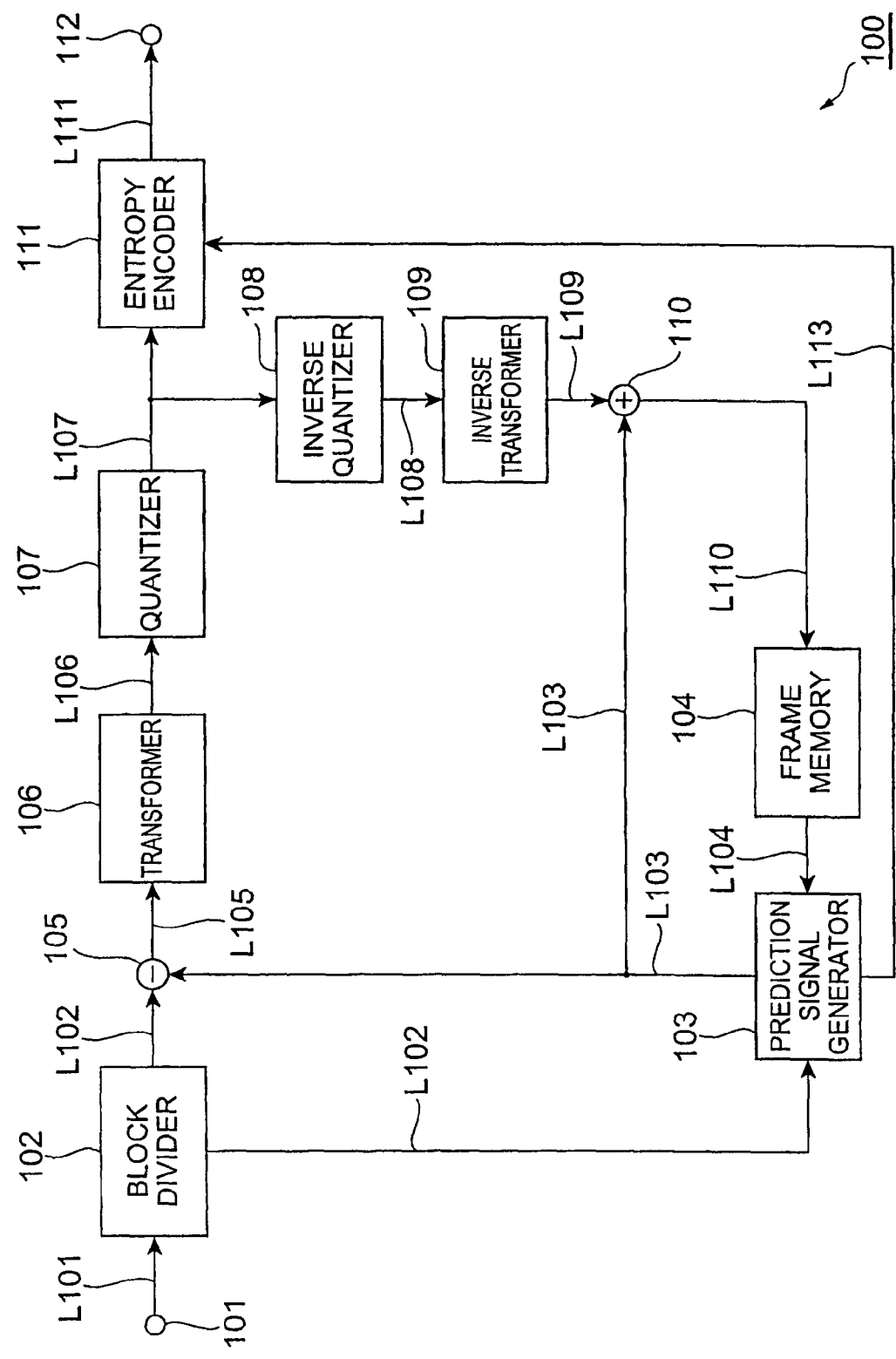
FIG. 1 is a block diagram showing an image predictive encoding apparatus relating to a first embodiment of the present invention.

EXPLANATION OF REFERENCE NUMERALS 100 image predictive encoding apparatus, 101 input terminal, 102 block divider, 103 prediction signal generator, 104 frame memory, 105 subtracter, 106 transformer, 107 quantizer, 108 inverse quantizer, 109 inverse transformer, 110 accumulator, 111 entropy encoder, 112 output terminal, 201 prediction related information generator, 202 texture synthesizer, 301 template signal generator, 302 texture generator, 303 synthesizer, 1900 image predictive decoding apparatus, 1901 input terminal, 1902 data analyzer, 1903 inverse quantizer, 1904 inverse transformer, 1905 accumulator, 1906 output terminal, 1907 frame memory, 1908 texture synthesizer, 2001 template signal generator, 2002 texture generator, 2003 synthesizer, 100X image predictive encoding apparatus, 101X input terminal, 102X block divider, 103X prediction signal generator, 104X frame memory, 105X subtracter, 106X transformer, 107X quantizer, 108X inverse quantizer, 109X inverse transformer, 110X accumulator, 111X entropy encoder, 112X output terminal, 201X texture synthesizer, 202X texture signal determination device, 301X synthesizer, 302X accumulator, 307X texture generator, 308X texture generator, 309X first extrapolator, 310X Nth extrapolator, 900X image predictive decoding apparatus, 901X input terminal, 902X data analyzer, 903X inverse quantizer, 904X inverse transformer, 905X accumulator, 906X output terminal, 907X frame memory, 908X texture synthesizer, 1001X synthesizer, 1007X texture generator, 1008X texture generator, 1009X first extrapolator, 1010X Nth extrapolator.

BEST MODE FOR CARRYING OUT THE INVENTION

Below, embodiments of the present embodiment are described in detail with reference to the accompanying drawings. In the description of the drawings, elements which are the same or equivalent are labeled with the same reference numerals, and duplicated description thereof is omitted.

First Embodiment

FIG. 1 is a block diagram showing the image predictive decoding apparatus 100 relating to the present embodiment. This image predictive encoding apparatus 100 comprises: an input terminal 101, a block divider 102, a prediction signal generator 103, a frame memory 104, a subtracter 105, a transformer 106, a quantizer 107, an inverse quantizer 108, an inverse transformer 109, an accumulator 110, an entropy encoder 111 and an output terminal 112. The transformer 106 and the quantizer 107 function as an encoding means.

The input terminal 101 is a terminal to which a moving image signal comprising a plurality of images is input.

The block divider 102 divides the image that is the object of the encoding and which is represented by the signal input via the input terminal 101 into a plurality of regions. In the present embodiment, the image is divided into a block consisting of 8□18 pixels, but it is also possible to divide into other block sizes or shapes.

The prediction signal generator 103 is a unit which generates a prediction signal in respect of an object region (object block) which is the object of the encoding process, outputs the prediction signal to the subtracter 105, and outputs information relating to the prediction method to the entropy encoder 111. The concrete processing of this prediction signal generator 103 is described below.

The subtracter 105 is a unit which generates a residual signal by subtracting the prediction signal generated by the prediction signal generator 103 and input via the line L103, from the object region obtained by dividing in the block divider 102, which is input via the line L102. The subtracter 105 outputs the residual signal obtained by the subtraction process to the transformer 106 via the line L105.

The transformer 106 is a unit which performs a discrete cosine transform of the residual signal obtained by subtraction. Furthermore, the quantizer 107 is a unit which quantizes the transform coefficient produced by the discrete cosine transform in the transformer 106. The entropy encoder 111 encodes the transform coefficient which has been quantized by the quantizer 107, as well as encoding the information relating to the prediction method, and outputs the encoded information via the line L111. The output terminal 112 outputs the information input from the entropy encoder 111 to the exterior.

The inverse quantizer 108 performs inverse quantization of the quantized transform coefficient. The inverse transformer 109 decodes the residual signal by means of an inverse discrete cosine transform. The accumulator 110 adds together the restored residual signal and the prediction signal supplied via the line L103, thereby reproducing the signal for the object block, and stores this signal in the frame memory 104. In the present embodiment, a transformer 106 and an inverse transformer 109 are used, but it is also possible to use another conversion process instead of these transformers. Furthermore, the transformer 106 and the inverse transformer 109 are not essential elements. The compressed pixel signal of the current object region is restored by inverse processing and stored in the frame memory 104 for the purpose of carrying out intra-frame prediction or inter-frame prediction for a subsequent object region.

Next, the prediction signal generator 103 will be described. The prediction signal generator 103 generates a prediction signal for an object region which is the object of an encoding process (hereinafter, called an "object block"). In the present embodiment, two types of prediction methods are used. In other words, the prediction signal generator 103 generates a prediction signal by using at least one of the inter-frame prediction method and the intra-frame prediction method which are described below. Selection information for selecting the inter-frame prediction method and the intra-frame prediction method is encoded by the entropy encoder 111, together with the quantized transform coefficient and prediction related information relating to the generation of the prediction signal, and this information is output from the output terminal 112.

Figure 2:
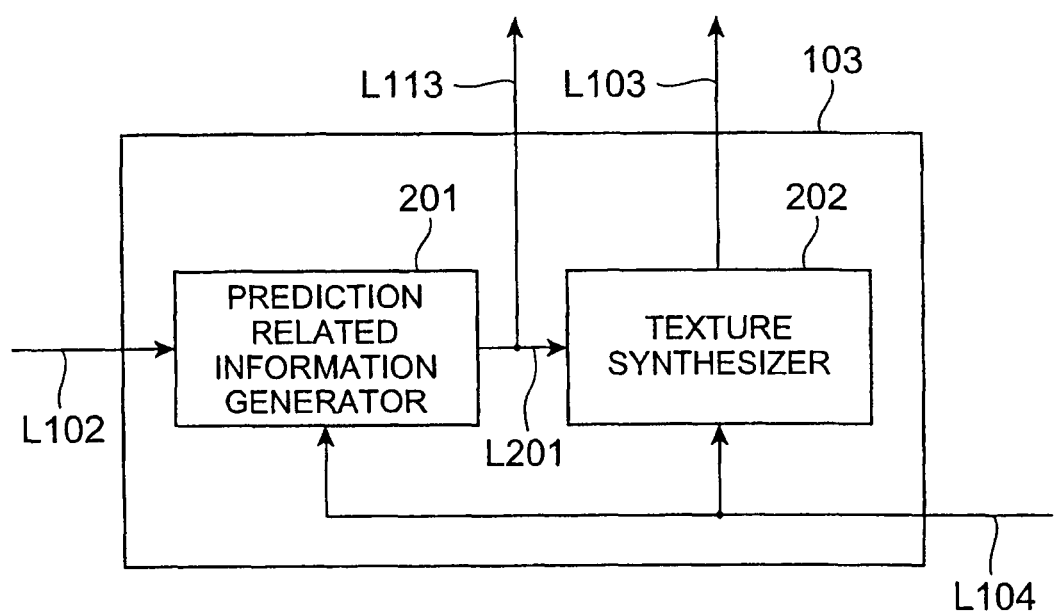
FIG. 2 is a block diagram showing the prediction signal generator shown in FIG. 1.

FIG. 2 is a block diagram of the prediction signal generator 103 shown in FIG. 1. The prediction signal generator 103 comprises a prediction related information generator 201 and a texture synthesizer 202.

The prediction related information generator 201 receives the signal of the object block which is input via the line L102, as well as receiving an image signal which has already been reproduced in a past process (reproduced image signal) which is input from the frame memory 104 via the line L104. The prediction related information generator 201 generates a prediction signal having the smallest error in respect of the object block, from the reproduced image signal, and determines the prediction related information required for generating this prediction signal. In other words, the prediction related information generator 201 generates, as the prediction related information, the method used to generate a signal having a high correlation to the object pixel signal of the object region, from the already reproduced signal. The prediction related information is sent to the texture synthesizer 202 via the line L201, and is also sent to the entropy encoder 111 via the line L113.

Here, the processing of generating prediction related information will be described. When using an inter-frame prediction method, the prediction related information generator 201 uses the reproduced image signal of a different frame or field to the object block as a reference image and determines the motion vector by a block matching process. The determined motion vector is output from the prediction related information generator 201 as prediction related information, to the entropy encoder (via line L113) and the texture synthesizer 202 (via line L201), respectively.

The method of generating prediction related information using an inter-frame prediction method is described in more detail with reference to FIGS. 4A and 4B. FIGS. 4A and 4B are schematic drawings for describing a method of generating prediction related information using an inter-frame prediction method, in other words, a method of determining a motion vector; FIG. 4A shows a reference image and FIG. 4B shows the frame which is the object of encoding. Here, a case is described in which the motion vector relating to the object block 402 is determined in the frame 401 that is the object of encoding.

Firstly, the frame 403 which has already been reproduced in a past process is taken as a reference image and the search region 405 is set on this reference frame. In FIGS. 4A and 4B, the search region 405 is set about the periphery of a region 404 which has the same spatial position as the object block 402, but it may also be set to a spatially different position.

Next, the sum of absolute differences (SAD) between corresponding pixels is found for pixel groups having the same shape as the object block 402 within the search region 405, and the region 406 which produces the smallest SAD value is identified. The assessment value used to find the region 406 may be a value other than the SAD. The amount of displacement from the region 404 to the region 406 is determined as the motion vector 407 of the object block.

The motion vector may be determined in small region units obtained by further dividing the object block. In this case, the selected method of division and the motion vectors of the respective small regions are included in the prediction related information. Furthermore, it is also possible to use a plurality of frames which have already been reproduced, as the reference image. An optimal motion vector is determined for each of the plurality of reference images, and the one motion vector having the smallest SAD value is selected. In this case, the frame number of the selected reference image is also included in the prediction related information (in the case of small respective regions, one frame number is used for the object block).

On the other hand, when an intra-frame prediction method is used, then a method is selected in which the reproduced image signal situated inside the same frame as the object block is input to the prediction related information generator 201, and the smallest prediction signal is assigned to the object block by the prediction method shown in FIGS. 18A to 18I. The selected prediction method is output from the prediction related information generator 201 as prediction related information, to the entropy encoder (via line L113) and the texture synthesizer 202 (via line L201), respectively.

Figure 3:
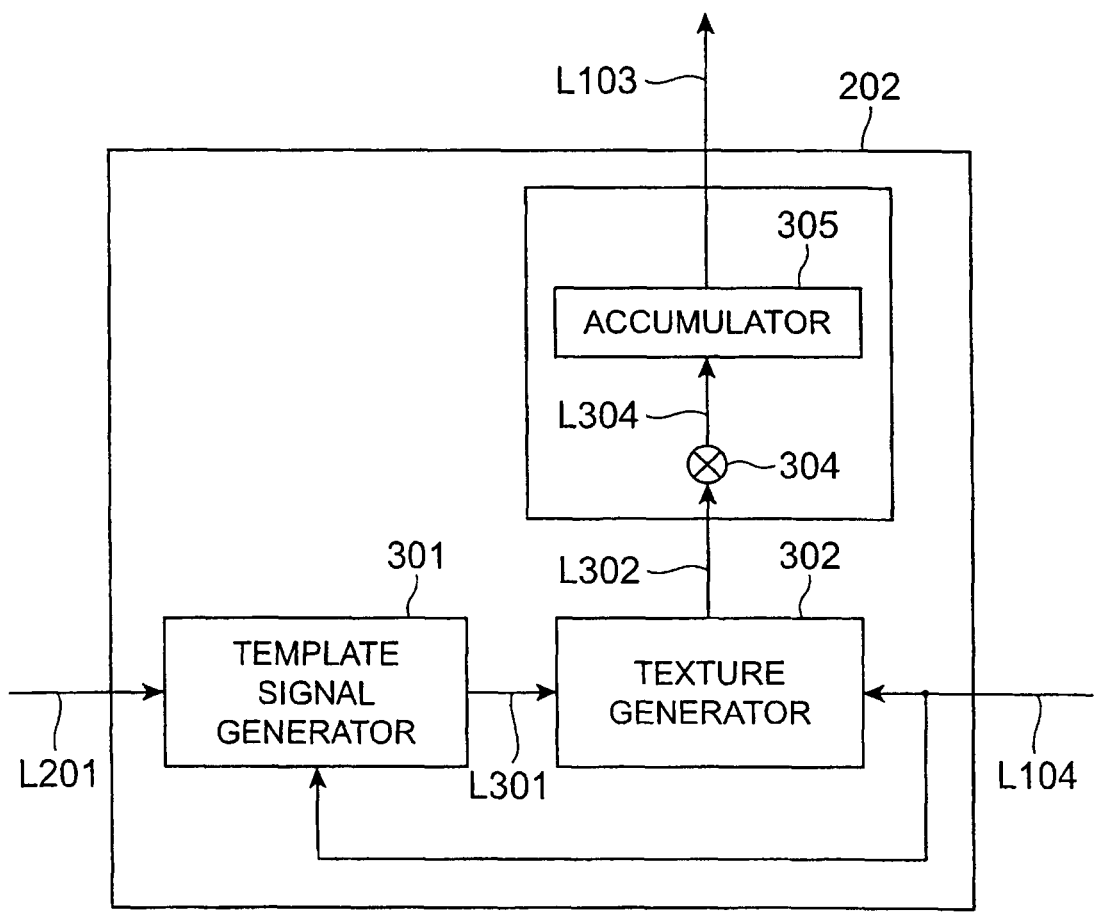
FIG. 3 is a block diagram showing the texture synthesizer shown in FIG. 2.

Next, the process of generating and synthesizing a texture signal according to the present embodiment will be described with reference to FIG. 3. FIG. 3 is a block diagram showing the composition of the texture synthesizer 202 shown in FIG. 2. The texture synthesizer 202 comprises a template signal generator 301, a texture generator 302 and a synthesizer 303. The template signal generator 301 receives prediction related information which is input via line L201 and also receives a reproduced image signal which is input from the frame memory 104 via line L104. The template signal generator 301 generates a template signal from the reproduced image signal on the basis of the prediction related information and outputs same to the texture generator 302 via the line L301.

In the texture synthesizer 202, the texture generator 302 receives an image signal that has already been reproduced in a past process (reproduced image signal), which is input from the frame memory 104 via line L104, and furthermore the template signal generator 301 receives prediction related information which is input via line L201. The texture generator 302 generates as a template signal a signal for a previously determined region (specified region) on the basis of the input prediction related information, by means of a method such as that described below, and generates a plurality of texture signals from the reproduced image signal by means of a template matching process. Moreover, the synthesizer 303 generates a prediction signal relating to the object block by synthesizing the plurality of texture signals which have been generated. The synthesizer 303 outputs the generated prediction signal to the subtracter 105 via L103.

In the present embodiment, the region which contains this template signal can be set to any desired shape. Since the shape is specified by the method as described above, then in the present embodiment, the region including the template signal is called the "specified region". Furthermore, the region which is searched for by the template matching process and is similar to the specified region is called a "similar region". Moreover, the region to which each pixel groups of a plurality of texture signals which is inputted to synthesizer 303 belong, that is the region having the same shape as the target region for prediction, is called the "texture region".

The shape of the specified region and the shape of the similar region are always the same as each other. The shape of the texture region is the same as the region which is the object of prediction. The positional relationship between the similar region and the texture region is pre-determined on the same frame, by an amount of displacement which indicates the relative coordinates positions of the two regions. A brief description of this will be given with reference to FIGS. 11A and 11B. In frame 403, region 761 is the specified region and region 751 is the texture region. In this case, the amount of displacement between the coordinates of the top left-hand corner of the region 761 and the coordinates of the top left-hand corner of the region 751 is designated in advance. An example where the shape of the similar region and the shape of the texture region are different as shown in FIGS. 11A and 11B is described later. Here, a case where the similar region and the texture region have the same shape as shown in FIGS. 6A and 6B will be described. If the shape of the similar region and the shape of the texture region are the same in this way, then the amount of displacement which indicates the relative coordinates positions of the similar region and the texture region is zero. The shape of the region including the template signal is not limited to a block.

The texture generator 302 searches the reproduced image signal and determines the sum of absolute differences (SAD) with respect to the pixels corresponding to the template, for a region which has the same shape as the template. In the present embodiment, since a signal having a high correlation with the pixel signal of the object block is selected as the template signal, then the texture generator 302 is able to find a signal which is close to the pixel signal of object block.

Figure 17:
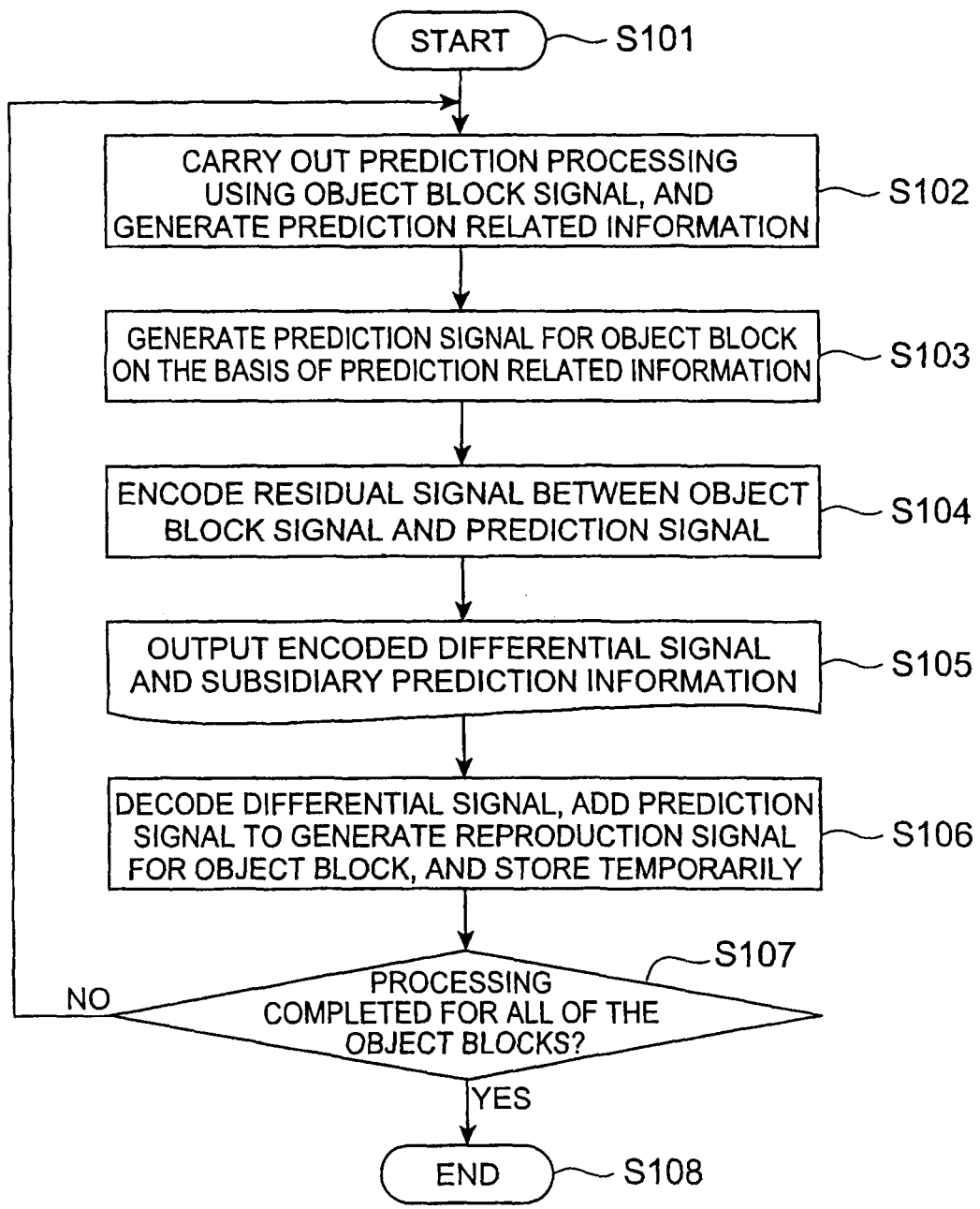
FIG. 17 is a flowchart showing the procedure of an image predictive encoding method performed by the image predictive encoding apparatus shown in FIG. 1.

Here, the process of generating a template signal by the template signal generator 301 is described with reference to the case of the inter-frame prediction method shown in FIGS. 4A and 4B. The case of an intra-frame prediction method is described hereinafter (FIG. 17). FIGS. 4A and 4B show a case where a prediction signal is generated for the object block 402 of the frame 401 which is the object of encoding. The prediction related information in the object block 402 is the motion vector 407, which is input to the template signal generator 301 via the line L201. The template signal generator 301 accesses the reference image 403 which is saved in the frame memory 104 in FIG. 1 via the line L104, and acquires the region 406 corresponding to the object block 402 on the basis of the motion vector 407. The signal of the acquired region 406 (specified region) is output as a template signal by the template signal generator 301.

The specified region 406 which is indicated by the motion vector 407 is the signal which has the smallest differential with respect to the pixel signal of the object block 402. Consequently, if this specified region 406 is taken as the template signal, the texture generator 302 is able to search for and find a plurality of texture signals which are similar to the pixel signal of the object block 402. The template signal of the specified region 406 can be obtained on the basis of the decoded motion vector, and therefore it is possible to find the same texture signals in the decoding apparatus.

In the texture generator 302, a template signal is input from the template signal generator 301 via the line L301, and a reproduced image signal is input from the frame memory 104 via the line L104. The texture generator 302 performs template matching using the settings described below on the basis of the input template signal and the reproduced image signal, thereby generating N texture signals. The N texture signals thus generated are output to the synthesizer 303 via the line L302. The synthesizer 303 synthesizes these N texture signals by means of a pre-determined method which is described below, thereby generating a prediction signal, which is output via the line L103. Below, in the present embodiment, the value of N is 5, but N can be set to any value equal to or greater than 1.

Figure 5:
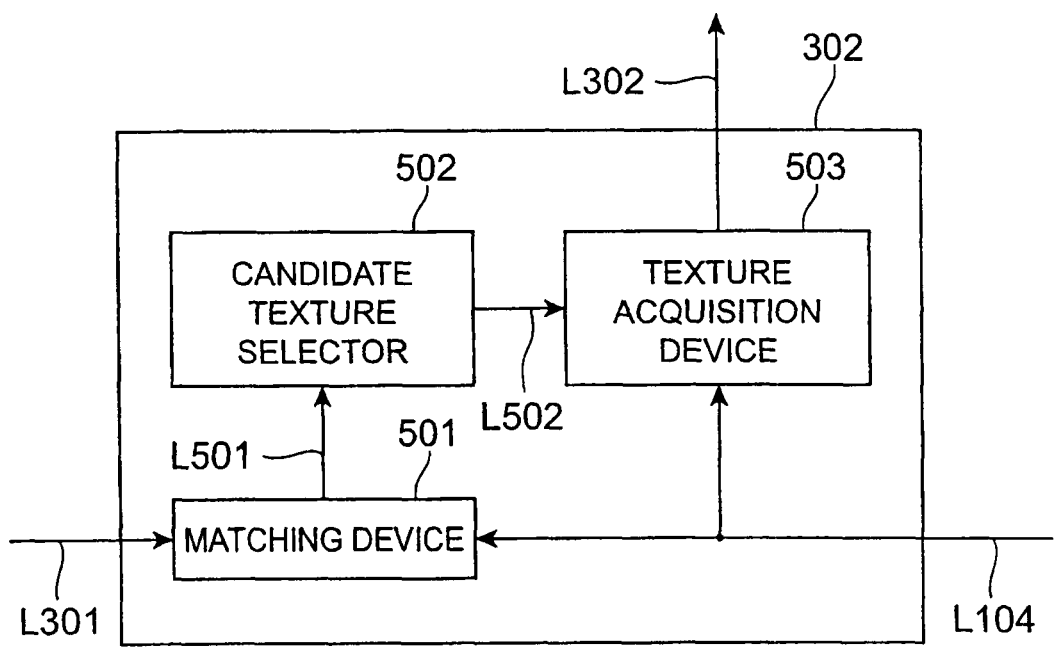
FIG. 5 is a block diagram showing the texture generator shown in FIG. 3.

Here, the method of generating a texture signal in the texture generator 302 will be described in detail with reference to FIG. 5 and FIGS. 6A and 6B. FIG. 5 is a block diagram of the texture generator 302 shown in FIG. 3. FIGS. 6A and 6B are schematic drawings relating to a matching process and a texture generating process according to the present embodiment; FIG. 6A shows a reference image and FIG. 6B shows a frame that is the object of encoding.

The texture generator 302 comprises a matching device 501, a candidate texture selector 502, and a texture acquisition device 503. Firstly, the matching device 501 receives a template signal which is input via the line L301. Thereupon, the matching device 501 accesses a reproduced image signal which is present in the frame memory 104 via the line L104, carries out a matching process by means of a previously determined procedure, and sequentially acquires pixel groups having the same shape as the specified region. The matching device 501 then calculates the sum of the absolute differences (SAD) with respect to each of the corresponding pixels of the template signal, for each of the respective pixel groups thus acquired. The respective SAD values thus calculated are output to the candidate texture selector 502 via line L501, together with coordinates information for accessing the acquired pixel groups.

In the present embodiment, the assessment value used to measure the similarity with respect to the template signal is the SAD value, but the invention is not limited to this and it is also possible use the square error sum mode, or a value derived from the coordinates information and the SAD value, or the like.

Figure 16:
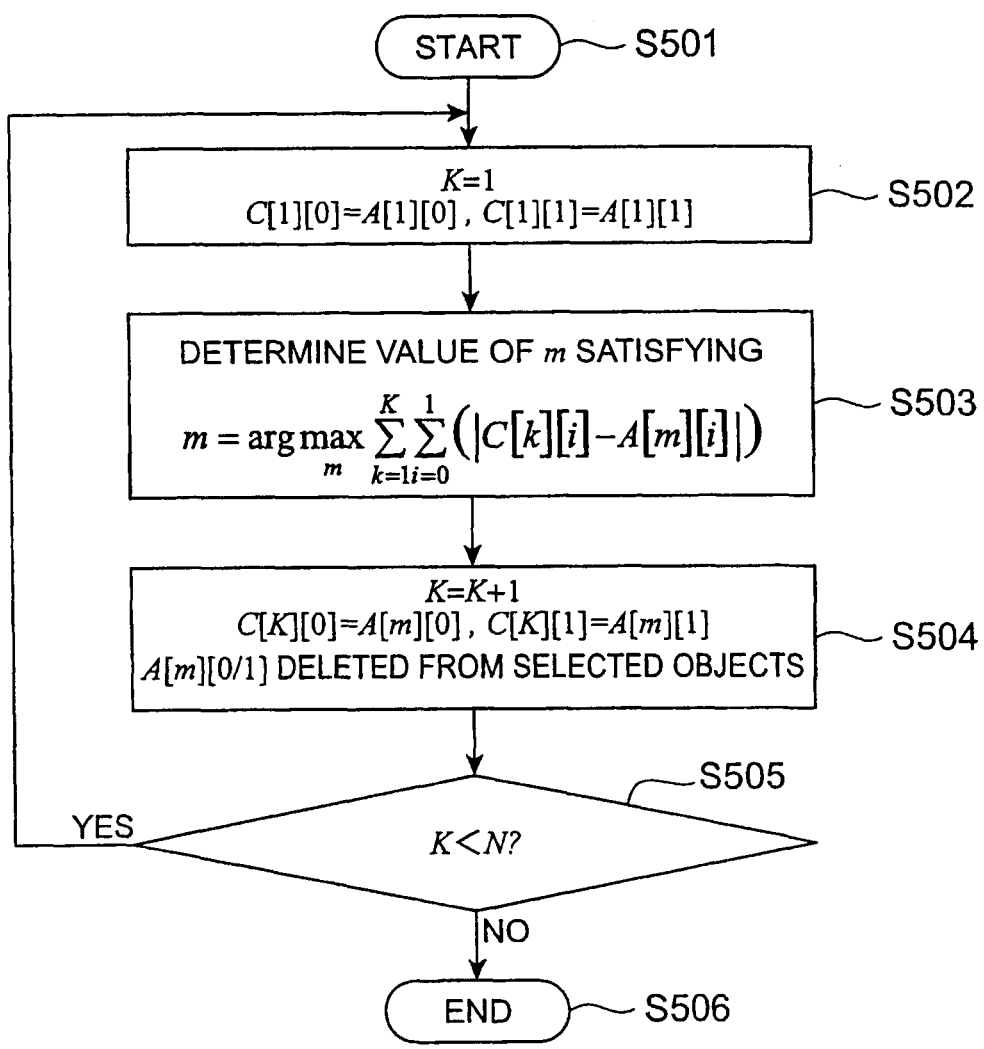
FIG. 16 is a flowchart for describing a modification example of the procedure of a candidate texture signal selection method.

The candidate texture selector 502 compares the plurality of SAD values which are input with a previously determined threshold value and extracts a pixel group having a SAD value that is smaller than the threshold value, together with the relevant coordinates information. Thereupon, the candidate texture selector 502 selects a maximum number of N regions from the extracted pixel groups, in sequence, starting from the region having the smallest SAD value, and outputs the corresponding coordinates information to the texture acquisition device 503 via the line L502. Here, the N extracted regions are similar regions. If the number of SAD values smaller than the threshold value does not reach N, then the candidate texture selector 502 updates the value of N for the object block in question. The input signal to the texture selector 302 is data which has been completely decoded by the decoding apparatus, and therefore the value of N can be updated by a similar method in the decoding apparatus as well. Consequently, there is no need to encode the updated value of N. The method for selecting the coordinates information does not necessarily have to proceed in order from the lowest SAD value. The method of selecting N sets of coordinates information is described hereinafter (FIG. 16).

The texture acquisition device 503 receives the N sets of coordinates information input from the line L502. The texture acquisition device 503 accesses a reproduced image signal present in the frame memory 104 via the line L104, and acquires N regions, in other words, texture region signals (texture signals), having the same shape as the object block, on the basis of the N sets of coordinates information and successively outputs these to the synthesizer 303 via the line L302. In the present embodiment, since the texture region and the similar region coincide with each other, then the amount of displacement which indicates the relative coordinates positions of the similar region and the texture region is zero. Therefore, the texture acquisition device 503 is able to obtain a texture signal directly from the coordinates information of the specified region.

In the example shown in FIGS. 6A and 6B, a plurality of texture signals are generated for the object block 402 of the frame 401 which is the object of encoding. In FIGS. 6A and 6B, the template signal used in the matching process is a signal of a region 406 (specified region) which has the same shape as the object block, and is determined by the template signal generator 301 in accordance with the motion vector 407.

In the matching process in the matching device 501, firstly, a search region relating to the object block 402 is established by means of a previously determined method. In the present embodiment, the whole of the frame 403 which has already been reproduced is taken as the search region. Rather than taking the whole of the frame as a search region, it is also possible to take one portion of the frame as the search region.

The matching device 501 searches the whole of the search region 403 and determines the sum of the absolute differences (SAD) between corresponding pixels, for the plurality of pixel groups (region 601, 602, ... ) having the same shape as the specified region 406. The search method may use a thinning operation, or the like.

Next, the candidate texture selector 502 determines as candidates for the similar region, the five regions which have a SAD value lower than the threshold value (namely, regions 601, 602, 603, 604 and 406). The threshold value used here may be a previously determined value, or it may be designated by means of the texture synthesizer 202 specifying an optimal texture signal, or it may be encoded by the entropy encoder 111 (not illustrated). In the inter-frame prediction method according to the present embodiment, the search region in the template matching includes the specified region 406, and therefore the template signal is necessarily included in the texture signal candidates. This template signal is a signal which has the smallest differential with respect to the pixel signal of the object block, and it is necessary in order to generate a prediction signal which has a small differential with respect to the object block as well as having low noise.

The candidate texture selector 502 determines the coordinates of the top left-hand corner of each of the similar regions 601 to 604 and 406 which have been determined, and outputs these coordinates to the texture acquisition device 503 via the line L501. The coordinates information output here is information for accessing the frame memory, and it does not have to indicate the top left-hand corner of each similar region but may also indicate the top right-hand corner of same, or the like. In other words, the output coordinates information needs to be information that identifies the position.

When coordinates information which has been determined in this way is input to the texture acquisition device 503, the texture acquisition device 503 converts the coordinates information of the N similar regions respectively into coordinates information of texture regions, in accordance with the amount of displacement which indicates the relative coordinates positions of the similar regions and the texture regions. This conversion process may be carried out by the candidate texture selector 502. Thereupon, the texture acquisition device 503 accesses the reference image 403 of the frame memory 104 via line L104 in accordance with the converted coordinates information, and acquires N texture signal candidates. The N texture signals thus obtained are output to the synthesizer 303 via line L302. In the example shown in FIGS. 6A and 6B, the similar regions and the texture regions coincide with each other, and therefore the texture generator 302 is able to omit the processing for converting the coordinates information which was used when implementing this example.

Figure 4:
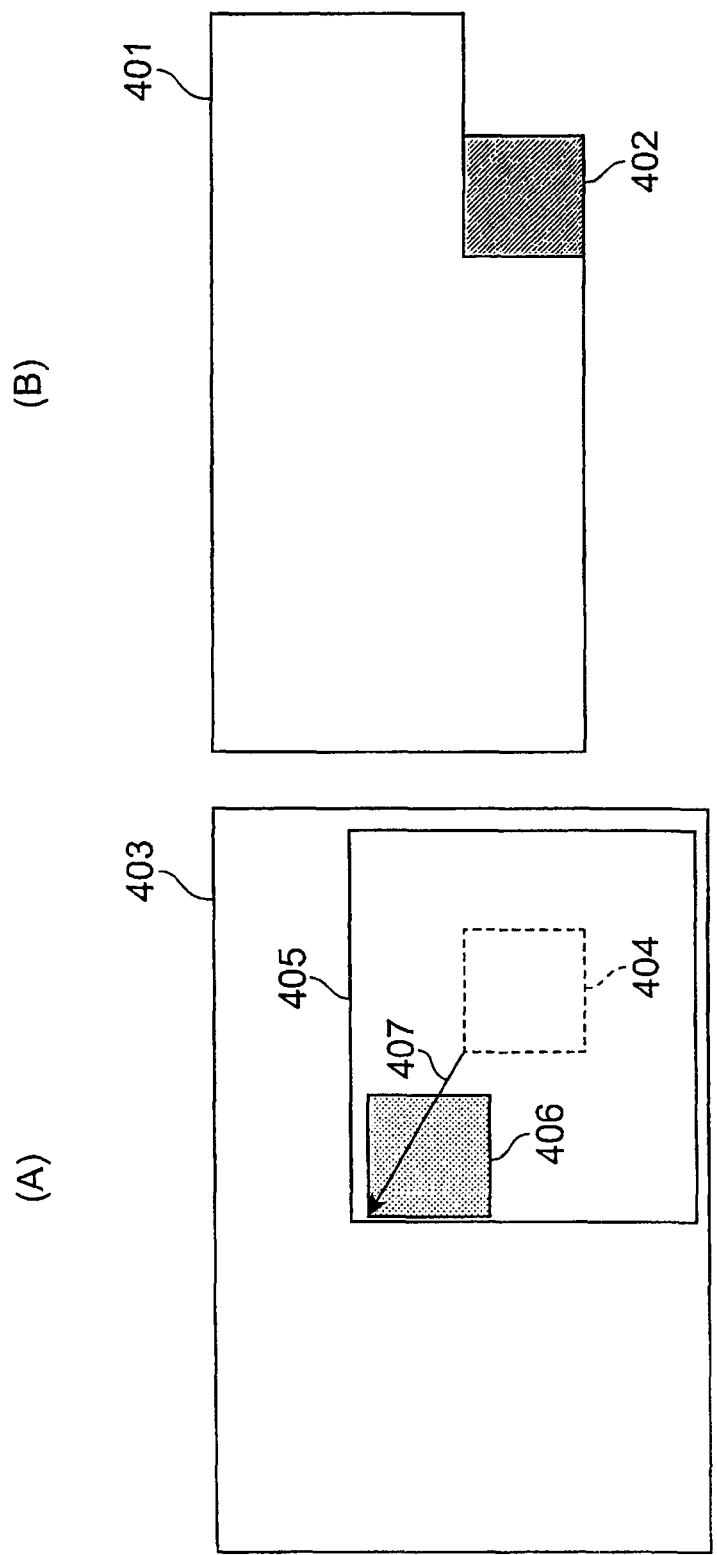
FIGS. 4A and 4B are schematic drawings for illustrating a prediction related information generating process (block matching process), where

In the case of the search region shown in FIGS. 6A and 6B, a partial region such as the search region 405 in FIG. 4 can be set so as to surround the region 406. If the search region does not include the region 406, then it is also possible to set the search object in such a manner that the template signal is included in the texture signal. Furthermore, the search region is not limited to a region of one frame, and partial regions of a plurality of frames may also be set as the search region. In this case, provided that the rules for selecting the frame forming the search object are specified in advance, then it is not necessary to encode the information of the frame. However, if the texture generator 302 is set to select a search region from a plurality of candidates, then it is necessary to encode the frame forming the search object and the information relating to the search region. When encoding is carried out, the selected frame information and information on the search region is output to the entropy encoder 111 from the texture synthesizer 202 via the line L113 (not illustrated). This encoding of the related information is carried out respectively for each object block, similarly to the prediction related information, but if there is little change between blocks, then it may be carried out in frame units or sequence units.

The synthesizer 303 receives the input of N texture signals from the texture generator 302, and generates a prediction signal for the object block by carrying out a weighted averaging process. The synthesizer 303 comprises a weighting device 304 and an accumulator 305. The weighting value used by the weighting device 304 is specified as 1/N, or the like. The weighting device 304 applies the 1/N weighting respectively to the input texture signals, and outputs the results to the accumulator 305 via the line L304. The accumulator 305 sums together the N texture signals which have been weighted, and outputs the summed texture signals via the line L103 as a prediction signal.

The weighting values used in the synthesizer 303 can be designated in advance, but it is also possible to derive weighting values for the respective texture signals in such a manner that an optimal prediction signal is obtained in the synthesizer 303. If the weighting values are designated in advance, then they may be set to any desired values. For example, the synthesizer 303 sets a weighting of ½ for the template signal and a weighting of 1/(2□(N−1)) for the other texture signals. Furthermore, it is also possible for the synthesizer 303 to change the weighting value in accordance with the position within the region. When the weighting value is determined by the synthesizer 303, the signal of the object block is input to the synthesizer 303 via the line L102, the weighting value which produces the smallest prediction signal is determined accordingly, and this value is output to the entropy encoder 111 in FIG. 1 via the line L113 (not illustrated). The entropy encoder 111 encodes the weighting value and then outputs it from the output terminal 112. In this case, the weighting value may be changed in block units, or in frame units or sequence units.

The synthesizer 303 is not limited to the composition shown in FIG. 3. It is also possible to adopt a composition in which, after converting the weighting value relating to the texture signal to an integer, the N weighted texture signals are summed together and the summed signal is divided by the sum of the N weighting values. In this case, the same results can be obtained regardless of the computing device, provided that the rounding method used in the division operation is specified in advance. For example, if the weighting value relating to the template signal is specified as N+1 and the weighting value for the other N texture signals is specified as 1, then the summed signals is further divided by 2□N.

In this way, in the prediction processing according to the present embodiment, a plurality of texture signals are generated on the basis of prediction related information, such as the motion vector. Since these texture signals are acquired from different regions of the frame, then there is low mutual correlation between the noise components (mainly, high-frequency components) that they contain. According to the present embodiment, since an average is taken of a plurality of texture signals having different noise components, then it is possible to generate a prediction signal having a statistically low level of noise, by means of the consequent smoothing effect.

In the description given thus far, the texture regions are taken to have the same shape as the object region (object block). However, provided that the positional relationship between the block that is the object of encoding and the texture region (specified region) is made clear, it is also possible to apply the present invention to cases where the object region and the texture regions have different shapes. Below, several further examples are described. Here, a procedure for generating a texture signal for an object block 402 of a frame 401 will be described, in line with the description given with respect to FIGS. 6A and 6B.

FIGS. 7A and 7B to FIGS. 10A and 10B are schematic drawings which relate to a matching process and a texture generating process in a case where the shape of the texture region is different to the shape of the object region. In this embodiment, it is assumed that the specified region and the similar region have the same shape as the texture region.

In FIGS. 7A and 7B, small region 411 indicates the top left quarter of the object block 402, and the top left region 412 indicates the specified region. The template signal generator 301 extracts the region 412 which is the top left quarter portion of the surface area of the region 406 on the basis of the prediction related information, and outputs the signal of the region 412 as a template signal. In this, the amount of displacement from the top left corner of the region 406 to the top left corner of the specified region 412 (texture region) is recorded in the texture synthesizer 202, together with information relating to the shape of the specified region and the texture region. The texture generator 302 accesses the reference image 403 via the line L104, acquires a plurality of pixel groups having the same shape as the specified region 412, by template matching, and calculates the SAD value between corresponding pixels with respect to the template signal. The texture generator 302 determines the N regions having the smallest SAD values 711, 712, 713, 714 and 412 to be candidates for the similar region (texture region) (in the present embodiment, the value of N is 5).

A prediction signal for the small region 411 is generated by means of the synthesizer 303 performing weighted averaging of the texture signals in these N texture regions. In this case, the position and shape of the prediction regions in the object block can be discovered from the recorded amount of displacement, and the shape of the similar region. Here, no further description is given with respect to the method of setting the search region, the N value and the threshold value, and the like, but similarly to FIG. 6, these values may be encoded.

The process for generating a prediction signal for the other regions of the object block is described now with reference to FIGS. 8A and 8B to FIGS. 10A and 10B. In the case of FIGS. 8A and 8B to FIGS. 10A and 10B also, similarly to FIGS. 7A and 7B, the template signal generator 301 in FIG. 3 extracts a region which is one quarter of the surface area of the region 406 in FIG. 7 on the basis of the prediction related information, but the extraction position is different.

In FIGS. 8A and 8B, the small region 421 indicates the top right quarter portion of the object block 402 and the region 422 indicates the specified region. The template signal generator 301 in FIG. 3 extracts the region 422 which is the top right quarter portion of the surface area of the region 406 in FIG. 6, on the basis of the prediction related information, and outputs this region 422 as a template signal. In this, the amount of displacement from the top left corner of the region 406 to the top left corner of the specified region 422 (texture region) is recorded in the texture synthesizer 202, together with information relating to the shape of the specified region and the texture region. The texture generator 302 accesses the reference image 403 via the line L104, acquires a plurality of pixel groups having the same shape as the specified region 422, by template matching, and calculates the SAD value between corresponding pixels with respect to the template signal. The texture generator 302 determines the N regions having the smallest SAD values 721, 722, 723, 724 and 422 to be candidates for the texture signal (in the present embodiment, the value of N is 5).

A prediction signal for the small region 421 is generated by means of the synthesizer 303 performing weighted averaging of the texture signals in these N texture regions. In this case, the position and shape of the prediction regions in the object block can be discovered from the recorded amount of displacement, and the shape of the similar region.

In FIGS. 9A and 9B, the small region 431 indicates the bottom left quarter portion of the object block 402 and the region 432 indicates the specified region. The template signal generator 301 extracts the region 432 which is the bottom left quarter portion of the surface area of the region 406 in FIG. 6, on the basis of the prediction related information, and outputs this region 432 as a template signal. In this, the amount of displacement from the top left corner of the region 406 to the top left corner of the specified region 432 (texture region) is recorded in the texture synthesizer 202, together with information relating to the shape of the specified region and the texture region. The texture generator 302 accesses the reference image 403 via the line L104, acquires a plurality of pixel groups having the same shape as the specified region 432, by template matching, and calculates the SAD value between corresponding pixels with respect to the template signal. The texture generator 302 determines the N regions having the smallest SAD values 731, 732, 733, 734 and 432 to be candidates for the similar region (texture region) (in the present embodiment, the value of N is 5).

A prediction signal for the small region 431 is generated by means of the synthesizer 303 in FIG. 3 performing weighted averaging of the texture signals in these N texture regions. In this case, the position and shape of the prediction regions in the object block can be discovered from the recorded amount of displacement, and the shape of the similar region.

In FIGS. 10A and 10B, the small region 441 indicates the bottom right quarter portion of the object block 402 and the region 442 indicates the specified region. The template signal generator 301 extracts the region 442 which is the bottom right quarter portion of the surface area of the region 406 in FIG. 6, on the basis of the prediction related information, and outputs this region 442 as a template signal. In this, the amount of displacement from the top left corner of the region 406 to the top left corner of the specified region 442 (texture region) is recorded in the texture synthesizer 202, together with information relating to the shape of the specified region and the texture region. The texture generator 302 accesses the reference image 403 via the line L104, acquires a plurality of pixel groups having the same shape as the specified region 442, by template matching, and calculates the SAD value between corresponding pixels with respect to the template signal. The texture generator 302 determines the N regions having the smallest SAD values 741, 742, 743, 744 and 442 to be candidates for the similar region (texture region) (in the present embodiment, the value of N is 5).

A prediction signal for the small region 441 is generated by means of the synthesizer 303 performing weighted averaging of the texture signals in these N texture regions. In this case, the position and shape of the prediction regions in the object block can be discovered from the recorded amount of displacement, and the shape of the similar region.

In this way, even if the shape of the texture region differs from the shape of the object block, provided that the positional relationship between the object block and the coordinates information input to the texture acquisition device 503 is known in advance, then it is possible to acquire a signal for a region which is the same shape as the object block, on the basis of the coordinates information.

Figure 6:
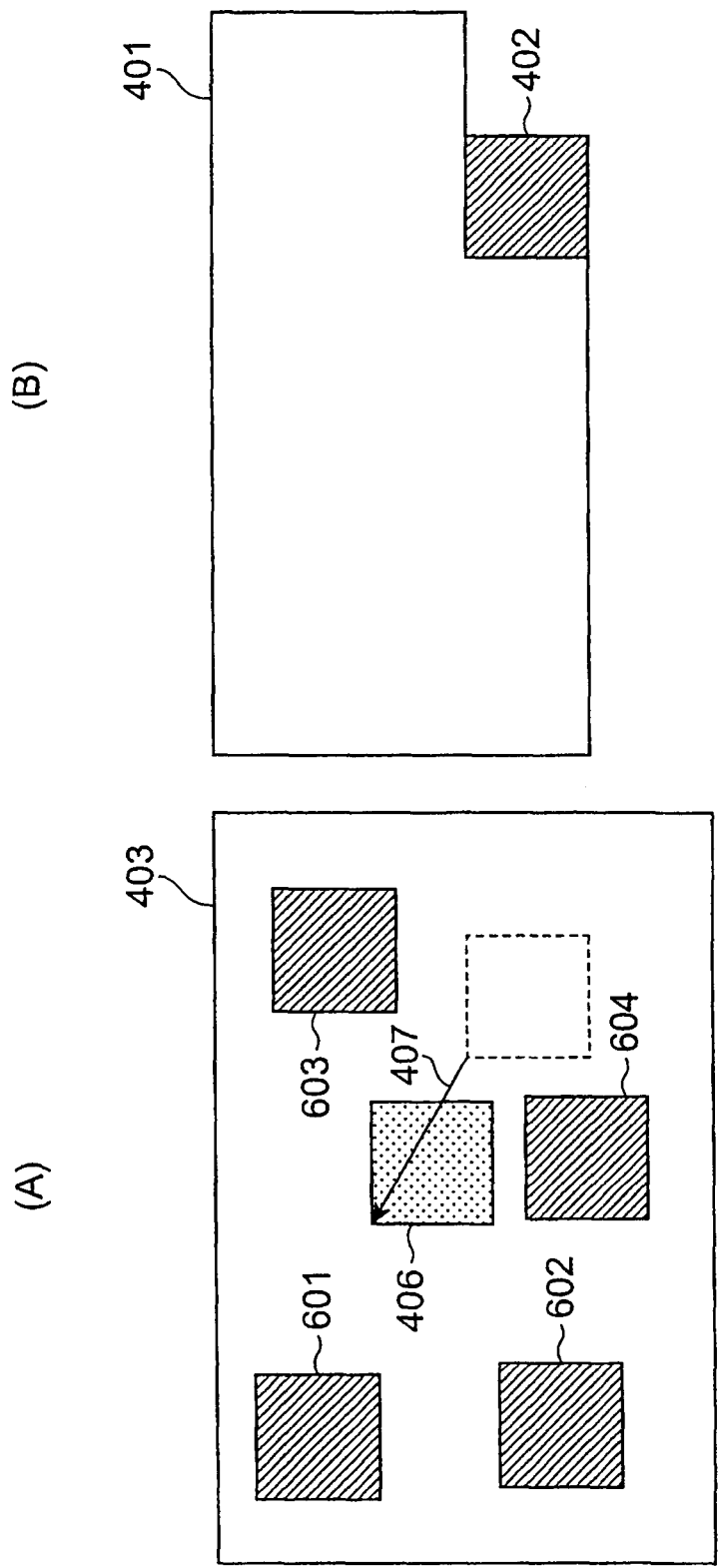
FIGS. 6A and 6B are schematic drawings relating to a matching process and a candidate texture generating process, where
Figure 7:
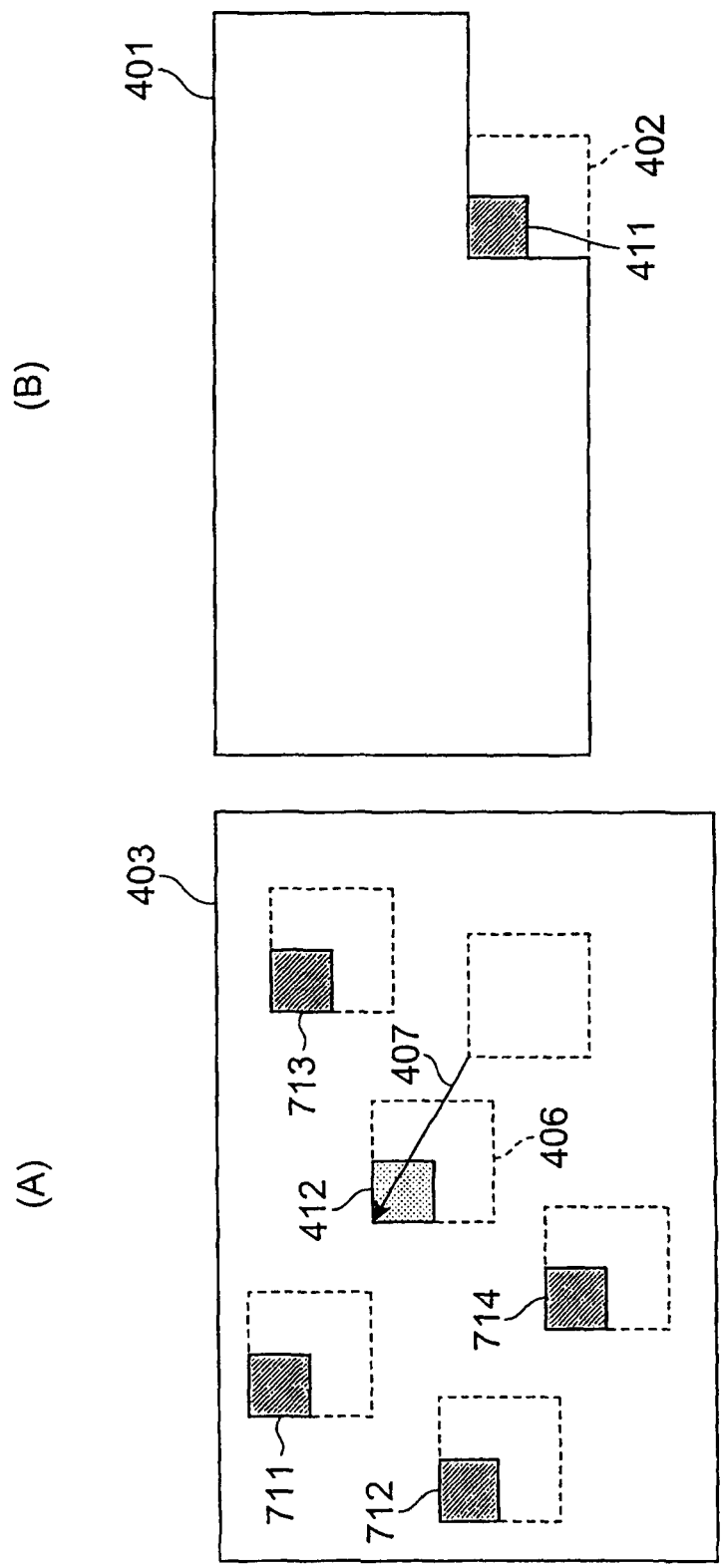
FIGS. 7A and 7B are first schematic drawings relating to a modification example of a matching process and a candidate texture generating process, where
Figure 8:
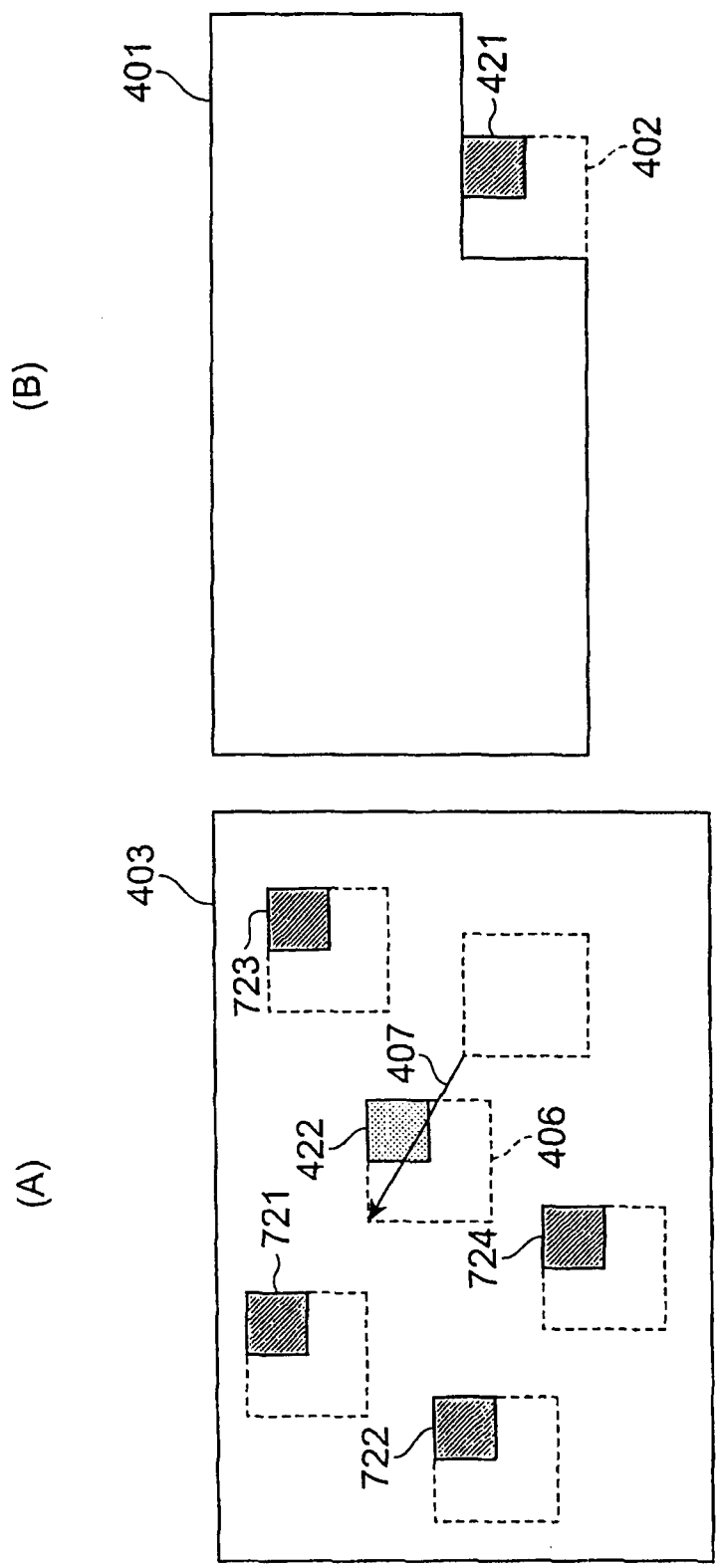
FIGS. 8A and 8B are second schematic drawings relating to a modification example of a matching process and a candidate texture generating process, where
Figure 9:
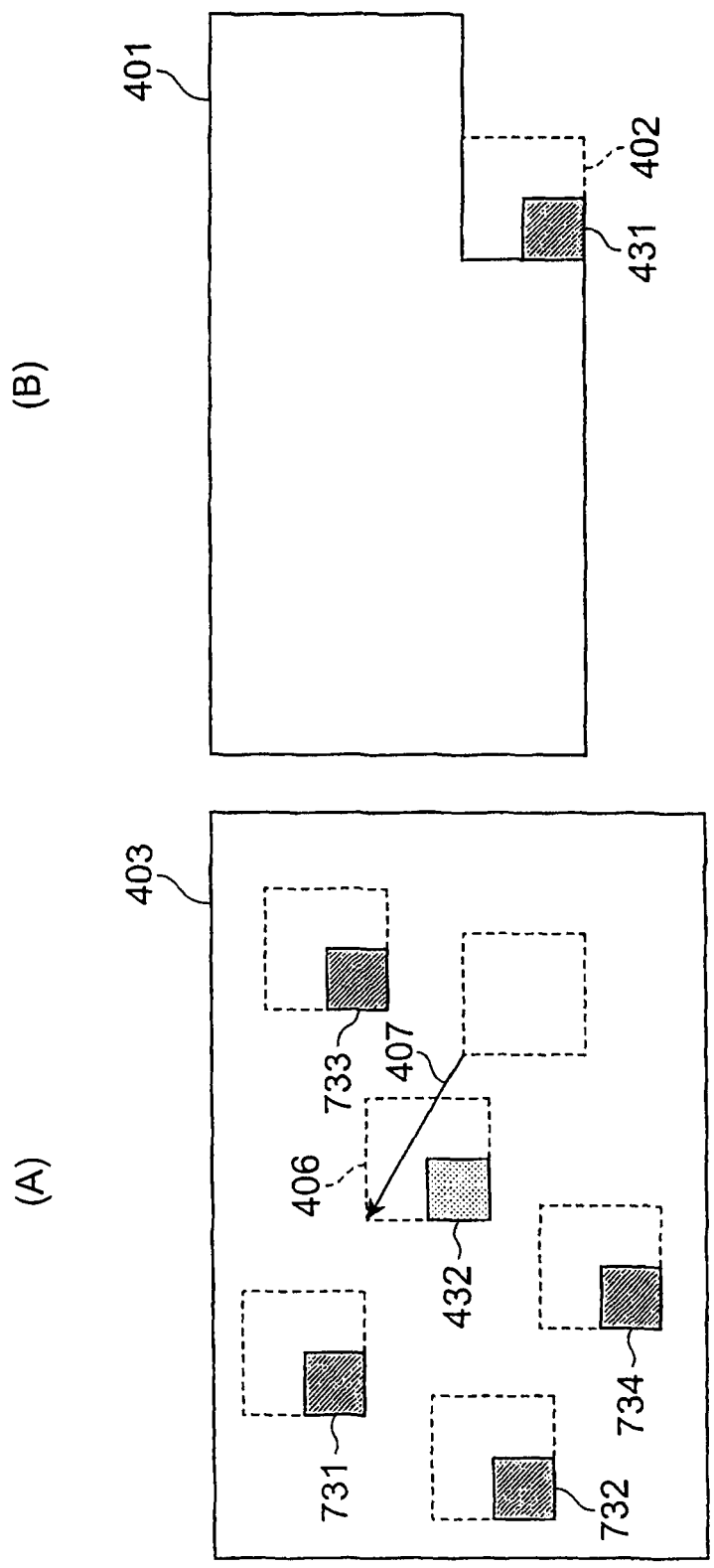
FIGS. 9A and 9B are third schematic drawings relating to a modification example of a matching process and a candidate texture generating process, where
Figure 10:
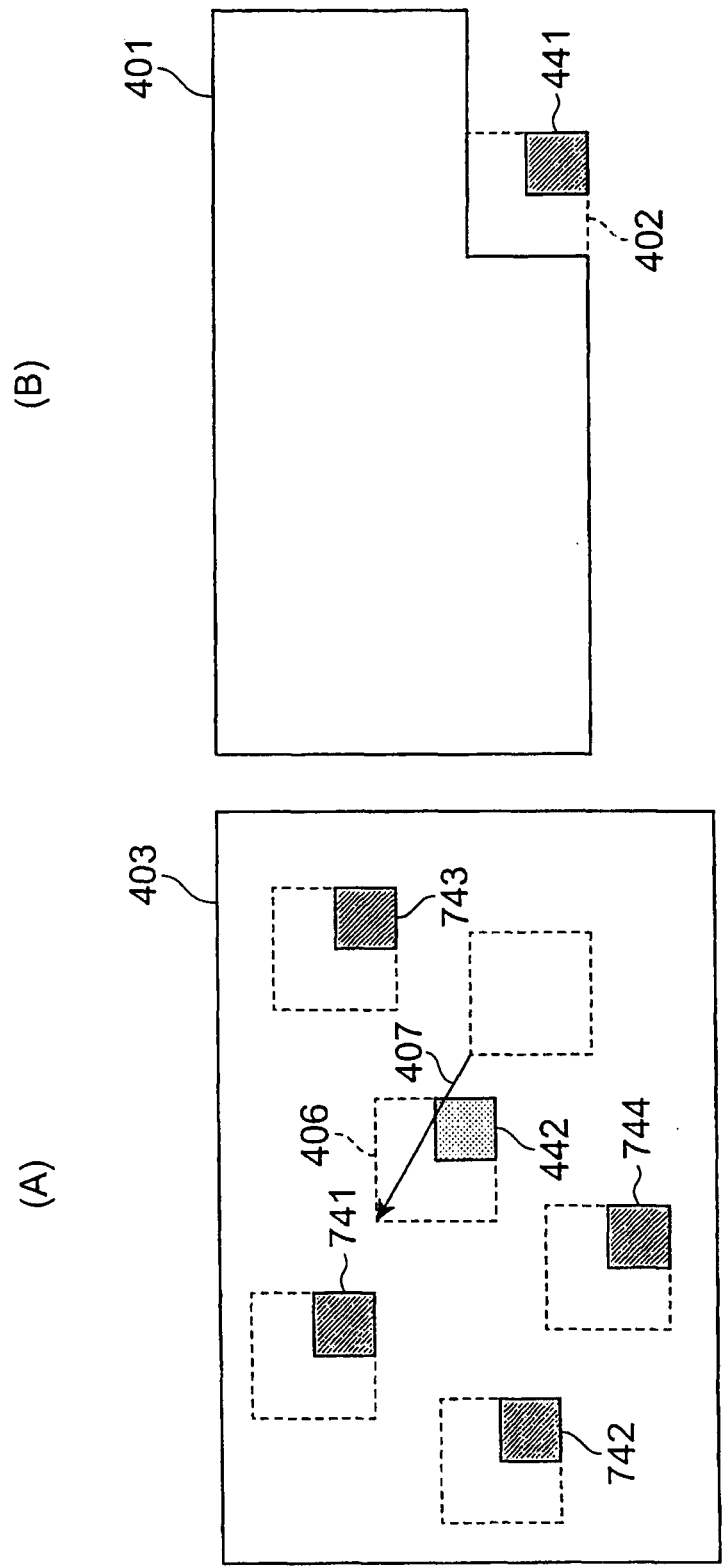
FIGS. 10A and 10B are fourth schematic drawings relating to a modification example of a matching process and a candidate texture generating process, where

The processing shown in FIGS. 7A and 7B to FIGS. 10A and 10B involves dividing the object block shown in FIG. 6 into four blocks and generating a prediction signal for each divided region on the basis of four divided template signals. In this way, in the present invention, a template signal can be generated by dividing up the signal generated on the basis of the prediction related information. Therefore, it is possible to generate a prediction signal having good characteristics in a unit region that is smaller than the object block, without increasing the volume of prediction related information. The number of divisions of the object block and the shape after division are not limited to the modifications described above, and they may be set as desired.

Figure 11:
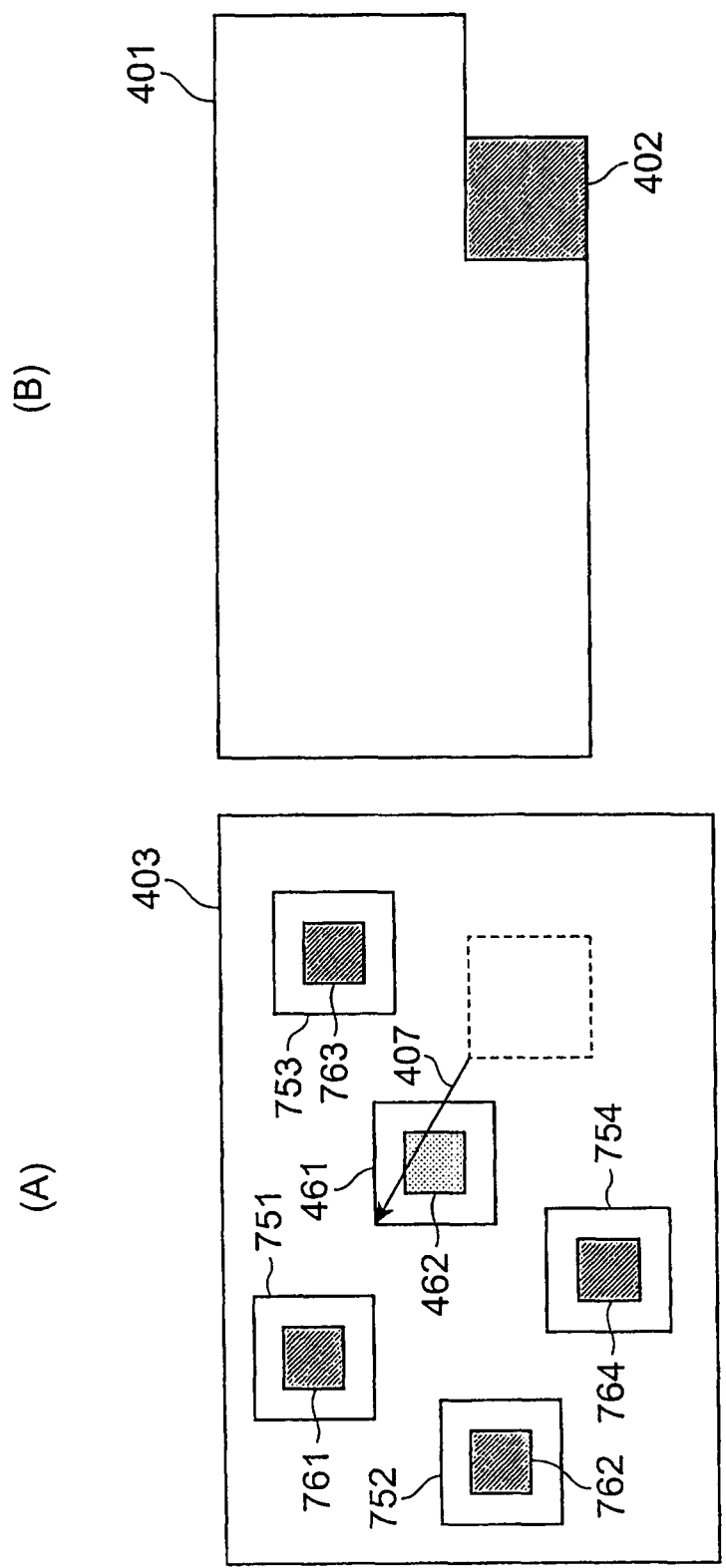
FIGS. 11A and 11B are schematic drawings relating to a matching process and a candidate texture generating process in a first case where the shape of the template signal is different to the shape of the texture signal, where
Figure 12:
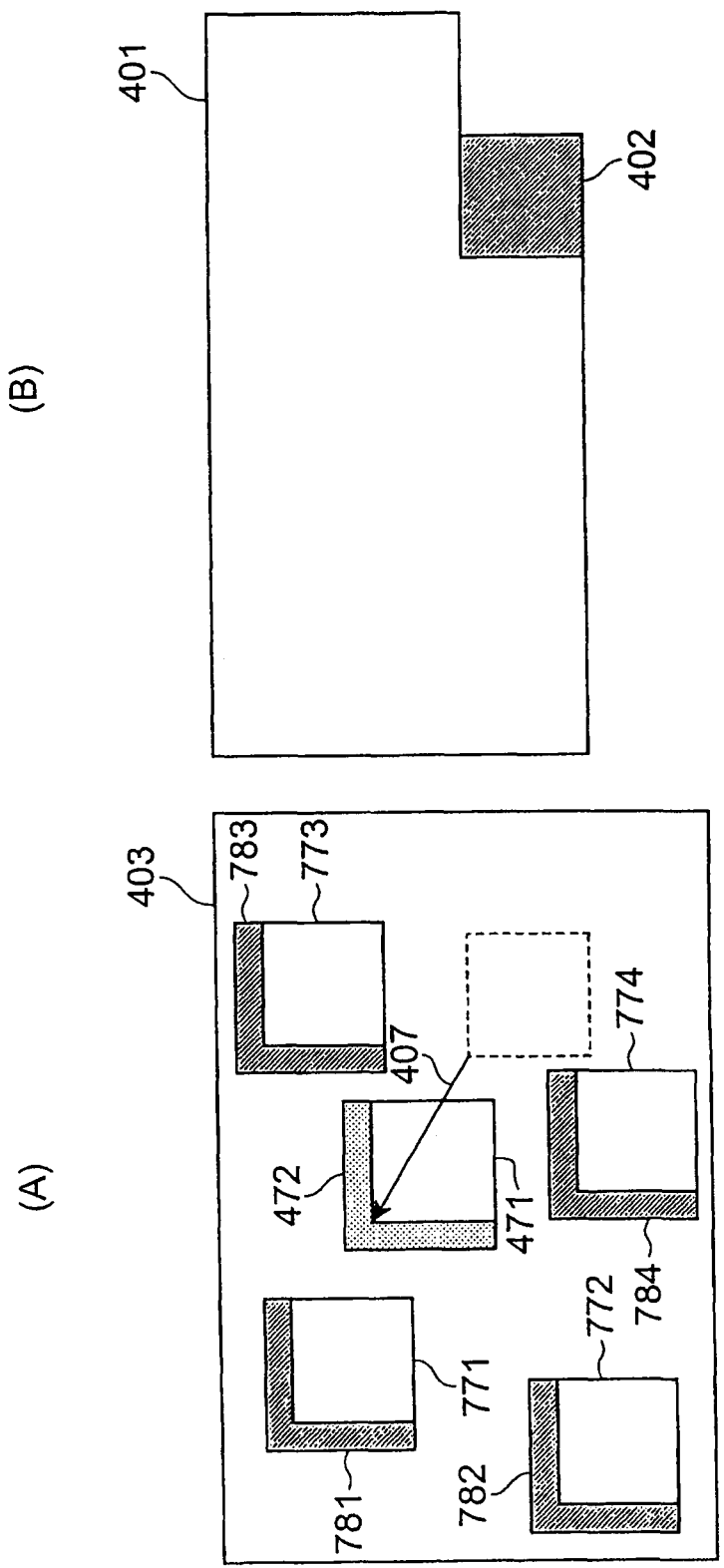
FIGS. 12A and 12B are schematic drawings relating to a matching process and a candidate texture generating process in a second case where the shape of the template signal is different to the shape of the texture signal, where

In the processing shown in FIG. 6 to FIG. 10, the shape of the texture region and the shape of the similar region are matching. However, provided that the amount of displacement which indicates the relative coordinates positions of the similar region and the texture region is made clear, it is also possible for the texture region which is the region that is the object of prediction and the similar region to have mutually different shapes. FIG. 11 and FIG. 12 shows an example in which the texture region and the similar region have different shapes.

FIGS. 11A and 11B are schematic drawings for describing a matching process and texture generating process in the case of an example where the shape of the texture region is different to the shape of the similar region; FIG. 11A shows a reference image and FIG. 11B shows a frame that is the object of encoding. In FIGS. 11A and 11B, the region 462 indicates a specified region and the region 461 indicates a texture region corresponding to the specified region.

In the modification shown in FIGS. 11A and 11B, the shape of the texture region 461 is the same as the shape of the object region 402. The template signal generator 301 extracts a previously specified region 462 from the region 406 shown in FIG. 6, on the basis of the prediction related information, and outputs the template signal belonging to the specified region 462 to the texture generator 302 via the line L301. In this case, the amount of displacement from the top left-hand corner of the texture region 461 to the top right-hand corner of the specified region 462, and information relating to the shape of the specified region (similar region) and the shape of the texture region are recorded in the texture synthesizer 202.

The matching device 501 accesses the reference image 403 via the line L104, acquires a plurality of pixel groups having the same shape as the specified region 462, by template matching, and calculates the SAD value between corresponding pixels with respect to the template signal. The candidate texture selector 502 determines as similar regions the N regions having the smallest SAD values 761, 762, 763, 764 and 462, and outputs the coordinates information for these regions to the texture acquisition device 503 (in the present embodiment, the value of N is 5). The texture acquisition device 503 acquires the signals of the N texture regions 751, 752, 753, 754 and 461 from the reference image 403, on the basis of the input coordinates information and the recorded amount of displacement which was described above. A prediction signal for object block 402 is generated by means of the synthesizer 303 performing weighted averaging of these N texture signals. Here, no further description is given with respect to the method of setting the search region, the N value and the threshold value, and the like, but similarly to FIG. 6, these values may be encoded.

In this way, even if the texture region and the similar region have different shapes, provided that the amount of displacement which indicates the relative coordinates positions of the similar region and the texture region is made clear, it is possible to obtain the signal of the texture region (object region) on the basis of the coordinates information input to the texture acquisition device 503. In other words, a partial signal (the signal of region 462) can be extracted from the region generated on the basis of the prediction related information (region 406), and set as the template signal. By adopting this method, a merit is obtained in that if the signal of the region (region 406) obtained by means of the prediction related information contains a signal which has strong characteristics which are not suitable for a matching process, then the signal of this region can be excluded from the template signal.

In relation to the description referring to FIGS. 11A and 11B, moreover, in the present embodiment, it is possible to switch the weighting coefficients used in the weighting process between pixels which belong to a similar region and pixels which do not belong to a similar region, in the texture regions. For example, the signal of the specified region (region 462) corresponding to the texture region (region 461) is analyzed, and in the case of regions where it is recognized that a smoothing process is not necessary, the weighting value for the template signal of the specified region is set to 1 while the weighting value for the other texture signals is set to 0.

FIGS. 12A and 12B are schematic drawings for describing a matching process and texture generating process in the case of a further example where the shape of the texture region is different to the shape of the similar region; FIG. 12A shows a reference image and FIG. 12B shows a frame that is the object of encoding. In FIGS. 12A and 12B, the region 472 indicates a specified region and the region 471 indicates a texture region corresponding to the specified region. In this way, in the present invention, it is also possible to set the specified region outside the region 471 which is generated on the basis of the prediction related information. Furthermore, the specified region does not necessarily have to lie in contact with the region 471. In this modification example, the shape of the texture region 471 is the same as the shape of the object region 402.

The template signal generator 301 extracts the region 472 from the frame 403 on the basis of the prediction related information, and outputs the specified region 472 as a template signal to the texture generator 302 via the line L301. In this case, the amount of displacement from the top left-hand corner of the texture region 471 to the top right-hand corner of the specified region 472, and information relating to the shape of the specified region (similar region) and the shape of the texture region are recorded in the texture synthesizer 202.

The matching device 501 accesses the reference image 403 via the line L104, acquires a plurality of pixel groups having the same shape as the specified region 472, by template matching, and calculates the SAD value between corresponding pixels with respect to the template signal. The candidate texture selector 502 determines as similar regions the N regions having the smallest SAD values 781, 782, 783, 784 and 472, and outputs the coordinates information for these regions to the texture acquisition device 503 (in the present embodiment, the value of N is 5). The texture acquisition device 503 acquires the signals of the N texture regions 771, 772, 773, 774 and 471 from the reference image 403, on the basis of the input coordinates information and the recorded amount of displacement. A prediction signal for object block 402 is generated by means of the synthesizer 303 performing weighted averaging of these N texture signals. Here, no further description is given with respect to the method of setting the search region, the N value and the threshold value, and the like, but similarly to FIG. 6, these values may be encoded.

Figure 13:
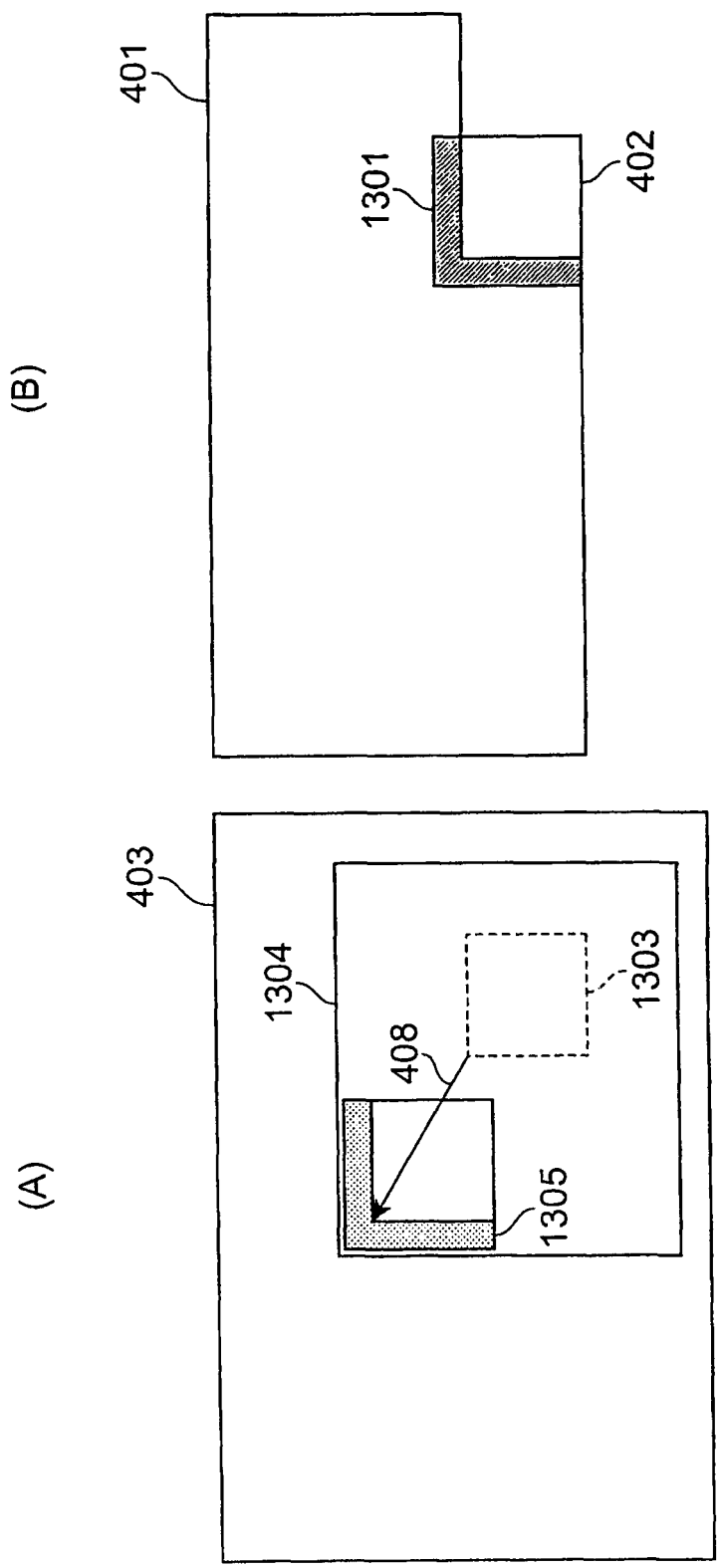
FIGS. 13A and 13B are schematic drawings for illustrating a modification example of a prediction related information generating process (block matching process), where

In this way, in the present invention, it is also possible to set the signal of an adjacently situated region as the template signal with respect to a region which has been generated on the basis of the prediction related information. For example, the method shown in FIGS. 12A and 12B is effective in cases where it is wished to have continuity between the signal of the object block and that of the adjacent blocks. In this case, as shown in FIGS. 13A and 13B, the motion vector 408 which forms the prediction related information can be determined by a matching process using the pixel signal of an adjacent region 1301 of the object block 402. In this case, in the search region 1304 which is set on the already reproduced frame 403, the region 1305 having the smallest SAD value between corresponding pixels is determined from amongst the pixel groups having the same shape as the region 1301. The amount of displacement from the block 1303 which has the same spatial position as the object block 402 to the region 1305 is determined as the motion vector 408. There are no restrictions on the positional relationship between the region 1305 and the texture region corresponding to this region.

In the present invention, it is also possible to combine the processing shown in FIGS. 7A and 7B to FIGS. 10A and 10B, FIGS. 11A and 11B and FIGS. 12A and 12B. Furthermore, according to the present embodiment, the amount of displacement between the similar region and the texture region, and the amount of displacement between the texture region and the object region are determined by taking the top left-hand corners of the respective regions as a reference position, but it also possible to use a previously specified reference point other than the top left-hand corner as the reference position. Moreover, the shape of the specified region and the similar region and the texture region are not restricted to the examples given above, and they may be set to any desired shapes. For example, the shape of the specified region may be made greater than the shape of the texture region.

In relation to the search regions in FIGS. 7A and 7B to FIGS. 12A and 12B, it is possible to set partial regions of a plurality of frames (a plurality of reference images) as the search region, similarly to FIG. 6. In this case also, provided that the rules for selecting the frame forming the search object are specified in advance, then it is not necessary to encode the information of the frame.

It is also possible to set M search regions (where M is equal to or smaller than N) and to previously determine the number of candidate textures which are to be searched in each of these. For example, if M=N and M search regions are set on different frames, then it is possible to search for candidate texture signals respectively from a plurality of reference images. In this case, if it is not possible to find a candidate texture signal which meets the conditions relating to the SAD threshold value, or the like, in a prescribed reference image, then the number N can be deleted and a priority sequence can be specified for reference images which are to be searched to find an alternative candidate texture signal. Furthermore, it is also possible to set a group of search regions contained in a plurality of reference images as one search region. For example, respective search regions can be set in P reference images, and of these P search regions, M search regions may be set for searching for Q similar regions (Q being a positive integer smaller than N) which produce the smallest sum of absolute differences (SAD value) between the pixel group of the specified region and the corresponding pixel group. When a search region is set over a plurality of reference images, information identifying the frame to which the reference image belongs (reference image frame number) is included in the coordinates information that is output from the candidate texture selector 502 to the texture acquisition device 503.

Next a case involving an intra-frame prediction method will be described. Here, a procedure for generating a texture signal for an object block 402 of a frame 401 will be described, in line with the description given with respect to FIGS. 6A and 6B. In the present embodiment, since intra-frame prediction processing is carried out in 4☐4 block units as shown in FIG. 14, then the description here centers in particular on the region 1402 of 4☐4 pixels inside the object block.

Figure 14:
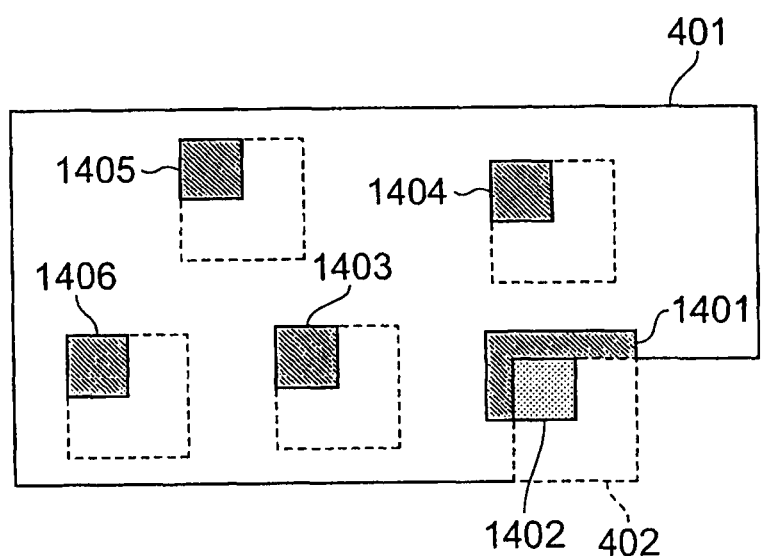
FIG. 14 is a schematic drawing for illustrating a modification example using an intra-frame prediction method in a matching process and a candidate texture generating process.

FIG. 14 is a schematic drawing for describing a matching process and a candidate texture generation process in the case of an intra-frame prediction method. Region 1402 indicates a specified region. Following the prediction method assigned by the prediction related information, the template signal generator 301 generates a signal for the region 1402 from the already reproduced signal of the adjacent region 1401 of the object block 402. The signal of the region 1402 is output as a template signal. In this, the amount of displacement from the top left corner of the region 402 to the top left corner of the specified region 1402 (texture region), and information about the shape of the specified region (similar region) and the texture region, is recorded in the texture synthesizer 202.

The texture synthesizer 302 sets as the search region the already reproduced signal of the same frame 401 as the object block 402. In the present embodiment, the whole of the reproduced region within the frame 401 is set as the search region, but it is also possible to set only a portion of this as the search region. The texture generator 302 performs an access operation via the line L104, acquires a plurality of pixel groups having the same shape as the specified region 1402, by template matching, and calculates the SAD value between corresponding pixels with respect to the template signal. The texture generator 302 determines the N−1 regions having the smallest SAD values 1403, 1404, 1405 and 1406 to be candidates for the texture signal (in the present embodiment, the value of N is 5). The template signal 1402 is added to these N−1 texture signals to give N signals which are subjected to weighted averaging by the synthesizer 303, thereby generating a prediction signal for the region 1402 which is the top left-hand quarter of the object block 402. In this case, the shape of the texture region in the object region is identified from the recorded shape of the texture region.

A template signal which has been generated by an intra-frame prediction method can also be used in an inter-frame prediction method. In this case, in the example shown in FIG. 14, other frames that have already been reproduced are included in the search region. No further description is given with respect to the method of setting the search region, the N value and the threshold value, and the like, but similarly to FIG. 6, these values may be encoded.

In the present embodiment, by changing the settings of the template signal generator 301 of the texture synthesizer 202 and the texture generator 302, it is possible to adapt to a plurality of texture synthesis methods such as those shown in FIGS. 6A and 6B to FIGS. 12A and 12B and FIGS. 14A and 14B, and it is also possible to adapt the image predictive encoding apparatus 100 to other methods. For example, a method can be adopted in which a plurality of texture synthesizers 202 are prepared, each having different settings for the template signal generator 301 and the texture generator 302, and the apparatus is switched between these texture synthesizers 202 as appropriate. It is possible to adapt the method of texture synthesis by composing the image predictive encoding apparatus 100 by preparing a device (not illustrated) which selects one method from a plurality of texture synthesis methods (for example, a device which selects the method producing the smallest error with respect to the object block), and encodes the selected texture synthesis method by means of the entropy encoder 111.

Figure 15:
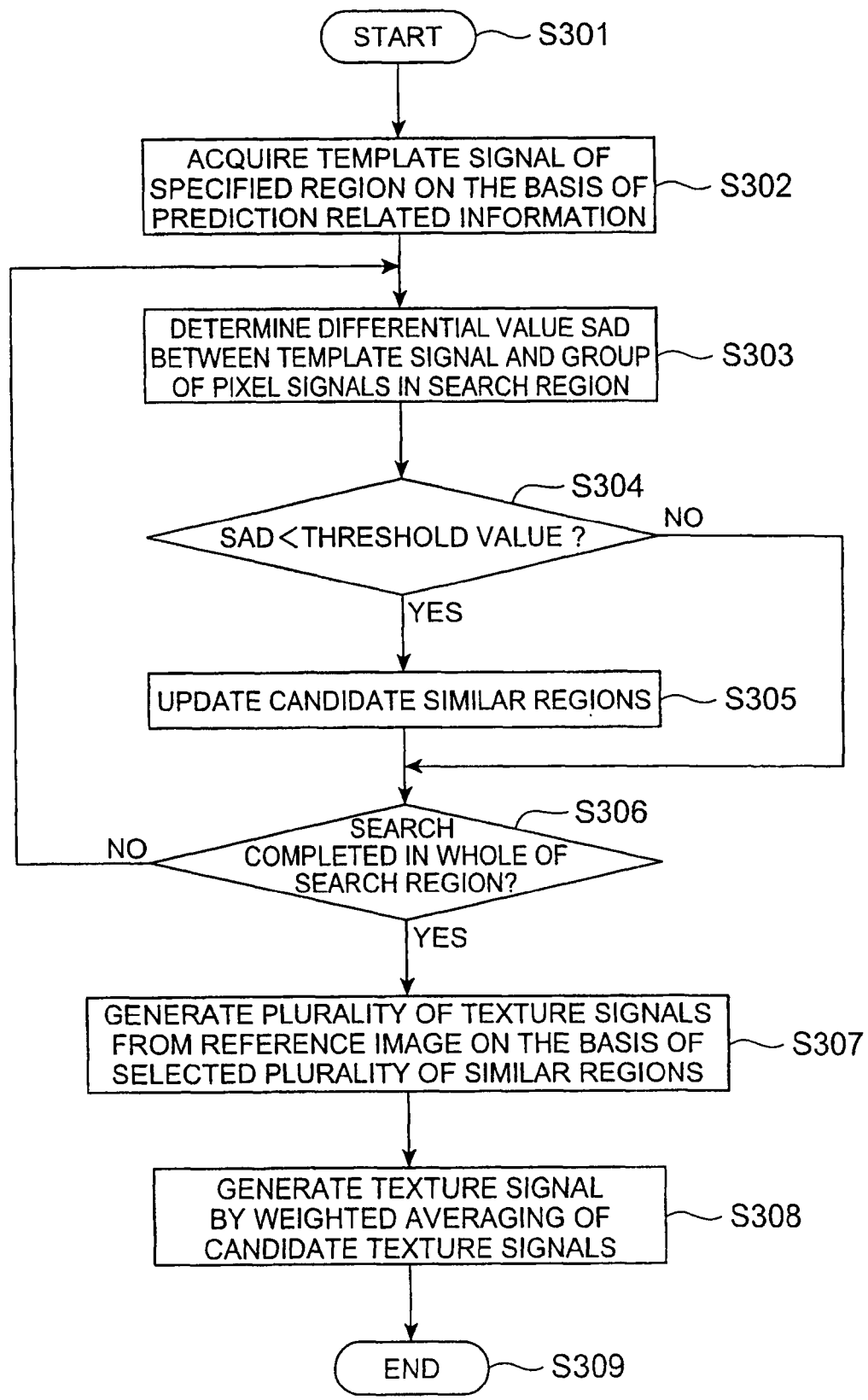
FIG. 15 is a flowchart for describing the procedure of a candidate texture signal generating method and synthesis method.

FIG. 15 is a flowchart showing the procedure of a method of generating texture for an object block in the texture synthesizer 202 shown in FIG. 2. Firstly, the template signal generator 301 acquires the template signal of the specified region on the basis of the prediction related information (step S302).

Next, the matching device 501 of the texture generator 302 determines the sum of absolute differences (SAD value) between the specified region and a group of pixels of the same shape which is situated in the search region (step S303). Thereupon, the candidate texture selector 502 of the texture generator 302 compares the SAD value with the prescribed threshold value (step S304), and if it is judged that the SAD value is lower than the threshold value, the procedure advances to step S305, whereas if this is not judged to be the case, the procedure advances to step S306.

The candidate texture selector 502 of the texture generator 302 compares the determined SAD value with the previous SAD value. If the determined SAD value is situated at or before number N in sequence from the smallest SAD value, then the searched similar region is added as a similar region candidate, and the similar region candidates are updated accordingly (step S305).

Thereupon, the matching device 501 of the texture generator 302 confirms whether or not the whole of the search region has been searched (step S306). If it is judged that the whole of the search region has not been searched, then the procedure returns to step S303, and the matching device 501 of the texture generator 302 determines the sum of the absolute differences SAD between the specified region and another group of pixels of the same shape which is situated in the search region.

When all of the search region has been searched, then the texture acquisition device 503 of the texture generator 302 acquires a plurality of texture signal candidates and a texture signal is generated by weighted averaging of these candidates in the synthesizer 303 (step S308). With this, the processing in respect of one object block is completed (step S309).

At step S305, the N signals having the smallest SAD value are selected as texture signal candidates, but another method may also be adopted. In order to obtain a texture signal having a statistically low level of noise by averaging the candidate texture signals, it is preferable that there should be a low mutual correlation between the plurality of texture signal candidates. In other words, it may be desirable for the candidate signals to be of diverse characteristics. A simple method for ensuring diversity in the candidate texture signals is one where N texture signals are selected, in order from the signal having the furthest spatial position with respect to the specified region, from the similar regions which have a smaller SAD value than the prescribed threshold value. Furthermore, as shown in FIG. 16, there is also a method where N regions are selected in such a manner that the spatial distances between the candidate similar regions are large.

FIG. 16 is a flowchart showing the procedure of one method of selecting N similar regions in step S305 shown in FIG. 15. In FIG. 16, A[p][i] indicates the coordinates information on a reference image of the pixel region found in the pth search, of the pixel regions having a SAD value that is smaller than the prescribed threshold value. The value i is set either to 0 indicating a horizontal coordinate or 1 indicating a vertical coordinate. C[k][i] indicates a coordinate of the kth similar region selected in step S305. Below, where it is not necessary to distinguish between the horizontal coordinate and the vertical coordinate, the notation A[p] and C[p] is used.

Firstly, the coordinates of the specified region obtained by the template generator are stored as C[1] (step S502), and the number K of similar regions selected thus far is set to 1.

Next, the coordinates A[p] and C[1] on the reference image are compared for the pixel regions where the SAD value is smaller than the prescribed threshold value, and the coordinate A[m] having the greater distance difference (vector size) is selected (step S503). The value of K is then updated to K+1(=2), and C[K] is set to A[m] (step S504). In this case, A[m] is confirmed as the similar region, and therefore the texture found in the mth search operation is deleted from the selection objects.

Thereupon, K and N are compared (step S505), and if it is judged that K is lower than N then the procedure returns to step S503, whereas if it is judged that K=N, then the processing is terminated.

Consequently, at step S503, each of C[1] to C[K] is compared with the remaining A[p] and the value of A[m] having the greatest sum of distance differences is selected. According to this method, it is possible to maintain the distance between the selected candidate similar regions.

FIG. 17 is a flowchart showing the procedure of an image predictive encoding method performed in an image predictive encoding apparatus 100 relating to the present embodiment. Firstly, the prediction related information generator 201 carries out a prediction process using the pixel signal of the object block and thereby generates prediction related information (step S102). Next, the texture synthesizer 202 generates a plurality of texture signal candidates on the basis of the prediction related information, and a prediction signal for the object block is generated by means of a texture synthesizing process (step S103). In this, the texture synthesizer 202 may generate a prediction signal by means of a plurality of texture generating methods and select the prediction signal which has the smallest square error sum between corresponding pixels with respect to the signal of the object block.

The residual signal which indicates the differential between the prediction signal that has been determined in this way and the signal of the object block is encoded by the transformer 106, the quantizer 107 and the entropy encoder 111 (step S104). The encoded residual signal, prediction related information and selection information about the texture generating method (if necessary) is output via the output terminal 112 (step S105). Here, in addition to the motion vector and the reference image frame number in the case of the inter-frame prediction method, the prediction method in the case of the intra-frame prediction method, and the selection information relating to the selection of the intra-frame prediction method and the inter-frame prediction method, the prediction related information may also include various settings, such as: the search region used for generating and selecting texture signal candidates (candidate texture signal search), the value of N (number of candidate texture signals), the threshold value (the assessment value which measures similarity between a candidate texture signal and the template signal), and the weighting value (the weighting coefficient when synthesizing texture).

After these processes or in parallel with these processes, the residual signal which has been encoded in order to perform predictive encoding of the subsequent object block is decoded by the inverse quantizer 108 and the inverse transformer 109. The accumulator 110 adds the prediction signal to the decoded residual signal, thereby reproducing the signal of the object block, which is stored as a reference image in the frame memory 104 (step S106). If the processing for all of the object blocks has not yet been completed, the procedure returns to step S102, and the processing in relation to the next object block is carried out. If the processing for all of the object blocks has been completed, then the processing is terminated (step S108).

Figure 19:
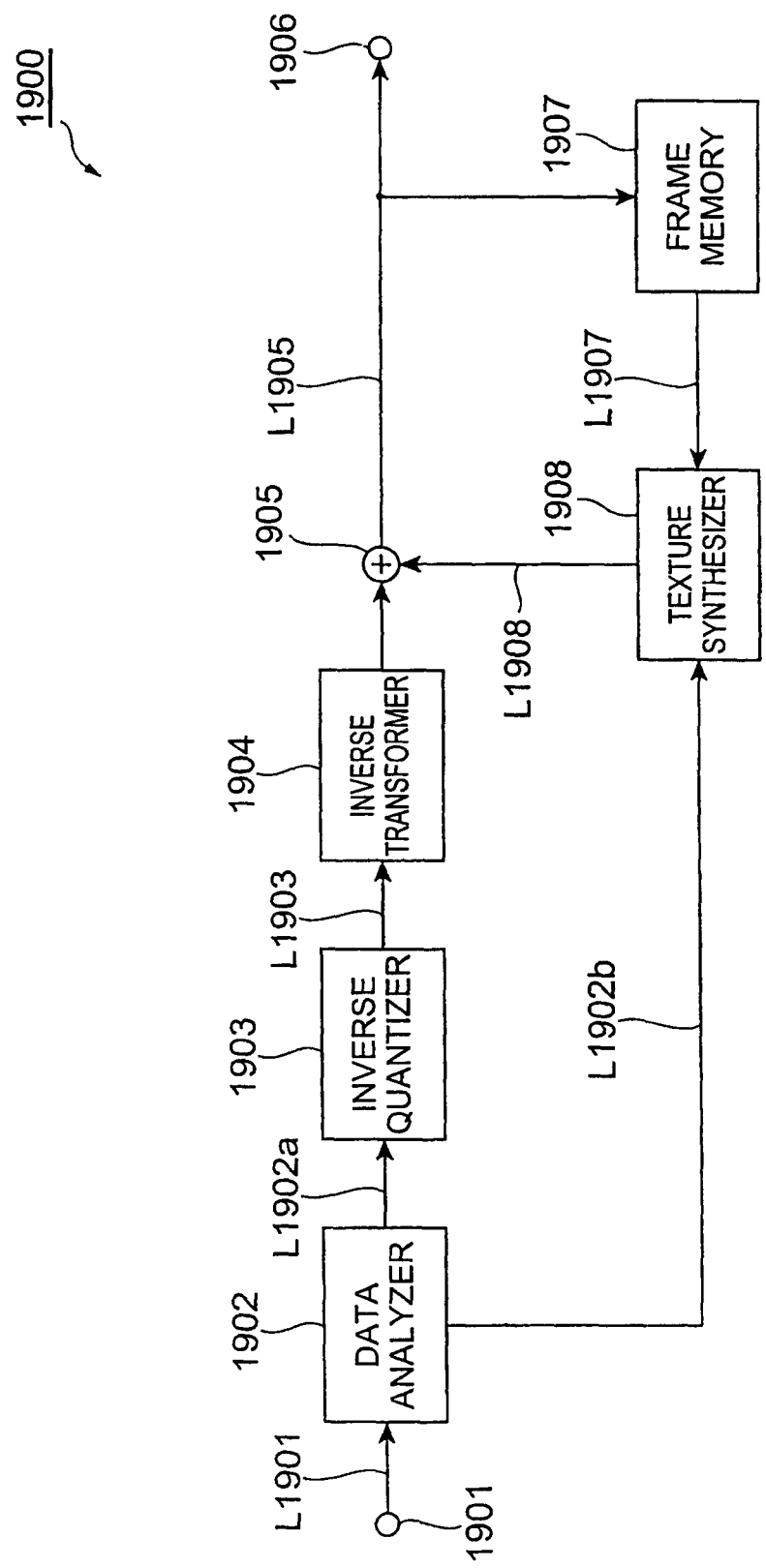
FIG. 19 is a block diagram showing an image predictive decoding apparatus relating to the present embodiment.

Next, the image predictive decoding method relating to the present embodiment will be described. FIG. 19 is a block diagram showing an image predictive decoding apparatus 1900 relating to the present embodiment. This image predictive decoding apparatus 1900 comprises: an input terminal 1901, a data analyzer 1902, an inverse quantizer 1903, an inverse transformer 1904, an accumulator 1905, an output terminal 1906, a frame memory 1907 and a texture synthesizer 1908. The decoding devices of the inverse quantizer 1903 and the inverse transformer 1904 may be realized by using devices other than these. Furthermore, the inverse transformer 1904 may be omitted.

The input terminal 1901 inputs compressed data which has been compressed and encoded by the image predictive encoding method described above. This compressed data includes a residual signal obtained by predictive encoding of an object block formed by dividing an image into a plurality of blocks, and prediction related information. Here, in addition to the prediction method in the case of the intra-frame prediction method, the selection information relating to the selection of the intra-frame prediction method and the inter-frame prediction method, the motion vector and the reference image frame number in the case of the inter-frame prediction method, the prediction related information may also include various settings, such as: the search region used for generating and selecting texture signal candidates (candidate texture signal search), the value of N (number of candidate texture signals), the threshold value (the assessment value which measures similarity between a candidate texture signal and the template signal), and the weighting value (the weighting coefficient when synthesizing texture). If the various settings are specified in advance in accordance with the method used, then this information is not necessary.

The data analyzer 1902 extracts the residual signal of the object block, the prediction related information and the various settings (if necessary) by analyzing the compressed data which is input to the input terminal 1901.

The inverse quantizer 1903 inputs the residual signal of the object block via line L1902a, and performs inverse quantization. The inverse transformer 1904 performs an inverse discrete cosine transform of the data that has been inverse quantized.

The texture synthesizer 1908 inputs prediction candidate signal information from the data analyzer 1902 via the line L1902b. This texture synthesizer 1908 acquires a reference image from the frame memory 907 on the basis of the prediction related information (by means of a method described hereinafter), and thereby generates a prediction signal. The texture synthesizer 1908 outputs the generated prediction signal to the accumulator 1905 via L1908.

The accumulator 1905 adds the prediction signal generated by the texture synthesizer 1908 to the residual signal which has been restored by the inverse quantizer 1903 and the inverse transformer 1904, and outputs the resulting reproduced image signal for the object block to the output terminal 1906 and the frame memory 1907 via the line L1905. The output terminal 1906 outputs to an external device (such as a display monitor).

The frame memory 1907 stores the reproduced image output from the accumulator 1905 as a reference image for use as reference in the next decoding process.

Figure 20:
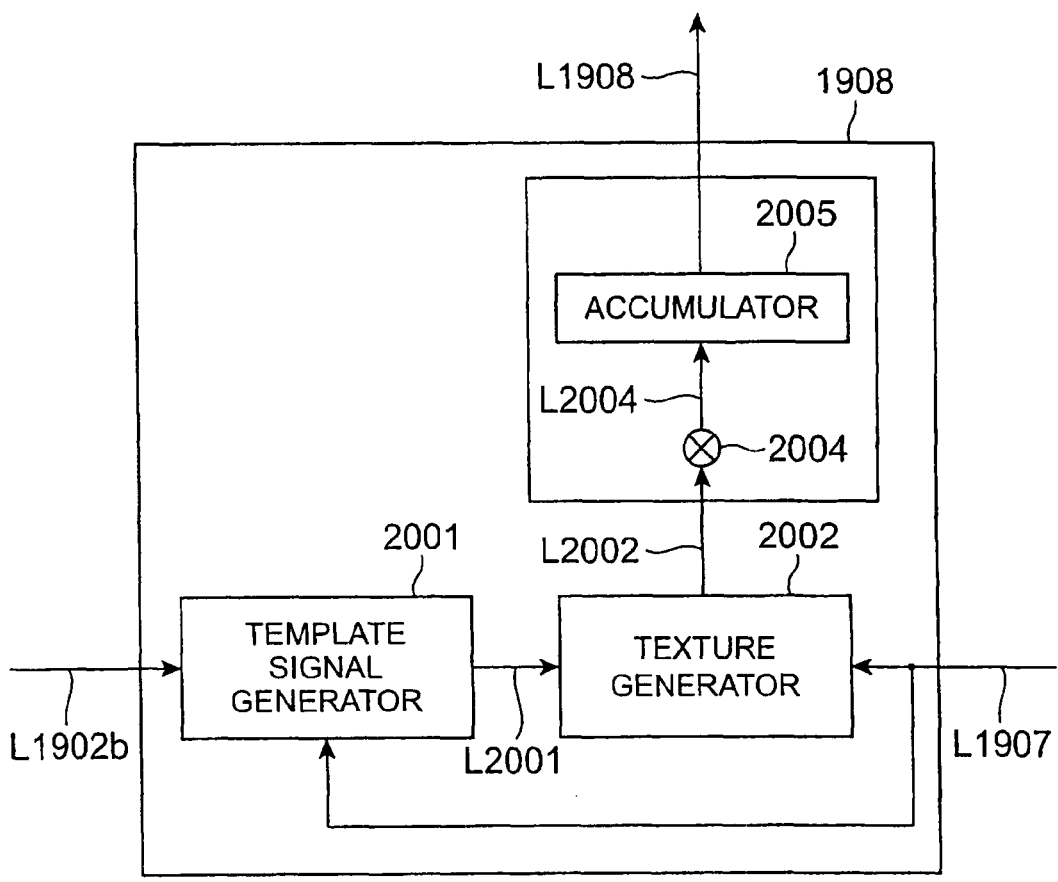
FIG. 20 is a block diagram showing the texture generator shown in FIG. 19.

Next, the texture synthesizer 1908 will be described. The details of the texture synthesizer 1908 are shown in FIG. 20, and essentially, it has a composition similar to that shown in FIG. 3, or equivalent functions.

The process of generating and synthesizing a texture signal according to the present embodiment will be described in detail here with reference to FIG. 20. FIG. 20 is a block diagram of the texture synthesizer 1908 shown in FIG. 19. The texture synthesizer 1908 comprises a template signal generator 2001, a texture generator 2002 and a synthesizer 2003. The template signal generator 2001 receives prediction related information which is input via line L2001 and also receives a reproduced image signal which is input from the frame memory 1907 via line L1907. The template signal generator 2001 generates a template signal from the reproduced image signal on the basis of the prediction related information and outputs same to the texture generator 2002 via the line L2001. The template signal is generated by means of an intra-frame prediction method or an inter-frame prediction method in accordance with the prediction related information and selection information relating to the intra-frame prediction method or inter-frame prediction method.

The texture generator 2002 receives a template signal which is input from the template signal generator 2001 via the line L2001, and also receives a reproduced image signal which is input from the frame memory 1907 via line L1907. The texture generator 2002 generates N texture signals from the template signal and the reproduced image signal, by means of a similar method to the texture generator 302 of the encoding apparatus. The N texture signals thus generated are output to the synthesizer 2003 via the line L2002. The synthesizer 2003 receives the N texture signals input via the line L2002. The synthesizer 2003 synthesizes these N texture signals by means of a similar method to the synthesizer 303 of the encoding apparatus, thereby generating a prediction signal, and this prediction signal is output via the line L1908.

The synthesizer 2003 receives the input of N candidate texture signals and generates a prediction signal for the object block by carrying out a weighted averaging process. The synthesizer 2003 comprises a weighting device 2004 and an accumulator 2005. The weighting value used in the weighting device 2004 may be determined in advance, and if so, it may be contained in the compressed data. The weighting device 2004 applies the designated weighting value to the N input texture signals, and outputs the results to the accumulator 2005 via the line L2004. The accumulator 2005 adds together the N texture signals which have been weighted, and outputs the summed texture signals via the line L1908 as a prediction signal.

The texture synthesizer 1908 carries out a texture synthesizing process in accordance with the various settings information, such as the search region (candidate texture signal search), the value of N (number of candidate texture signals), the threshold value (the assessment value which measures the similarity between a candidate texture signal and the template signal) and the weighting value (the weighting coefficient when synthesizing texture), and the like. The plurality of candidate texture signals thus generated need to be matched to the signals generated by the image predictive encoding apparatus, and the prediction signal generated by texture synthesis must be matched to the signal generated by the image predictive encoding apparatus. Therefore, the various settings information used in the texture synthesizer 1908 must match completely with the information used in the texture synthesizer 202 of the image predictive encoding apparatus. Information which has not been determined in advance is transmitted from the image predictive encoding apparatus 100 and is restored by the image predictive decoding apparatus 1900.

Similarly to the synthesizer 303 in the image predictive encoding apparatus 100, the synthesizer 2003 in the image predictive decoding apparatus 1900 is not limited to the composition shown in FIG. 20 either. For example, it is also possible to adopt a composition in which, after converting the weighting value relating to the texture signal to an integer, the N weighted texture signals are summed together and the summed signal is divided by the sum of the N weighting values.

Figure 21:
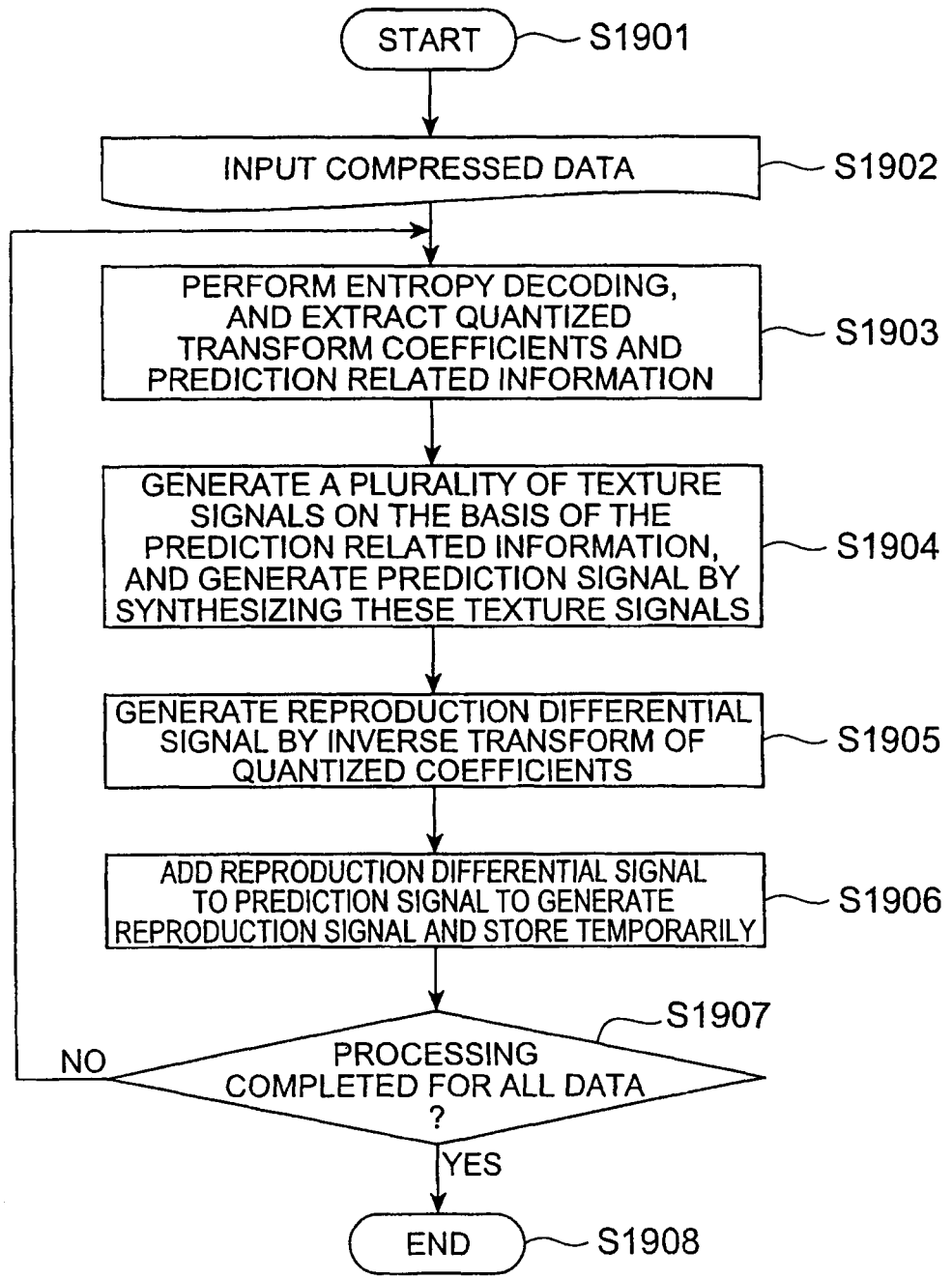
FIG. 21 is a flowchart showing the procedure of an image predictive decoding method performed by the image predictive decoding apparatus shown in FIG. 19.

Next, the image predictive decoding method performed in the image predictive decoding apparatus 1900 shown in FIG. 19 will be described with reference to FIG. 21. Firstly, compressed data is input via the input terminal 1901 (step S1902). The data analyzer 1902 then performs entropy decoding of the compressed data, and extracts the quantized transform coefficient and prediction related information (step S1903). A plurality of texture signals are generated by the texture synthesizer 1908 on the basis of the prediction related information that has been extracted, and a prediction signal is generated by synthesizing the plurality of texture signals thus generated (step S1904).

On the other hand, the quantized transform coefficient is inverse quantized using the quantization parameter in the inverse quantizer 1903 and inverse transformed in the inverse transformer 1904, to generate a reproduction differential signal (step S1905). A reproduction signal is then generated by adding the generated prediction signal to this reproduction differential signal and this reproduction signal is stored in the frame memory 1907 in order to reproduce the next object block (step S1906). When there is subsequent compressed data, this process is repeated again (step S1907), and all of the data is processed until the very end of the data (step S1908). If necessary, the procedure may return to step S1902 in order to take in compressed data.

The image predictive encoding method and the image predictive decoding method relating to the present embodiment can be provided by being stored on a recording medium in the form of a program. Examples of the recording medium include: a floppy disk (registered trademark), CD-ROM, DVD, or ROM, or a semiconductor memory, or the like.

Figure 22:
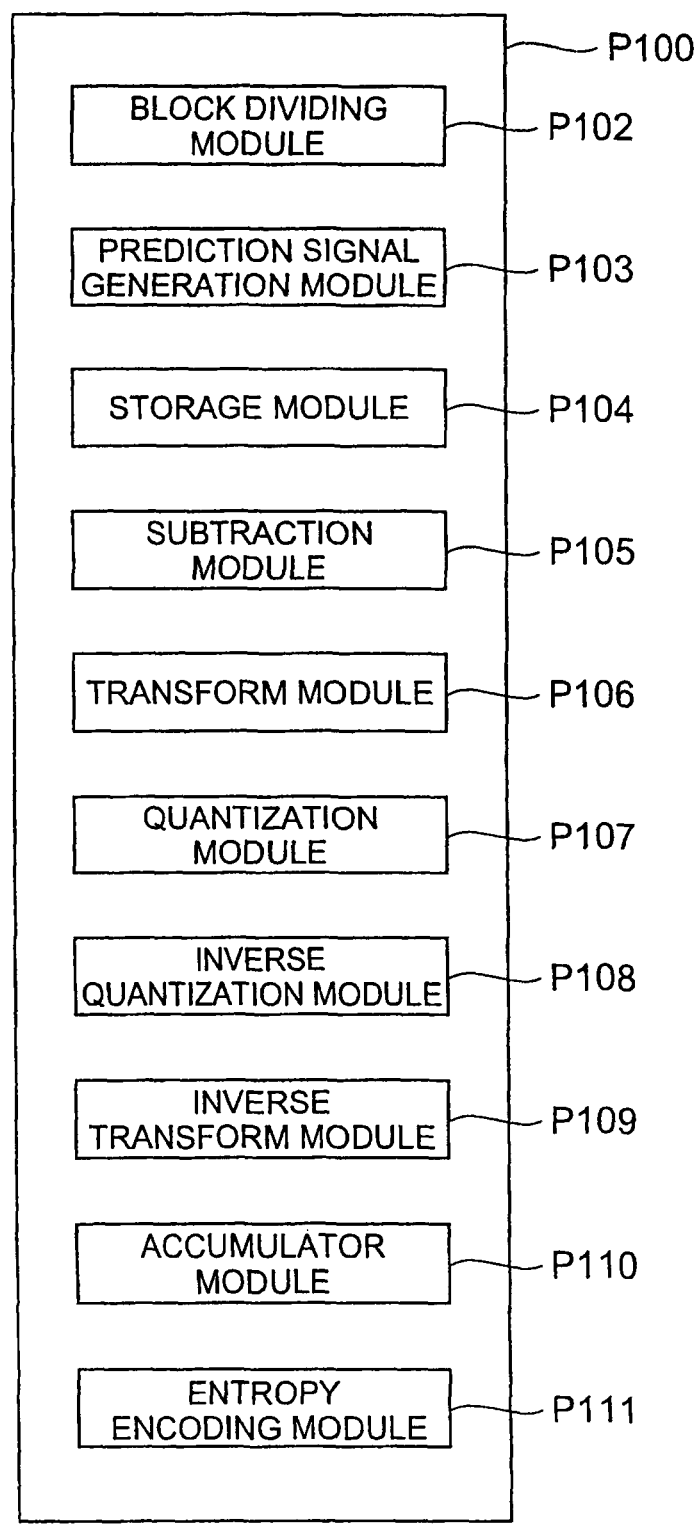
FIG. 22 is a block diagram showing a program which is able to implement an image predictive encoding method relating to the present embodiment.
Figure 23:
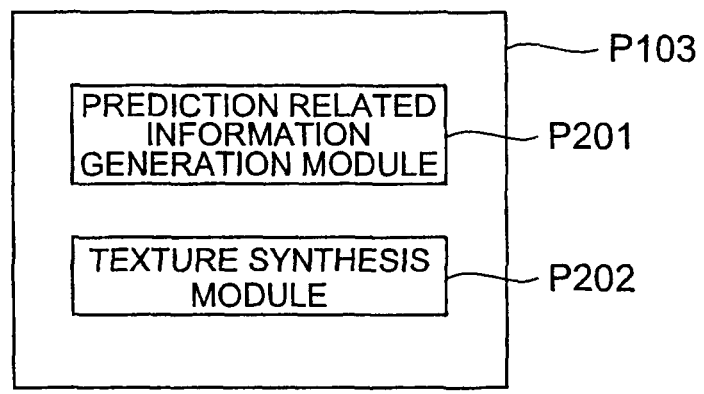
FIG. 23 is a block diagram showing the prediction signal generating module shown in FIG. 22.
Figure 24:
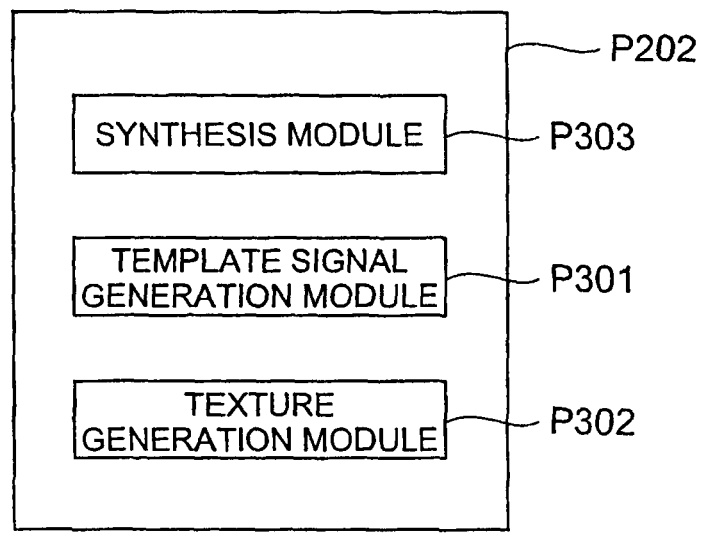
FIG. 24 is a block diagram showing the texture generating module shown in FIG. 23.

FIG. 22 is a block diagram showing modules of a program which is able to execute the image predictive encoding method. The image predictive encoding program P100 comprises: a block division module P102; a prediction signal generation module P103; a storage module P104; a subtraction module P105; a transform module P106; a quantization module P107; an inverse quantization module P108; an inverse transform module P109; an accumulator module P110 and an entropy encoding module P111. As shown in FIG. 23, the prediction signal generation module P103 comprises a prediction related information generation module P201 and a texture synthesis module P202. Moreover, as shown in FIG. 24, the texture signal module P202 comprises a template signal generation module P301, a texture generation module P302 and a synthesis module P303.

The functions realized by running the respective modules are the same as the functions of the image predictive encoding apparatus 100 described above. In other words, the functions of the respective modules of the image predictive encoding program P100 are similar to the functions of the block divider 102, the prediction signal generator 103, the frame memory 104, the subtracter 105, the transformer 106, the quantizer 107, the inverse quantizer 108, the inverse transformer 109, the accumulator 110, the entropy encoder 111, the prediction related information generator 201, the texture synthesizer 202, the template signal generator 301, the texture generator 302 and the synthesizer 303.

Figure 25:
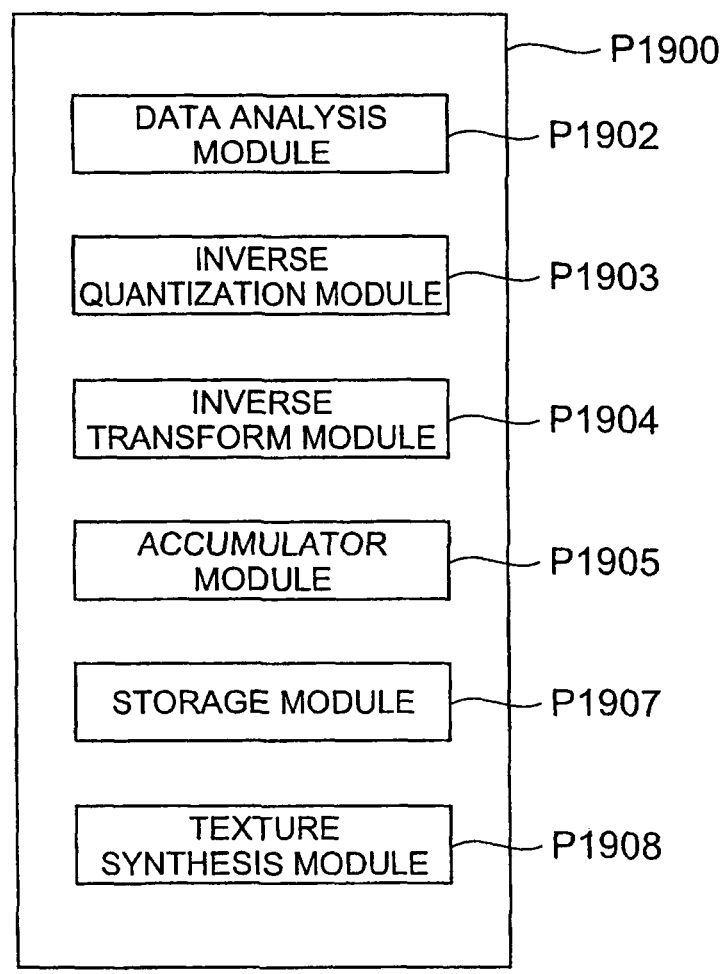
FIG. 25 is a block diagram showing a program which is able to implement an image predictive decoding method relating to the present embodiment.

Furthermore, FIG. 25 is a block diagram showing the modules of a program which is able to implement the image predictive decoding method. The image predictive decoding program P1900 comprises: a data analysis module P1902; an inverse quantization module P1903; an inverse transform module P1904; an accumulator module P1905; a storage module P1907 and a texture synthesis module P1908.

The functions which are realized by running the respective modules described above are the same as the respective constituents of the image predictive decoding apparatus 1900 described above. In other words, the functions of the respective modules of the image predictive decoding program P1900 are similar to the functions of the data analyzer 1902; the inverse quantizer 1903; the inverse transformer 1904; the accumulator 1905; the frame memory 1907; and the texture synthesizer 1908.

The image predictive encoding program P100 or the image predictive decoding program P1900 having the aforementioned composition is stored in the recording medium 10 and is executed by a computer which is described hereinafter.

Figure 26:
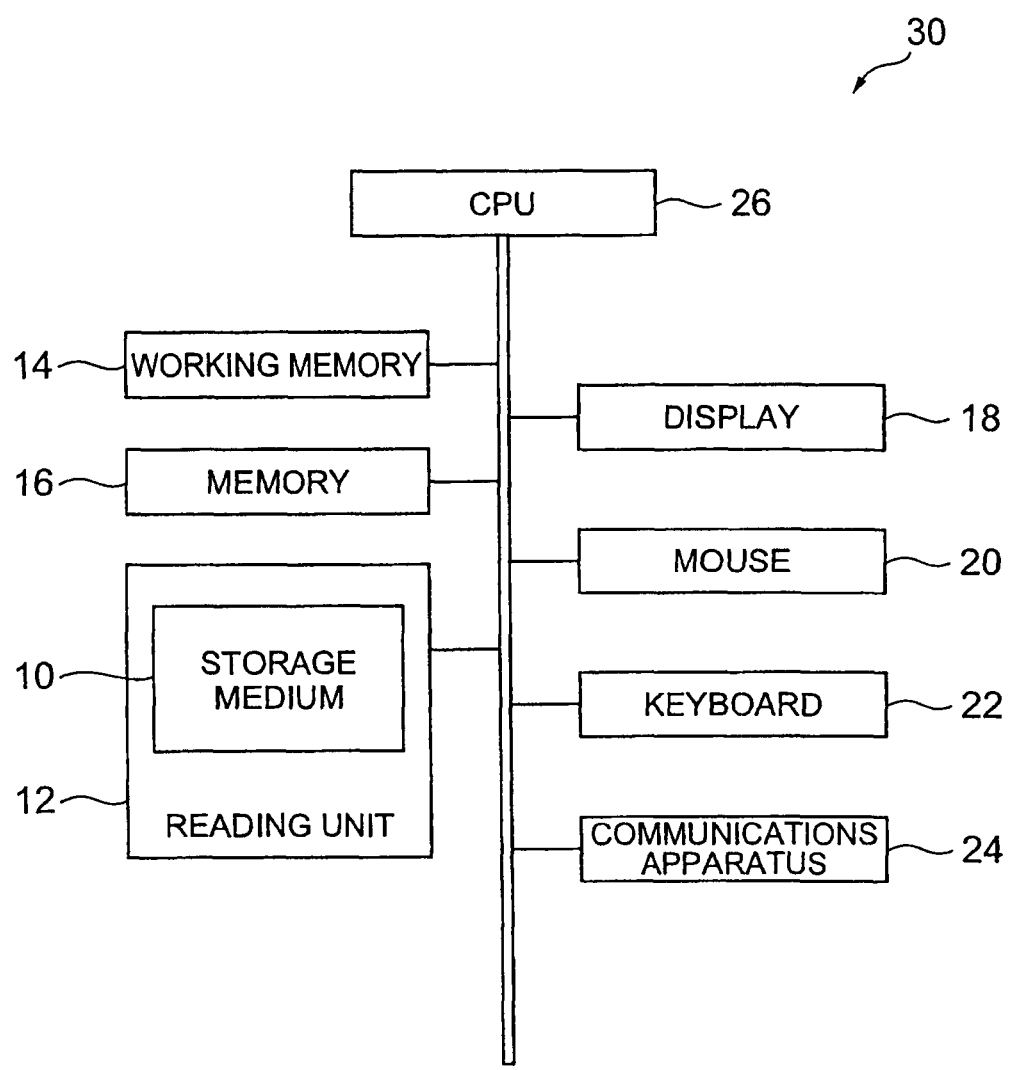
FIG. 26 is a diagram showing the hardware composition of a computer for implementing a program recorded on a recording medium.
Figure 27:
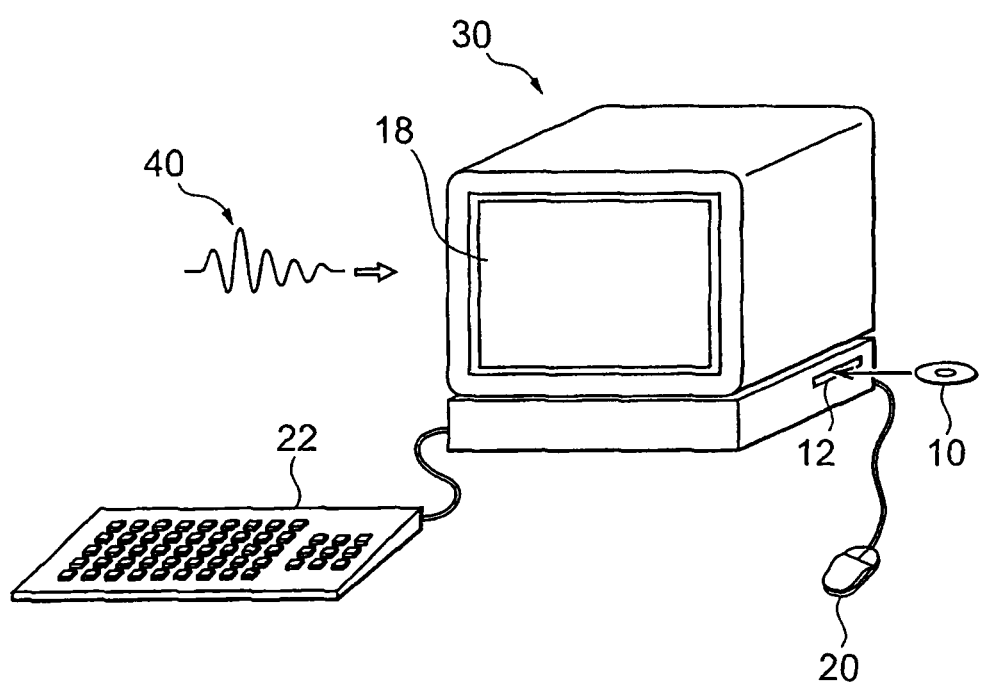
FIG. 27 is a perspective diagram of a computer for implementing a program recorded on a recording medium.

FIG. 26 is a diagram showing the hardware composition of a computer for executing a program stored on a recording medium, and FIG. 27 is a perspective diagram of a computer for executing a program stored on a recording medium. A program stored on a recording medium is not limited to being executed by a computer, and it may also be executed by a DVD player, set-top box, portable telephone, or the like, which is equipped with a CPU and implements processing and control on the basis of software.

As shown in FIG. 26, the computer 30 comprises: a reading unit 12, such as a floppy disk drive, a CD-ROM drive, or a DVD drive; a working memory (RAM) 14 where the operating system resides permanently; a memory 16 which stores a program recorded on a recording medium 10; a display apparatus 18 such as a display monitor; a mouse 20 and keyboard 22 forming input apparatuses; a communications apparatus 24 for sending and receiving data, and the like; and a CPU 26 for controlling the execution of the program. When the recording medium 10 is inserted into the reading unit 12, the computer 30 becomes able to access the image predictive encoding and decoding programs stored on the recording medium 10, via the reading unit 12, and therefore is able to operate as an image encoding apparatus or an image decoding apparatus relating to the present embodiment, in accordance with the image encoding or decoding program.

As shown in FIG. 27, the image predictive encoding program and the image decoding program can also be provided via a network as a computer data signal 40 which is superimposed on a carrier wave. In this case, the computer 30 stores the image predictive encoding program or image decoding program received via a reception apparatus 24, in a memory 16, and is able to execute the image predictive encoding program or image predictive decoding program.

As described above, according to the image predictive encoding apparatus relating to the present embodiment, firstly, a moving image which has been input to the input terminal 101 is divided into a plurality of regions by the block divider 102, and the prediction signal generator 103 generates a prediction signal in relation to an object pixel signal of an object block, which is the object of processing, from amongst the plurality of divided regions. The residual signal between the prediction signal and the object pixel signal is generated by the subtracter 105, and this residual signal is encoded by the entropy encoder 111. Here, the prediction signal is generated by summing together the plurality of texture signals generated on the basis of the prediction related information, in the synthesizer 303. The generated prediction related information is also encoded by the entropy encoder 111, similarly to the residual signal. Since a prediction signal is generated in this way on the basis of a plurality of texture signals, it is possible to reduce the noise contained in the prediction signal. Furthermore, it is also possible to generate the plurality of texture signals efficiently by means of a small amount of prediction related information. Consequently, a low-noise prediction signal can be generated in an efficient manner.

Furthermore, in the image predictive encoding apparatus 100 relating to the present embodiment, it is possible to set the shape of the specified region to be the same as the shape of the object region (for example, to make the shape of region 406 the same as the shape of region 402), and a prediction signal can be generated more easily.

Moreover, the image predictive encoding apparatus 100 relating to the present embodiment is able to divide up the object region 402, generate prediction signals respectively for each of the small regions (small regions 411, 421, 431 and 441) obtained by this division, and then generate a prediction signal for the object region 402 by synthesizing the prediction signals of the small regions. Therefore, the characteristics of the prediction signal for the object region 402 which is ultimately generated are improved, in other words, a prediction signal having lower noise can be generated.

Furthermore, in the image predictive encoding apparatus 100 relating to the present embodiment, the candidate texture selector 502 selects as one texture signal the template signal having the smallest differential with respect to the pixel signal of the object region. In other words, the template signal is included in the texture signals. Therefore, it is possible to generate a prediction signal having lower noise.

Furthermore, in the image predictive encoding apparatus 100 according to the present embodiment, the synthesizer 303 performs weighted averaging of the texture signals and therefore the plurality of texture signals are averaged. Consequently, it is possible to generate a prediction signal having low statistical error.

Furthermore, in the image predictive encoding apparatus 100 according to the present embodiment, the prediction related information includes a motion vector which indicates the amount of spatial displacement of the object region. Therefore, it is possible more easily to derive a signal having a high correlation with respect to the object pixel signal of the object region, and a prediction signal can be generated more readily.

In the image predictive decoding apparatus 1900 relating to the present embodiment, the data analyzer 1902 extracts the prediction related information and the residual signal from the compressed data. Thereupon, the texture synthesizer 1908 generates a prediction signal on the basis of the prediction related information and the inverse quantizer 1903 and the inverse transformer 1904 restore the residual signal. The accumulator 1905 adds together the prediction signal and the residual signal, thereby restoring a reproduced pixel signal for the object region. Here, the prediction signal is generated by taking the plurality of texture signals generated on the basis of the prediction related information restored by the texture generator 2002 and subjecting these texture signals to a weighted averaging process in the synthesizer 2003. Since a prediction signal is generated in this way on the basis of a plurality of texture signals, it is possible to reduce the noise contained in the prediction signal. Furthermore, it is also possible to generate the plurality of texture signals efficiently by means of a small amount of prediction related information. Consequently, a low-noise prediction signal can be generated in an efficient manner.

Furthermore, in the image predictive decoding apparatus 1900 relating to the present embodiment, the specified region can be set to the same shape as the object region, and therefore it is possible to generate a prediction signal more easily.

Moreover, the image predictive decoding apparatus 1900 relating to the present embodiment is able to divide up the object region 402, generate prediction signals respectively for each of the small regions obtained by this division, and then generate a prediction signal for an object region by synthesizing the prediction signals of the small regions. Therefore, the characteristics of the prediction signal for the object region which is ultimately generated are improved, in other words, a prediction signal having lower noise can be generated.

Furthermore, in the image predictive decoding apparatus 1900 relating to the present embodiment, the texture generator 2002 is able to generate texture signals including a template signal which has the smallest differential with respect to the pixel signal of the object region, and therefore it is possible to generate a prediction signal having even less noise.

Furthermore, in the image predictive decoding apparatus 1900 relating to the present embodiment, the synthesizer 2003 performs a weighted averaging process of the texture signals, and a prediction signal is generated by summing together the texture signals that have undergone this processing. Since the texture signals are averaged in this way when generating the prediction signal, it is possible to generate a prediction signal having a statistically low level of error.

Furthermore, in the image predictive decoding apparatus 1900 relating to the present embodiment, the data analyzer 1902 is able to extract prediction related information including a motion vector which indicates the amount of spatial displacement of the object region. Therefore, it is possible more easily to derive a signal having a high correlation with respect to the object pixel signal of the object region, and a prediction signal can be generated more readily.

Above, the present invention was described in detail with respect to an embodiment. However, the present invention is not limited to the embodiment described above. The present invention can be modified in various ways without departing from the essence of the invention.

Second Embodiment

Next, the present invention describes an image predictive encoding apparatus, an image predictive encoding method, an image predictive encoding program, an image predictive decoding apparatus, an image predictive decoding method and an image predictive decoding program whereby a prediction signal can be generated efficiently for an image having a complex texture signal (pattern), at the same time as raising the prediction efficiency in respect of pixels which are situated distantly from the boundaries of the object block.

Figure 28:
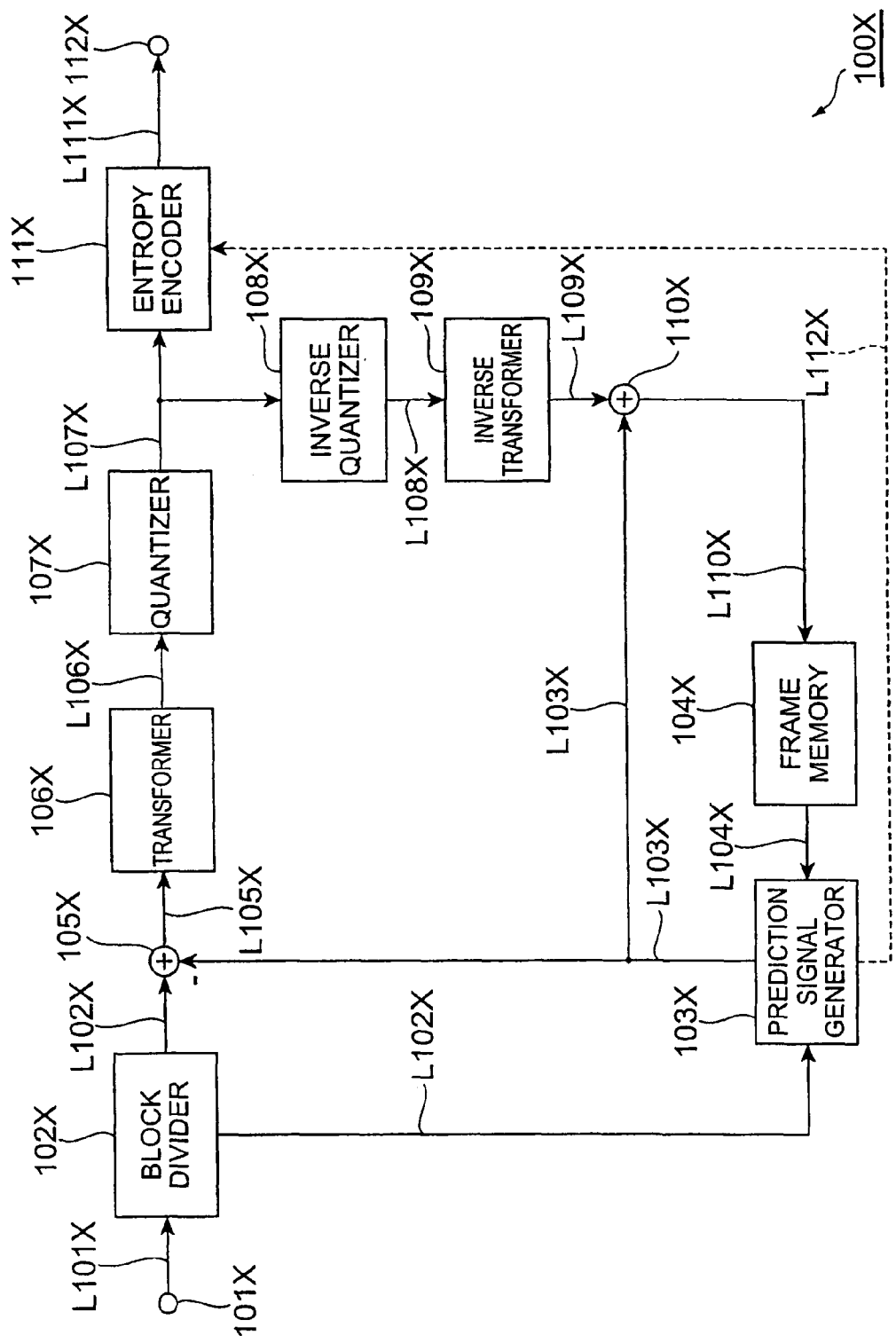
FIG. 28 is a block diagram showing an image predictive encoding apparatus relating to a second embodiment of the present invention.

FIG. 28 is a block diagram showing an image predictive encoding apparatus 100X according to the present embodiment. This image predictive encoding apparatus 100X comprises: an input terminal 101X; a block divider 102X; a prediction signal generator 103X; a frame memory 104X; a subtracter 105X; a transformer 106X; a quantizer 107X; an inverse quantizer 108X; an inverse transformer 109X; an accumulator 110X; an entropy encoder 111X; and an output terminal 112X. The transformer 106X and the quantizer 107X function as an encoding device.

The composition of the image predictive encoding apparatus 100X described above is explained further below. The input terminal 101X is a terminal where the signal of a moving image comprising a plurality of images is input. The block divider 102X divides the image that is the object of encoding, namely, the signal of the moving image input via the input terminal 101X, into a plurality of regions. According to the present embodiment, it divides the image into blocks consisting of 8□8 pixels each, but it may also divide the image into blocks of another size or shape.

The prediction signal generator 103X is a unit which generates a prediction signal for an object region (object block) which is the object of an encoding process. The concrete processing of this prediction signal generator 103X is described below.

The subtracter 105X is a unit which generates a residual signal by subtracting the prediction signal generated by the prediction signal generator 103X and input via the line L103, from the object region obtained by dividing in the block divider 102X, which is input via the line L102. The subtracter 105X outputs the residual signal obtained by the subtraction process to the transformer 106X via line L105.

The transformer 106X is a unit which performs a discrete cosine transform of the residual signal obtained by subtraction. Furthermore, the quantizer 107X is a unit which quantizes the transform coefficient arising from the discrete cosine transform performed by the transformer 106X. The entropy encoder 111X encodes the transform coefficient which has been quantized by the quantizer 107X and outputs same via L111X together with information relating to the prediction method. The output terminal 112X outputs the information input from the entropy encoder 111X to the exterior.

The inverse quantizer 108X performs inverse quantization of the quantized transform coefficient, and the inverse transformer 109X performs an inverse discrete cosine transform, thereby restoring the residual signal. The accumulator 110X adds together the restored residual signal and the prediction signal supplied via the line L103X, thereby reproduces the signal for the object block, and stores this signal in the frame memory 104X. In the present embodiment, a transformer 106X and an inverse transformer 109X are used, but it is also possible to use another transform process instead of these transformers, and it is not absolutely necessarily to provide the transformer 106X and the inverse transformer 109X. The compressed pixel signal of the object region is restored by inverse processing and stored in the frame memory 104X for the purpose of carrying out intra-frame prediction or inter-frame prediction for a subsequent object region.

Next, the details of the prediction signal generator 103X will be described. The prediction signal generator 103X generates a prediction signal for an object region which is the object of an encoding process (hereinafter, called an object block). In the present embodiment, two types of prediction methods are used. In other words, the prediction signal generator 103X generates a prediction signal by using at least one of an inter-frame prediction method and an intra-frame prediction method.

When using an inter-frame prediction method, the prediction signal generator 103X takes a reproduced signal which has been encoded and then restored previously as a reference image and determines movement information which gives the prediction signal having the smallest error with respect to the object block, from this reference image. This processing is called movement detection. Furthermore, depending on the circumstances, the object block may be divided up further and an inter-frame prediction method specified for the small regions obtained by this division. In this case, the prediction signal generator 103X determines the most efficient method of division in respect of the whole object block, and the respective movement information for same, from various different division methods. In the present embodiment, the prediction signal generator 103X inputs the object block via line L102X and the reference image via line L104X in order to generate the prediction signal described above. Furthermore, the prediction signal generator 103X uses as the reference image a plurality of images which have been encoded and restored previously. The details of this processing are the same as the prior art technology described in either MPEG-2 or 4, or ITU H.264.

The movement information and the method of dividing the small regions which have been determined in this way are sent via line L112X to the entropy encoder 111X and then output from the output terminal 112X. The prediction signal generator 103X acquires a reference image from the frame memory 104X on the basis of the method of dividing the small regions and the movement information corresponding to the respective small regions, and generates an inter-frame prediction signal. The inter-frame prediction signal generated in this way is sent via line L103X to the subtracter 105X.

If using an intra-frame prediction method, the prediction signal generator 103X generates an intra-frame prediction signal by using already reproduced pixel values which are spatially adjacent to the object block. More specifically, the prediction signal generator 103X acquires an already reproduced pixel signal which is situated in the same frame, from the frame memory 104X, decides the intra-frame prediction method to be used for generating a prediction signal by means of a prescribed procedure, and generates an intra-frame prediction signal on the basis of the intra-frame prediction method thus determined. On the other hand, information relating to the prediction method is sent via line L112X to the entropy encoder 111X and encoded, and is then output from the output terminal 112X. The inter-frame prediction signal generated in this way is sent to the subtracter 105X. The details of the processing performed by the prediction signal generator 103X are described hereinafter.

Whichever of the inter-frame prediction signal and the intra-frame prediction signal determined as stated above has the smallest error is selected and sent to the subtracter 105X. However, in the case of a single image, since there is no previous image, then all of the object blocks are processed by intra-frame prediction. The method of generating an intra-frame prediction signal described below can also be applied to the encoding and decoding of still images, such as photographs.

In the subtracter 105X, the prediction signal (input via line L102X) is subtracted from the signal of the object block (input via line L103X) to generate a residual signal. This residual signal is discrete cosine transformed by the transformer 106X and the respective transform coefficients are quantized by the quantizer 107X. Finally, the quantized transform coefficients are encoded, together with the prediction signal generating method, by the entropy encoder 111X and output from the output terminal 112X.

Figure 29:
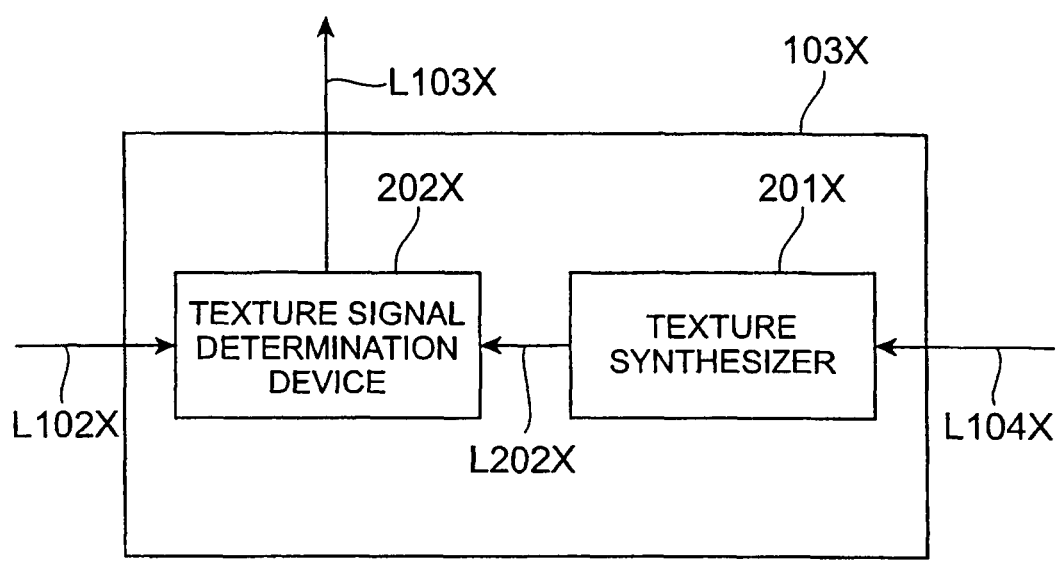
FIG. 29 is a block diagram showing a prediction signal generator 103X which is used in an image predictive encoding apparatus.

Next, the processing of the prediction signal generator 103X according to the present invention will be described, centering on the case of an intra-frame prediction method. This processing can also be applied in the same manner to the case of an inter-frame prediction method. FIG. 29 is a block diagram showing the prediction signal generator 103X which is used in the image predictive encoding apparatus according to the present embodiment; and the prediction signal generator 103X is constituted by a texture synthesizer 201X and a texture signal determination device 202X.

The texture synthesizer 201X inputs an image signal which has already been reproduced in a previous process (reproduced image signal) from the frame memory 104X of the FIG. 28 via the line L104X. Furthermore, when using an intra-frame prediction method, the texture synthesizer 201X inputs a reproduced image signal which is situated in the same frame as the object block, and when using an inter-frame prediction method, the texture synthesizer 201X inputs a reproduced image signal which is situated in a different frame or field to the object block. This texture synthesizer 201X generates a plurality of texture signals by means of a method such as that described below, and outputs the plurality of texture signals thus generated to the texture signal determination device 202X.

The texture signal determination device 202X inputs the image signal of the object block via line L102X at the same time as the texture signal is output from the texture synthesizer 201X. The texture signal determination device 202X then compares each of the plurality of input texture signals with the image signal of the object block and outputs the texture signal having the smallest error as the prediction signal of the object block, via line L103X. In the present embodiment, the texture signal determination device 202X determines the error value by finding the sum of the absolute differences in the pixel values between the image signal of the object block and the texture signal, and it designates the texture signal producing the smallest error value as the prediction signal.

Figure 30:
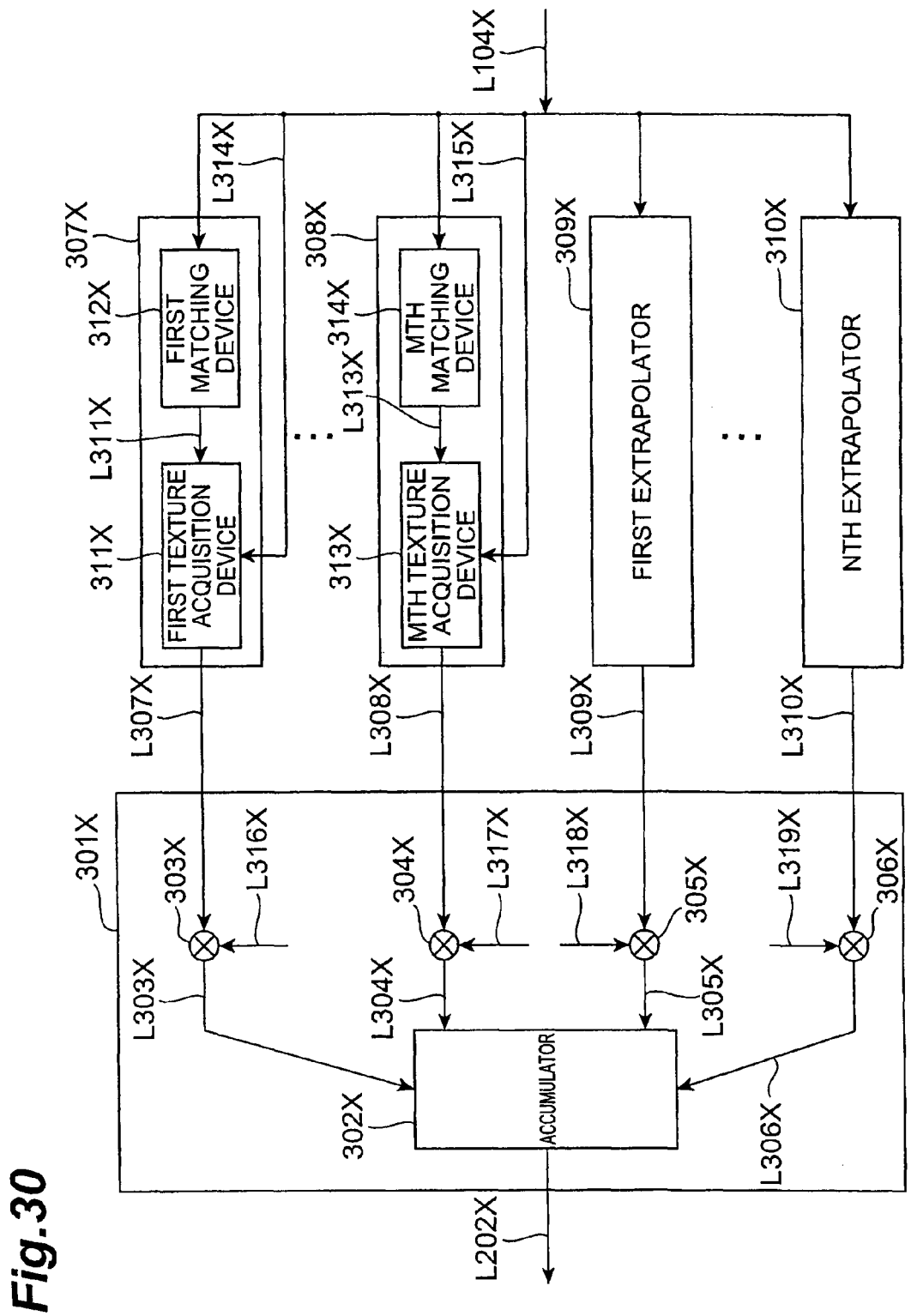
FIG. 30 is a block diagram showing a texture synthesizer 201X.

Next, the texture synthesizer 201X will be described with reference to FIG. 30. FIG. 30 is a block diagram showing a texture synthesizer 201X which is used in an image predictive encoding apparatus 100X according to the present embodiment. This texture synthesizer 201X comprises: a synthesizer 301X; an accumulator 302X; weighting devices 303X to 306X; texture generators 307X to 308X and a first extrapolator 309X to an Nth extrapolator 310X. Here, the texture generator 307X comprises a first texture acquisition device 311X and a first matching device 312X, and the texture generator 308X comprises an Mth texture acquisition device 313X and an Mth matching device 314X. In FIG. 30, M texture generators and N signal extrapolators are used. In the present embodiment, M=5 and N=9, but numbers other than these can also be used. For example, compositions using M=0 and N=9 or M=5 and N=0 are also possible.

Figure 31:
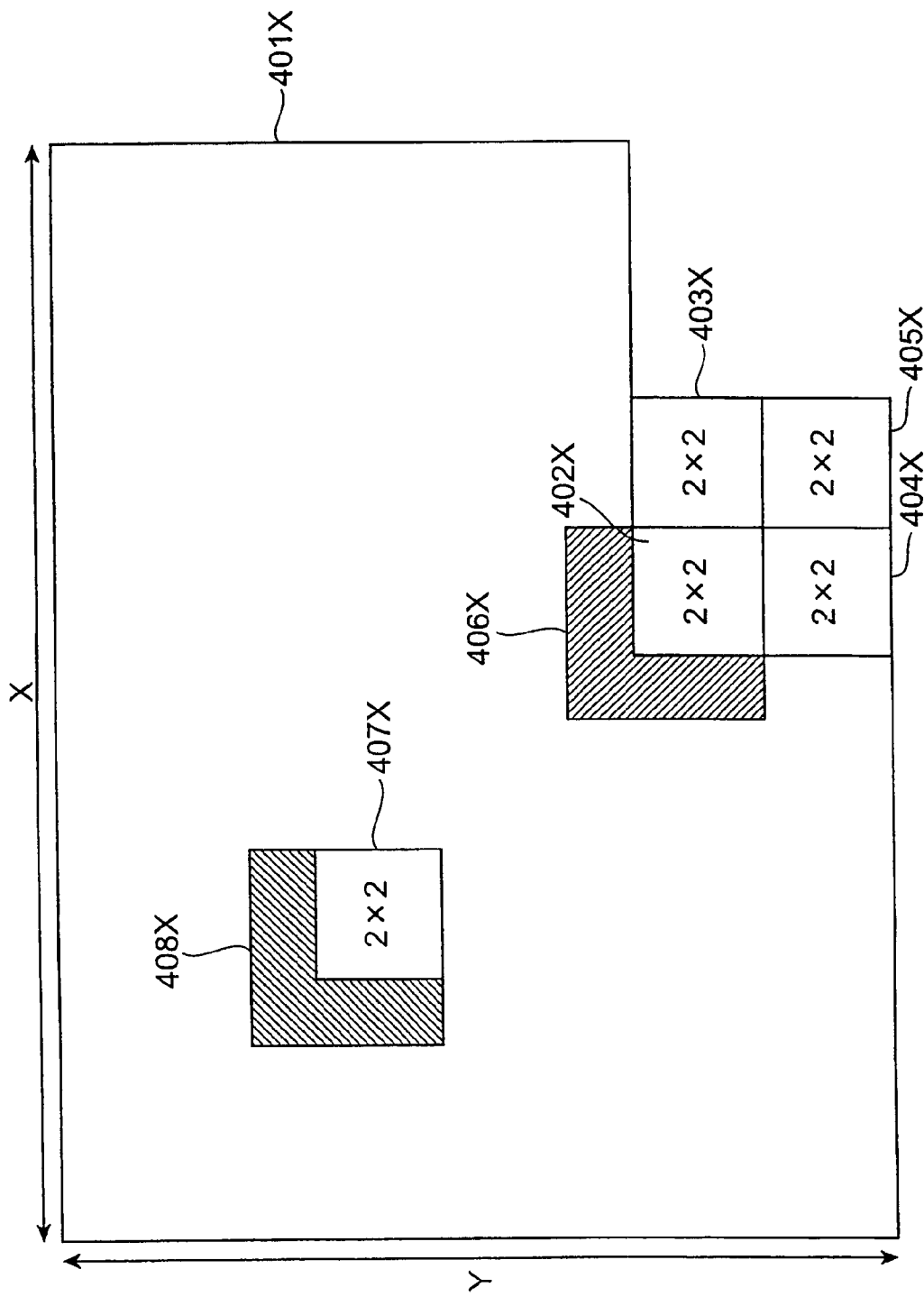
FIG. 31 is a schematic drawing for describing a matching process in a texture generating method.

Firstly, the operation of the texture generator 307X will be described. The first matching device 312X accesses the reproduced image signal which is present in the frame memory 104X via the line L104X, and carries out a matching process. The matching process will be described here. FIG. 31 is a schematic drawing for illustrating a matching process in a texture generating method according to the present embodiment. Here, a case is described in which a prediction signal is generated for an object block 402X.

The "object adjacent region" (also called a template) is set as the "search region" for a particular object block by means of a previously determined method. In the present embodiment, a portion (or all) of a reproduced image which lies in contact with the object block 402X, which was reproduced previously and which is situated in the same frame, is set as the search region 401X. A group of already reproduced pixels (the inverted L-shaped region) 406X which are adjacent to the object block 402X is used as the "object adjacent region".

The search region 401X does not have to lie completely in contact with the object block 402X. Furthermore, the object adjacent region 406X needs to lie in contact with the object block 402X in at least one pixel. Furthermore, in the search region 401X, the sum of the absolute differences (SAD) between corresponding pixels is determined for pixel groups having the same shape as the object adjacent region 406X, and the region producing the smallest SAD value is found and set as the "predicted adjacent region".

In FIG. 31, the predicted adjacent region 408X is determined as the "predicted adjacent region". The region 407X which lies in contact with the predicted adjacent region 408X is determined as the texture signal for the object block 402X. Here, the positional relationship between the predicted adjacent region 408X and the region 407X indicating the texture signal is the same as the relationship between the object block 402X and the object adjacent region 406X, but it does not have to be so.

When a texture signal has been determined in this way, the first matching device 312X sends the coordinates information relating to the coordinates of the predicted adjacent region 408X or the coordinates information relating to the coordinates of the region 407X which is the texture signal to the first texture acquisition device 311X via L312X. The first texture acquisition device 311X acquires the pixel signal of the region 407X forming the texture signal from the frame memory 104X (see FIG. 28) via line L314X on the basis of the coordinates information described above, and outputs same to the synthesizer 301X via the line L307X.

By means of processing of this kind, a region 407X which is close to (has a small error with respect to) the adjacent region 406X of the object block 402X is found from the search region 401X, and generated as a texture signal.

Figure 32:
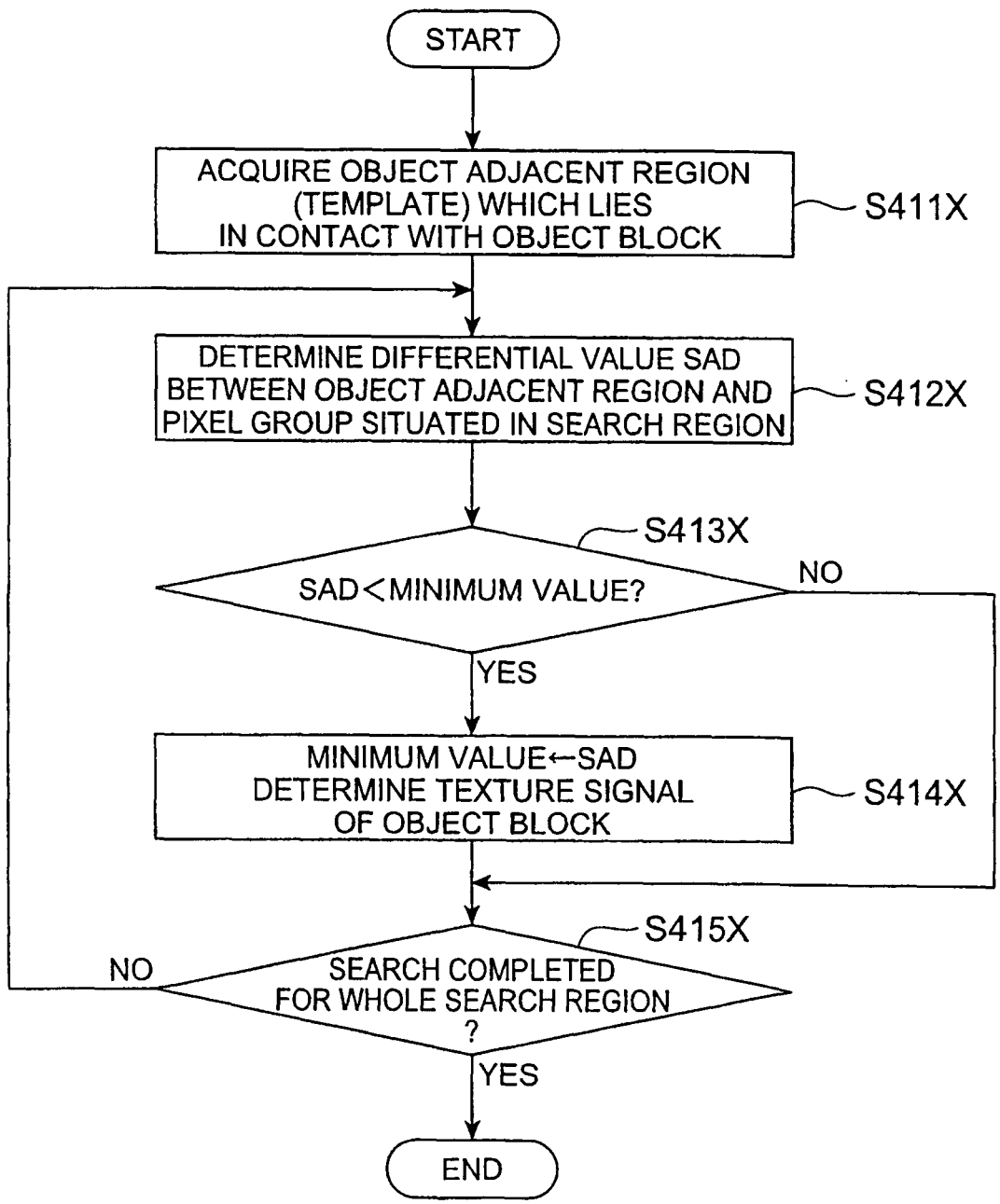
FIG. 32 is a flowchart showing a texture generating method performed in a texture generator 307X.

FIG. 32 is a flowchart showing a method of generating texture in a texture generator 307X according to an embodiment of the present invention. An object adjacent region which is adjacent to the object block is acquired by the first matching device 312X (S411X). Next, the first texture acquisition device 311X determines the sum of absolute differences (SAD) value between the object adjacent region acquired by the first matching device 312X and a pixel group of the same shape which is situated in the search region (S412X). The first texture acquisition device 311X compares the SAD value with the smallest SAD value thus far (S413X) and if the first texture acquisition device 311X judges that the SAD value is lower than the smallest value, then it advances to S414X and in this is not the case, then it advances to S415X. The initial value of the smallest value is set in advance.

The SAD value determined at S412X is set by the first texture acquisition device 311X as the smallest value, and the pixel signal of the region adjacent to the predicted object region is set by the first texture acquisition device 311X as the texture signal of the object block (S414X). Thereupon, the first matching device 312X confirms whether or not the whole of the search region 401X has been searched (S415X), and if it is judged that the whole search region has been searched, the procedure returns to S412X, and the first texture acquisition device 311X determines the sum of absolute differences SAD between the object adjacent region 406X and another pixel group (of the same shape) which is situated in the search region 401X. If the whole of the search region has been searched, then the processing for one object block (in the present case, the object block 402X) has been completed. Similar processing is then carried out successively for the subsequent object blocks 403X to 405X.

By means of the processing described above, the texture generator 307X is able to search for and find a predicted adjacent region 408X, from a search region 401X, by using the object adjacent region 406X which is adjacent to the object block 402X, and the region 407X that is adjacent to this predicted adjacent region 408X can be set as a texture signal.

FIG. 32 illustrates processing which uses a search region 401X that is situated inside the same frame or field as the object block, but the search region may also use a previously reproduced signal which is situated in a different frame to the object block. In this case, the predicted adjacent region and the texture signal which is adjacent to this predicted adjacent region are acquired from a different frame to the object block. Moreover, it is also possible to use an already reproduced image signal which is situated in both the same frame as the object block and a different frame, as the search region. In this case, the texture signals forming the object of synthesis will be a texture signal found in the same screen as the object block and a texture signal found in a different screen.

Next, the operation of the texture generator 308X will be described. The operation of the texture generator 308X is virtually the same as the texture generator 307X, but this texture generator 308X performs a search using a region having a different shape to the object adjacent region 406X shown in FIG. 31. FIGS. 33A to 33D are diagrams showing examples of this different shape of the object adjacent region. As shown in FIGS. 33A to 33D, the shape may be a rectangular shaped region 501X which is formed to the left-hand side of the object block 502X, a rectangular shaped region 503X which is formed to the upper side of the object block 508X, a region 505X formed in the upper leftward oblique direction of the object block 504X, and a region 507X which is formed in a triangular shape extending from the upper side to the left-hand side of the object block 508X, but the shape is not limited to these examples.

Figure 33:
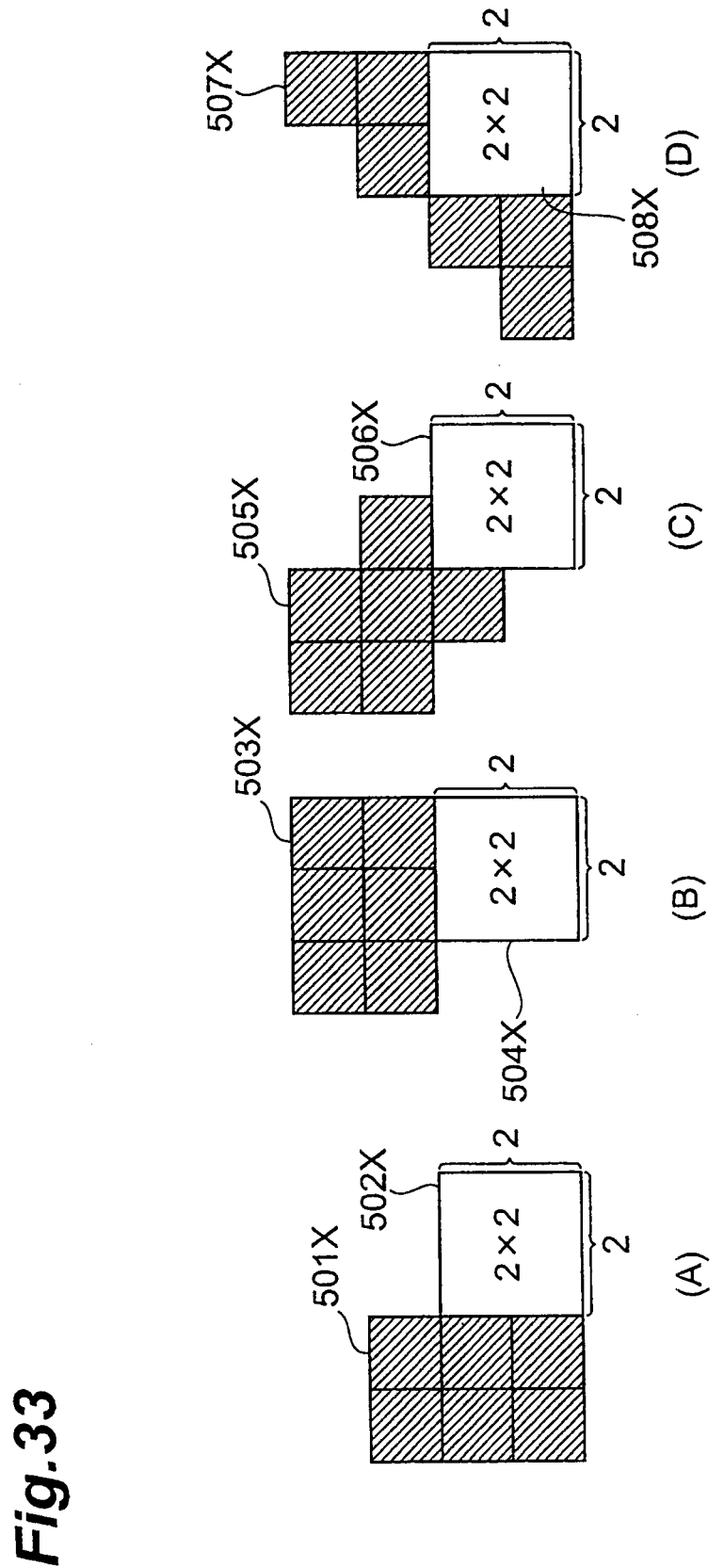
FIGS. 33A to 33D are diagrams showing examples of the shape of an object adjacent region.
Figure 34:
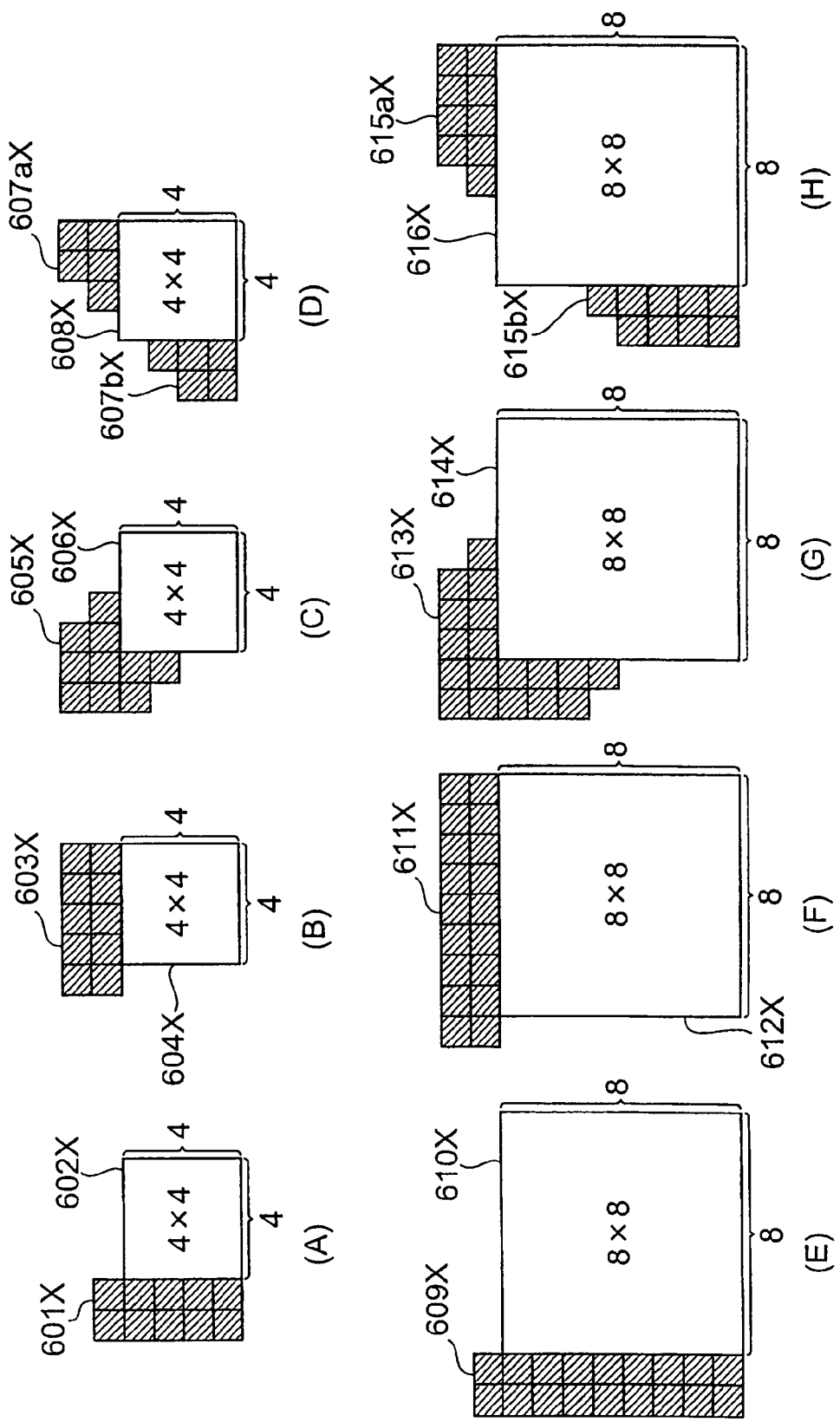
FIGS. 34A to 34H are diagrams showing further examples of the shape of an object adjacent region.

The texture generator 308X performs the processing shown in FIG. 32 in respect of the object adjacent region having the shape shown in FIG. 33D and generates a corresponding texture signal. Furthermore, the other texture generators (not illustrated) respectively generate texture signals by using object adjacent regions of the shapes shown in FIGS. 33A, 33B and 33C.

In this way, the texture generators 307X, 308X and the other texture generators which are not illustrated respectively generate M texture signals (M=5) which are output to the synthesizer 301X. FIGS. 33A to 33D show a case where the object block consists of 2□2 pixels, but as shown in FIGS. 34A to 34H, texture signals are generated by a similar process in cases where the object block is 4□4 pixels or 8□8 pixels. If the object block is 4□4 pixels, then the region 601X can be envisaged in respect of the object block 602X, the region 603X can be envisaged in respect of the object block 604X, the region 605X can be envisaged in respect of the object block 606X and the regions 607aX and 607bX can be envisaged in respect of the object block 608X. Furthermore, in a similar manner, if the object block is 8☐8 pixels, then the region 609X can be envisaged in respect of the object block 610X, the region 611X can be envisaged in respect of the object block 612X, the region 613X can be envisaged in respect of the object block 614X and the regions 615aX and 615bX can be envisaged in respect of the object block 616X.

Next, the operation of the first extrapolator 309X will be described. The signal extrapolator 309X generates a texture signal by so-called signal extrapolation, which means using pixels formed by directly repeating already reproduced pixel values which are adjacent to the object block (for example, the object block 402X). FIGS. 18A to 18I are schematic drawings showing the generation of texture signals using this method. In FIG. 18A, a signal is extrapolated by repeating the values of the already reproduced pixels 1801X (A to D) situated above the object block 1802X, in the direction of the arrows. In FIG. 18B, a signal is extrapolated by repeating the already reproduced pixels 1803X (I to L) in the direction of the arrows. In FIG. 18C, the pixel values of the object block 1806X are found by the average of the pixels 1805 (A to D and I to L) which have already been reproduced.

The processing from FIG. 18D to FIG. 18I respectively involves forming a signal through extrapolating a signal by repeating the already reproduced pixels (1807 to 1817) in the direction of the arrows, as shown in each diagram. The N extrapolators (where N=9) shown in FIG. 30, namely, the first extrapolator 309X to the Nth extrapolator 310X, generate N texture signals by means of these respective methods and output the generated texture signals to the synthesizer 301X.

Next, the composition shown in FIG. 30 will be described. The synthesizer 301X synthesizes the plurality of (M+N) texture signals by subjecting the plurality of input texture signals to a previously determined calculational process, and outputs the result via the line L202X. In the present embodiment, a plurality of K synthesized texture signals (or texture signals) are generated from the input plurality of texture signals.

More specifically, the synthesizer 301X generates a first synthesized texture signal by averaging the texture signals from the texture generators 307X and 308X. In this case, the weighting value of the weighting devices 303X and 304X is (1/M) and the weighting value of the weighting devices 305X and 306X is zero. Furthermore, the synthesizer 301X generates a second synthesized texture signal using the output from the first extrapolator 309X. In this case, the weighting value of the weighting device 305X is 1 and the weighting value of the other weighting devices is zero. Furthermore, the synthesizer 301X generates a third synthesized texture signal using the output from the Nth extrapolator 310X. In this case, the weighting value of the weighting device 306X is 1 and the weighting value of the other weighting devices is zero.

Furthermore, the synthesizer 301X generates and outputs a synthesized texture signals (extrapolated texture signals) which are generated by using the outputs from the other signal extrapolators which are not illustrated. The synthesizer 301X may also generate a plurality of synthesized texture signals by using weighting values other than those stated above. For example, if the weighting value of the weighting device 303X is 1 and the weighting value of the other weighting devices is zero, or if the weighting value of the weighting device 304X is 1 and the weighting value of the other weighting device is zero, then the weighting values of the weighting device 305X and 306X connected to the signal extrapolators can be set respectively to 1/N and the weighting values of the other weighting devices can be set to zero. Furthermore, in a further combination, it is also possible to combine two of the texture signals input to the synthesizer 301X and generate a synthesized texture signal by weighted averaging. In this case, a texture signal may also be synthesized by combining a texture signal from a texture generator and a texture signal from a signal extrapolator.

As described above, the synthesizer 301X should generate a synthesized texture signal (in other words, a prediction signal) by using at least one texture signal, for example, it should create a synthesized texture signal by using the texture signal (or extrapolated texture signal) output from any one texture generator or extrapolator, of the texture generators 307X to 308X and the first extrapolator 309X to the Nth extrapolator 310X.

In this way, a plurality of (K) synthesized texture signals (or texture signals) are sent to the texture signal determination device 202X in FIG. 29 via line L202X, and the texture signal having the closest signal (in other words, the smallest error) with respect to the object block is specified and output as a prediction signal via line L103X.

Figure 35:
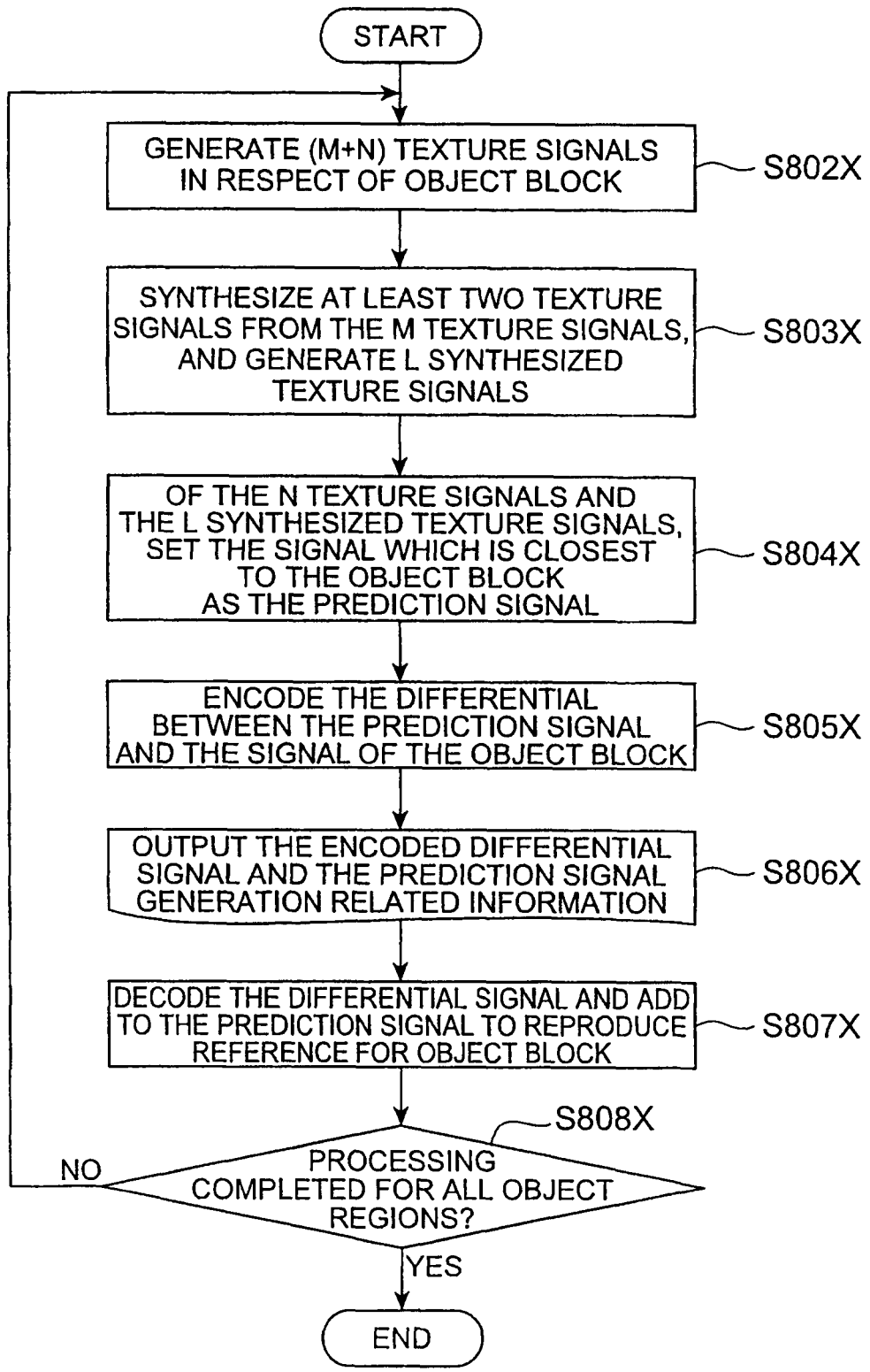
FIG. 35 is a flowchart showing an image predictive encoding method performed in the image predictive encoding apparatus 100X.

FIG. 35 is a flowchart showing an image predictive encoding method in an image predictive encoding apparatus 100X according to an embodiment of the present invention. Firstly, (M+N) texture signals are generated for the object block by the texture generators 308X to 309X and the first extrapolator 309X to the Nth extrapolator 310X (step 802X). Next, at least two texture signals (in the present embodiment, M texture signals) are generated by synthesizing the M texture signals in the synthesizer 301X, and L synthesized texture signals (in the present embodiment L=1) are generated (step 803X). Here, at least two texture signals are generated, but it is sufficient to generate at least one texture signal (or extrapolated texture signal).

The one texture signal or synthesized texture signal which is closest to the object block is selected from the K texture signals consisting of N texture signals and L synthesized texture signals (K=N+L), and the texture signal or synthesized texture signal thus selected is designated as the prediction signal (step 804X). The residual signal which indicates the differential between the prediction signal that has been determined in this way and the signal of the object block is encoded by the converter 106X, the quantizer 107X and the entropy encoder 111X (step S805X). The encoded residual signal and prediction signal generation related information are then output via the output terminal 112X (S806X).

Here, at least one of information relating to which texture generating method should be used to generate the prediction signal and information relating to the weighting values used in the weighting devices is included as prediction signal generation related information. This information is used on the receiving side as a basis for generating a prediction signal. After this processing (or in parallel with same), the residual signal which has been encoded for the purpose of predictive encoding of the following object block is decoded by the inverse quantizer 108X and the inverse transformer 109X. The accumulator 110X adds the prediction signal to the decoded residual signal, thereby reproducing the signal of the object block, which is stored as a reference image in the frame memory 104X (S807X). If the processing has not been completed for all of the object regions, then the procedure returns to S802X, and processing is carried out in respect of the next object block, whereas if processing has been completed then the process terminates (S808X).

Figure 36:
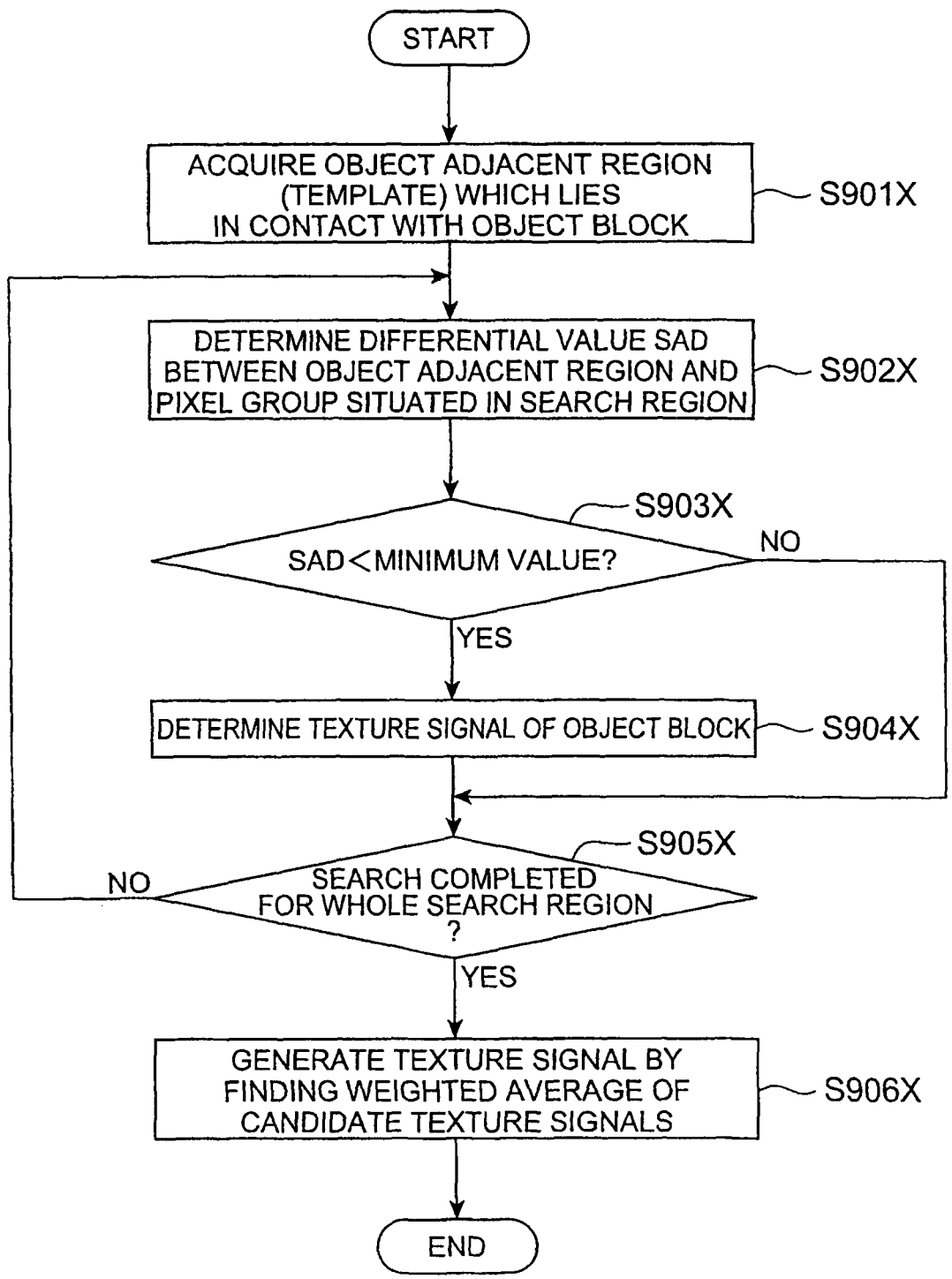
FIG. 36 is a flowchart showing a method of generating a synthesized texture signal according to a modification example.

Next, a modification of the processing illustrated in FIG. 31 above will be described. FIG. 36 is a flowchart showing a method of generating a synthesized texture signal according to a modification example. Firstly, an object adjacent region of the object block is acquired by the first matching device 312X (S901X). Next, the first texture acquisition device 311X determines the sum of absolute differences (SAD) value between the object adjacent region acquired by the first matching device 312X and a pixel group of the same shape which is formed in the search region (S902X).

The first texture acquisition device 311X compares the SAD with a prescribed threshold value and if it is judged to be smaller than the threshold value, then the procedure advances to S904X, whereas if it is not judged to be smaller than the threshold value, then the procedure advances to S905X (S903X). If the SAD value is judged to be smaller than the threshold value, then the texture signal (for example, 407X in FIG. 31) which lies in contact with the predicted adjacent region producing the SAD value that is smaller than the threshold value is saved as a candidate texture signal (S904X). The first matching device 312X then confirms whether or not the whole of the search region has been searched (S905X).

If it is judged that the search has been completed, then the procedure returns to S902X, and the sum of the absolute differences SAD between the object adjacent region and another pixel group situated in the search region is determined (S902X). If the whole search has been completed, then the one or plurality of candidate texture signals thus obtained are all averaged by the first texture acquisition device 311X, thereby generating a texture signal (S906X).

This texture signal is taken together with the other texture signals generated by the texture generator 308X and the first extrapolator 309X to Nth extrapolator 310X described above and the texture signal which is closest to (has the smallest error with respect to) the object block is selected by the texture signal determination device 202X shown in FIG. 29 and the selected texture signal is designated as the prediction signal.

In this embodiment, it is necessary to use the same threshold value on the reproduction side, and therefore the threshold value may be specified in advance on the transmitting side and the receiving side. Furthermore, in a different embodiment, the threshold value can be sent from the transmitting side to the receiving side together with the compressed data, and a synthesized texture signal can be generated on the receiving side by the method shown in FIG. 36, using the received threshold value. In other words, it is possible to send the threshold value to the receiving side by means of the prediction signal generator 103X outputting information indicating the threshold value to the entropy encoder 111X via the line L112X and the entropy encoder 111X then transmitting the threshold value information to the receiving side from the output terminal 112X together with the compressed data.

It is also possible to set an upper limit on the number of candidate texture signals which are averaged, in addition to the threshold value. In this case, if the number of candidate texture signals has exceeded the upper limit, then only a number of candidate texture signals equal to or lower than the upper limit is averaged. Furthermore, this upper limit value may be varied by frame, in which case the transmitting side sends the upper limit value to the receiving side with each frame. For example, similarly to the foregoing description, the prediction signal generator 103X can output this value to the entropy encoder 111X via the line L112X, and send the value to the receiving side via the output terminal 112X. Furthermore, rather than using a threshold value, it is also possible to set the number of candidate texture signals to be averaged and to synthesize this number of candidate texture signals always. The information relating to the set number of candidate texture signals may be sent for each region in a frame, for each frame or for each sequence, or a value previously established on the transmitting side and the receiving side may be used.

The fact that the SAD values determined by the template matching operation described in the method above are smaller than the threshold value means that there is no great difference in these SAD values. In relation to the issue of uncertainty in an optimum solution of this kind, a beneficial effect is obtained in that a prediction signal having a statistically small error can be generated by synthesizing (averaging) a plurality of similar texture signals which are generated by template matching. Furthermore, since these texture signals can be determined universally on the reproduction side (the image predictive decoding apparatus on the receiving side), then the image predictive encoding apparatus according to the present embodiment does not need to send subsidiary information (indicating which texture signals to use in synthesis) to the reproduction side, and therefore a beneficial effect is obtained in that subsidiary information of this kind does not been to be handled in the encoding operation.

In the weighted averaging relating to the present invention, it is also possible to determine the weighting to be used when averaging the candidate texture signals on the basis of a relationship which expresses the SAD value as a prescribed function (for example, an inversely proportional relationship), and to then carry out the weighted averaging process.

Moreover, these weighting values may also be updated heuristically in block units, or frame units. More specifically, they may be updated using a sequential updating formula which is matched to the SAD value.

As a modification example, the processing shown in FIG. 36 may be altered to the following processing. More specifically, in the image predictive encoding apparatus 100X, the positional information in the same frame of the candidate texture signal determined at step 904X is acquired and is stored in a buffer section (not illustrated), and after entropy encoding, the stored positional information is sent to the image predictive decoding apparatus on the receiving side together with a differential signal.

In the image predictive decoding apparatus on the receiving side, the positional information received from the image predictive encoding apparatus 100X is entropy decoded, a plurality of candidate texture signals are acquired from the frame memory on the basis of this positional information, and the weighted average of these signals is derived to generate a texture signal. In other words, according to this modification example, instead of the processing in steps 901X to 905X, the image predictive decoding apparatus carries out a process for acquiring a plurality of candidate texture signals from the frame memory on the basis of the received positional information.

Furthermore, as a further modification example, rather than acquiring the object adjacent region (template) in S901X in FIG. 36, at step S902X, the image predictive encoding apparatus 100X determines the differential value SAD between the object block and a certain pixel group situated in the search region, determines a candidate texture signal and simultaneously acquires the positional information of that candidate texture signal (for example, coordinates information in the frame), and sends this together with the differential signal to the image predictive decoding apparatus on the receiving side. In the image predictive decoding apparatus on the receiving side, the received positional information is entropy decoded, and a plurality of candidate texture signals are acquired from the frame memory on the basis of this positional information, and the weighted average of the acquired candidate texture signals is derived to generate a texture signal.

In this way, the positional information for the candidate texture signal is acquired by the image predictive encoding apparatus 100X and sent to image predictive decoding apparatus on the receiving side, and the image predictive decoding apparatus on the receiving side is able to use this positional information to acquire the candidate texture signals. Therefore, the processing load on the image predictive decoding apparatus on the receiving side can be lightened.

Figure 37:
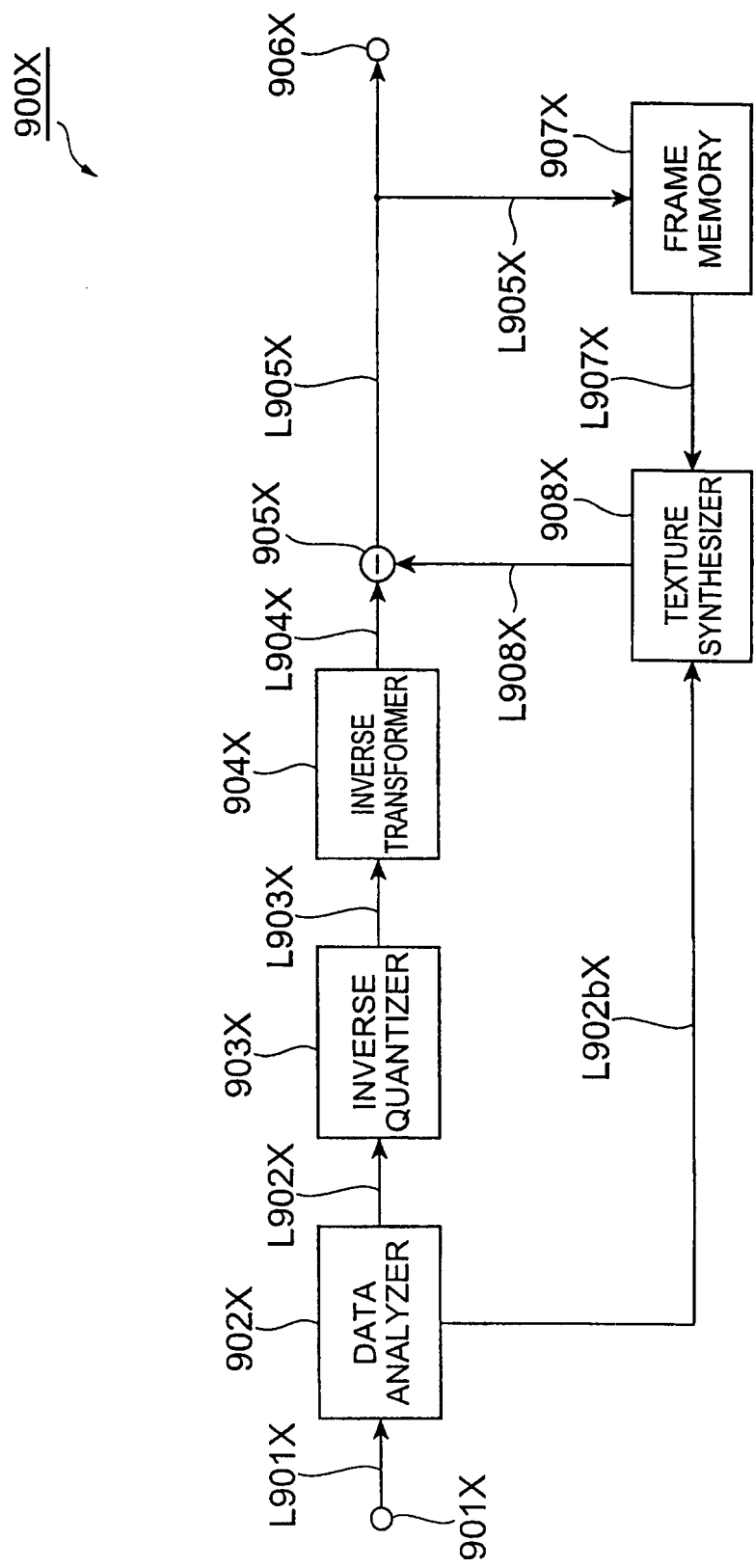
FIG. 37 is a block diagram showing an image predictive decoding apparatus 900X.

Next, the image predictive decoding method according to the present invention will be described. FIG. 37 is a block diagram showing an image predictive decoding apparatus 900X according to the present embodiment. This image predictive decoding apparatus 900X comprises: an input terminal 901X; a data analyzer 902X; an inverse quantizer 903X; an inverse transformer 904X; an accumulator 905X; an output terminal 906X; a frame memory 907X; and a texture synthesizer 908X. The inverse quantizer 903X and the inverse transformer 904X function as a decoding device, but it is also possible to use decoding devices other than these. Furthermore, the inverse converter 904X may be omitted. The compositions of these items are described below.

The input terminal 90X1 inputs compressed data which has been compressed and encoded by the image predictive encoding method described above. This compressed data includes a residual signal obtained by predictive encoding of an object block formed by dividing an image into a plurality of blocks and information relating to the generation of the prediction signal. The prediction signal generation related information which relates to the generation of the prediction signal includes indicator information which states which (either one or a combination of more than one) of the texture generators 307X and 308X, and the first extrapolator 309X and Nth extrapolator 310X shown in FIG. 30, is used. Furthermore, it may also include information relating to the weighting values used in the weighting devices 303X to 306X which are disposed in the synthesizer 301X. Moreover, if generating a synthesized texture signal by using the template matching method described in FIG. 36, the aforementioned threshold value and the upper limit of the number of texture signals to be used in synthesis are included in the information relating to the generation of the prediction signal.

The data analyzer 902X analyzes the compressed data input via the input terminal 901X and extracts the residual signal of the object block, the prediction signal generation related information which relates to the generation of the prediction signal, and the quantization parameters.

The inverse quantizer 903X inverse quantizes the residual signal of the object block on the basis of the quantization parameters (input via line L902X). The inverse converter 904X performs an inverse discrete cosine transform of the data that has been inverse quantized.

The texture synthesizer 908X inputs information relating to the generation of the prediction signal from the data analyzer 902X, via line L902bX. This texture synthesizer 908X acquires a reference image from the frame memory 907X and generates a prediction signal on the basis of the prediction signal generation related information which relates to the generation of the prediction signal (by means of the method described below). The texture synthesizer 908X outputs the generated prediction signal to the accumulator 905X via L908X. The information for generating the prediction signal may be determined in advance, rather than being input as prediction signal generation related information. For example, the threshold value shown in FIG. 36 and the weighting values in the weighting devices 303X to 306X may be stored in advance.

The accumulator 905X adds the prediction signal generated by the texture synthesizer 908X to the residual signal which is decoded by the inverse quantizer 903X and the inverse converter 904X, and outputs the resulting reproduced image for the object block to the output terminal 906X and the frame memory 907X via the line L905X. The output terminal 906X outputs to an external device (such as a display device).

The frame memory 907X stores the reproduced image output from the accumulator 905X as a reference image for use as reference in the next decoding process.

Figure 38:
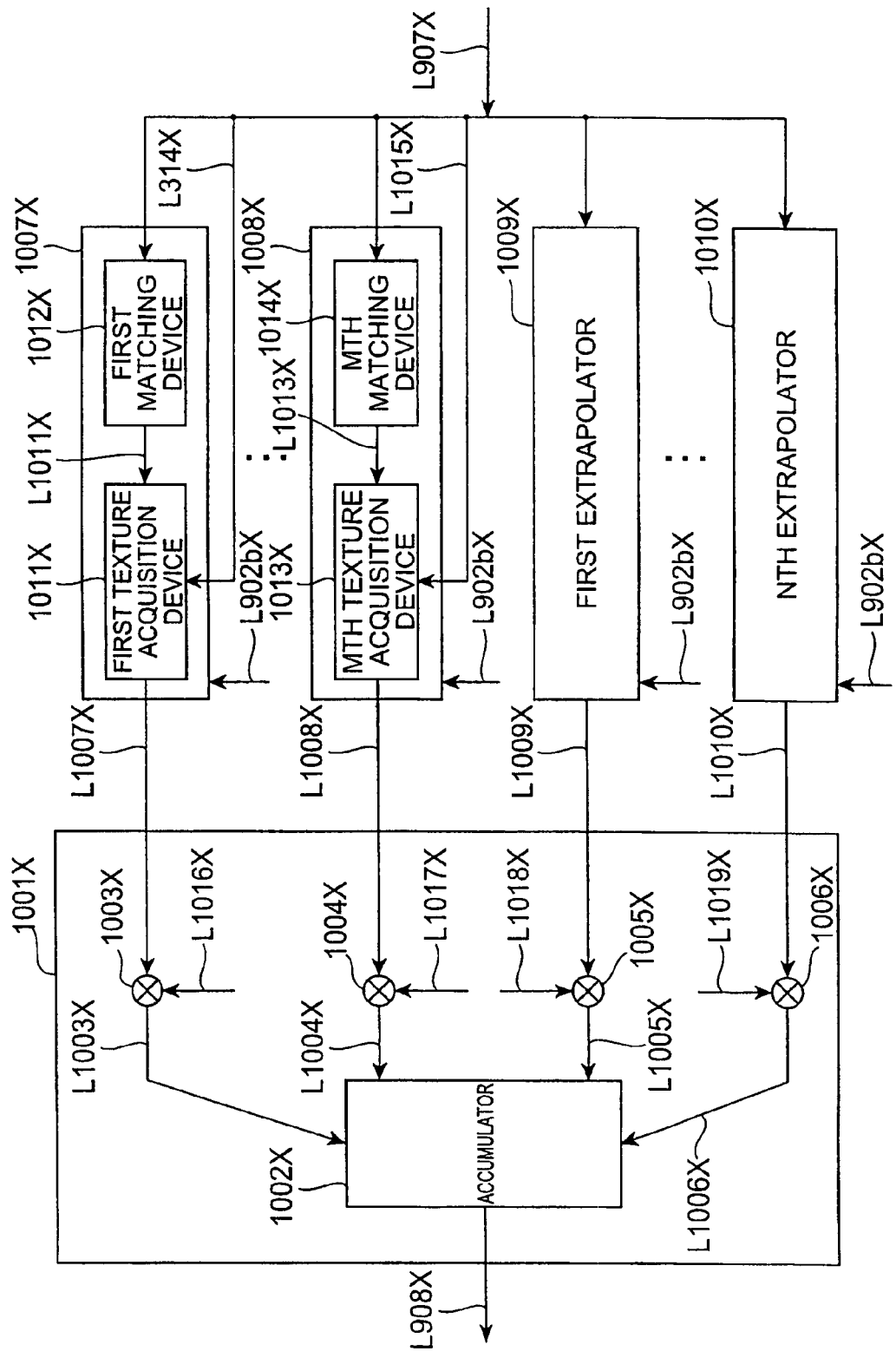
FIG. 38 is a block diagram showing a texture synthesizer 908X.

Next, the texture synthesizer 908X will be described. The details of the texture synthesizer 908X are shown in FIG. 38, and essentially, it has a composition similar to that shown in FIG. 30, or equivalent functions. The prediction signal generation related information which relates to the generation of the prediction signal and is input via the line L902bX is used to control which of the texture generators 1007X to 1008X or the first extrapolator 1009X to the Nth extrapolator 1010X is used to generate a texture signal.

For example, when prediction signal generation related information which indicates that the texture generators 1007X to 1008X are to be used for the object block that is the object of reproduction is received, only the texture generators 1007X to 1008X are operated, while the first extrapolator 1009X to the Nth extrapolator 1010X are not operated. Furthermore, for example, if prediction signal generation related information which indicates that the first extrapolator 1009X is to be used in generating a texture signal is received, then the other units, namely, the Nth extrapolator 1010X and the texture generators 1007X to 1008X, do not operate. It is also possible to generate prediction signal generation related information which involves other combinations to these. For example, it is also possible to have prediction signal generation related information which indicates that only the texture generator 1007X and the first extrapolator 1009X are to be used.

As described above, the synthesizer 1001X should generate a synthesized texture signal (in other words, a prediction signal) by using at least one texture signal, for example, it should create a synthesized texture signal by using the texture signal (or extrapolated texture signal) output from any one texture generator or extrapolator, of the texture generators 1007X to 1008X and the first extrapolator 1009X to the Nth extrapolator 1010X, on the basis of the prediction signal generation related information received via line 902bX.

The texture generators 1007X and 1008X respectively generate texture signals by the same process as the texture generators 307X and 308X shown in FIG. 30. The details of these processes are as described above. Furthermore, the first extrapolator 1009X and the Nth extrapolator 1010X respectively generate a texture signal by the same method as the first extrapolator 309X and the Nth extrapolator 310X shown in FIG. 30.

In this way, a texture signal is generated by the texture generator 1007X or 1008X, or the first extrapolator 1009X or the Nth extrapolator 1010X, which is specified by the prediction signal generation related information relating to the generation of the prediction signal (which is input via line L902bX). The texture signal thus generated is sent to the synthesizer 1001X. In the present embodiment, the weighted average of the transmitted texture signals is found using the weighting values pre-determined in the weighting device 1003X to 1006X, and the result is sent to the accumulator 1002X. The accumulator 1002X adds together the weighted texture signals and outputs these summed texture signals via the line L908X as a prediction signal. If the weighting values used in the weighting devices 1003X to 1006X are not specified in advance, then it is possible to employ weighting values which are appended to the prediction signal generation related information which relates to the generation of the prediction signal, in the weighting devices 1003X to 1006X.

In FIG. 38, if a texture signal is generated by texture generators only, then the signal extrapolators can be omitted. In this case, the prediction signal generation related information which relates to the generation of the prediction signal does not need to include indicator information which indicates whether to use a texture generator, or the first extrapolator to Nth extrapolator.

As described above, if positional information for a candidate texture signal determined on the basis of the object adjacent region or the object block is received from the image predictive encoding apparatus 100X, then the image predictive decoding apparatus 900X entropy decodes the received positional information, acquires a plurality of candidate texture signals from the frame memory 907X on the basis of this positional information, and generates a texture signal by weighted averaging of the acquired candidate texture signals. By this means, it is possible to reduce the processing involved in generating candidate texture signals.

Figure 39:
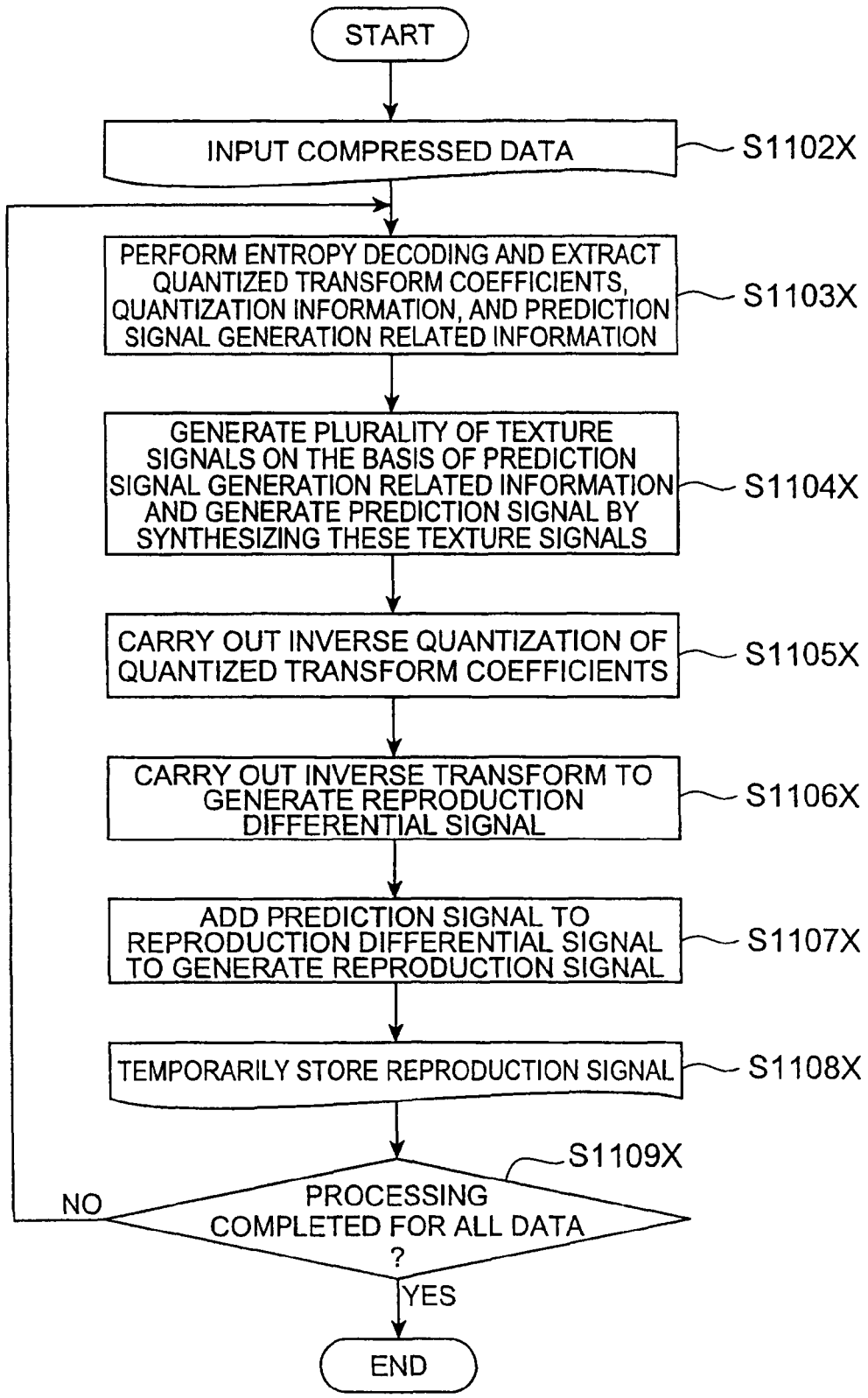
FIG. 39 is a flowchart showing an image predictive decoding method performed in the image predictive decoding apparatus 900X.

Next, an image predictive decoding method carried out in the image predictive decoding apparatus 900X according to the present embodiment will be described with reference to FIG. 39. Firstly, compressed data is input via the input terminal 901 (S1102X). The data analyzer 902X then performs entropy decoding of the compressed data, and extracts the quantized transform coefficient, the quantization parameters, and the prediction signal generation related information (step S1103X). A plurality of texture signals are generated by the texture synthesizer 908X on the basis of the prediction signal generation related information that has been extracted, and a prediction signal is generated by synthesizing the plurality of texture signals thus generated (step S1104X).

On the other hand, the quantized transform coefficient is inverse quantized using the quantization parameter in the inverse quantizer 903X and inverse transformed in the inverse transformer 904X, to generate a reproduction differential signal (S1105X, S1106X). The prediction signal thus generated is added to the reproduction differential signal, thereby generating a reproduced signal (S1107X). The reproduced signal thus generated is stored in the frame memory in order to reproduce the next object block (S1108X). When there is subsequent compressed data, this process is repeated again (S1103X), and all of the data is processed until the very end of the data (step S1109X). If necessary, the procedure may return to step S1102X in order to take in compressed data.

The image predictive encoding method and the image predictive decoding method relating to the present embodiment can be provided by being stored on a recording medium in the form of a program. Examples of the recording medium include: a floppy disk (registered trademark), CD-ROM, DVD, or ROM, or a semiconductor memory, or the like.

Figure 40:
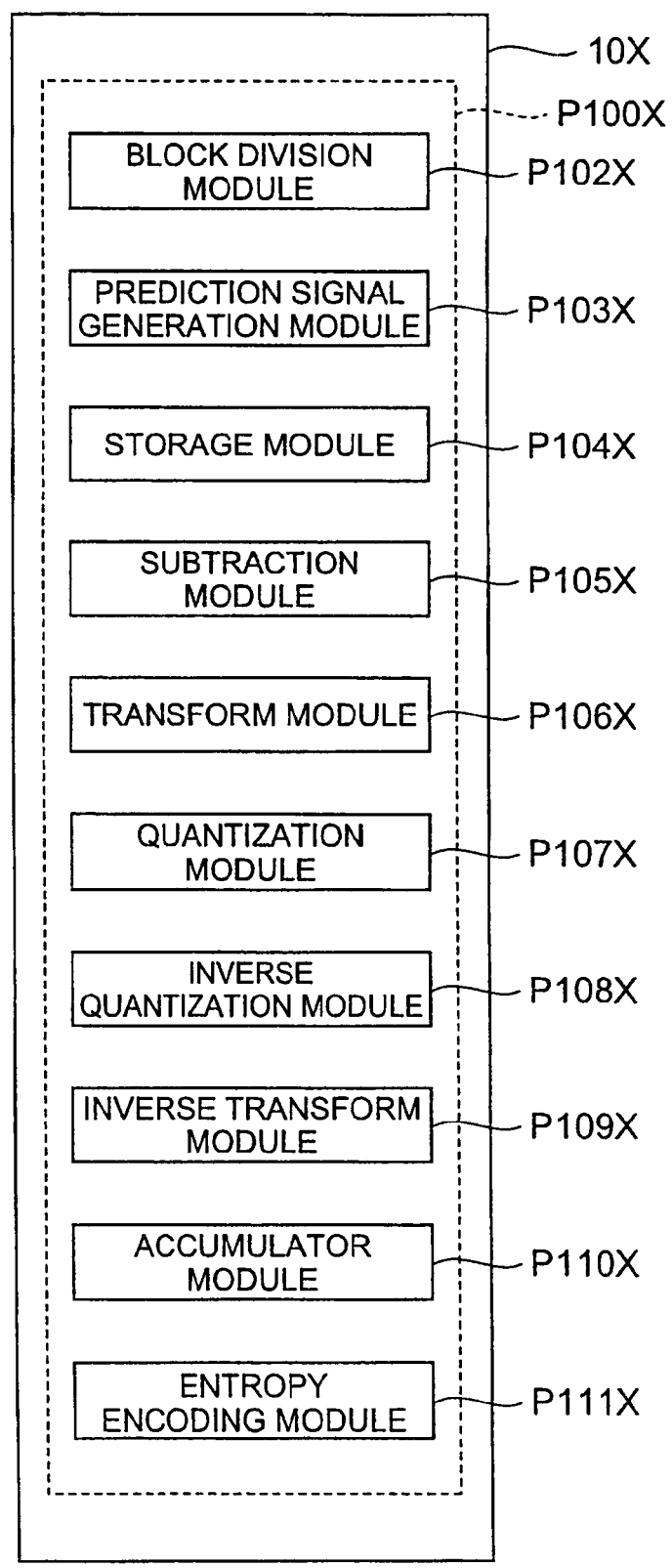
FIG. 40 is a block diagram showing modules of a program which is able to execute the image predictive encoding method.
Figure 41:
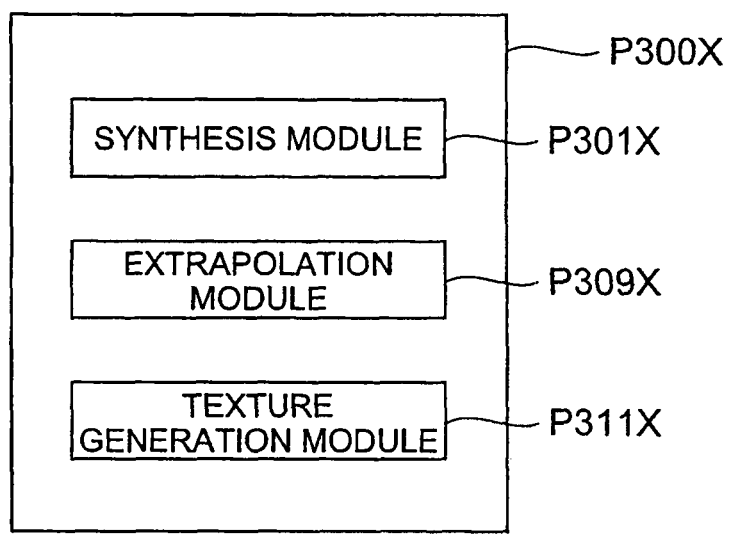
FIG. 41 is a block diagram showing the modules of a prediction signal generating module P103X.

FIG. 40 is a block diagram showing modules of a program which is able to execute the image predictive encoding method. The image predictive encoding program P100X comprises: a block division module P102X; a prediction signal generation module P103X; a storage module P104X; a subtraction module P105X; a transform module P106X; a quantization module P107X; an inverse quantization module P108X; an inverse transform module P109X; an accumulator module P110X and an entropy encoding module P111X. As shown in FIG. 41, the prediction signal generation module P103X is constituted by a synthesis module P301X, a texture generation module P311X, and an extrapolation module P309X.

The functions which are realized by running the respective modules described above are the same as the respective constituents of the image predictive encoding apparatus 100X described above. More specifically, the functions of the respective modules of the image predictive encoding program P100X are the same as the functions of the block divider 102X, the prediction signal generator 103X, the frame memory 104X, the subtracter 105X, the transformer 106X, the quantizer 107X, the inverse quantizer 108X, the inverse transformer 109X, the accumulator 110X, and the entropy encoder 111X.

Figure 42:
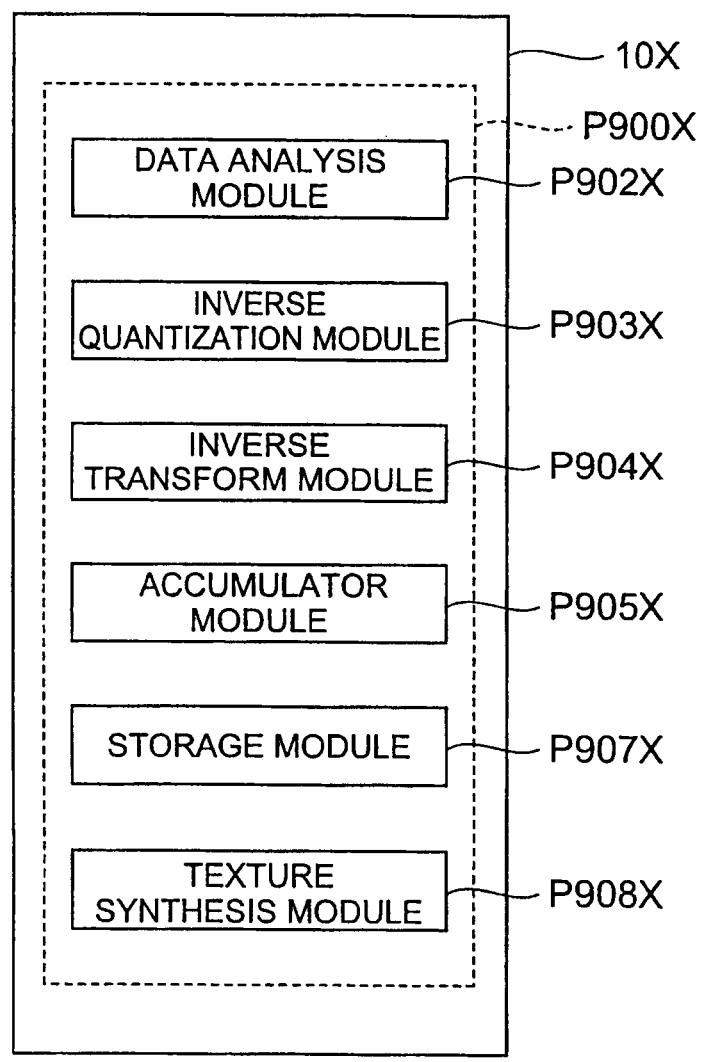
FIG. 42 is a block diagram showing modules of a program which is able to execute the image predictive decoding method.

Furthermore, FIG. 42 is a block diagram showing the modules of a program which is able to implement the image predictive decoding method. The image predictive decoding program P900X comprises: a data analysis module P902X; an inverse quantization module P903X; an inverse transform module P904X; an accumulator module P905X; a storage module P907X; and a texture synthesis module P908X.

The functions which are realized by running the respective modules described above are the same as the respective constituent elements of the image predictive decoding apparatus 900X described above. In other words, the functions of the respective modules of the image predictive decoding program P900X are similar to the functions of the data analyzer 902X; the inverse quantizer 903X; the inverse transformer 904X; the accumulator 905X; the frame memory 907X; and the texture synthesizer 908X.

The image predictive encoding program P100X or the image predictive decoding program P900X having the aforementioned composition is stored on the recording medium 10 and is executed by the computer which was described above.

Figure 18:
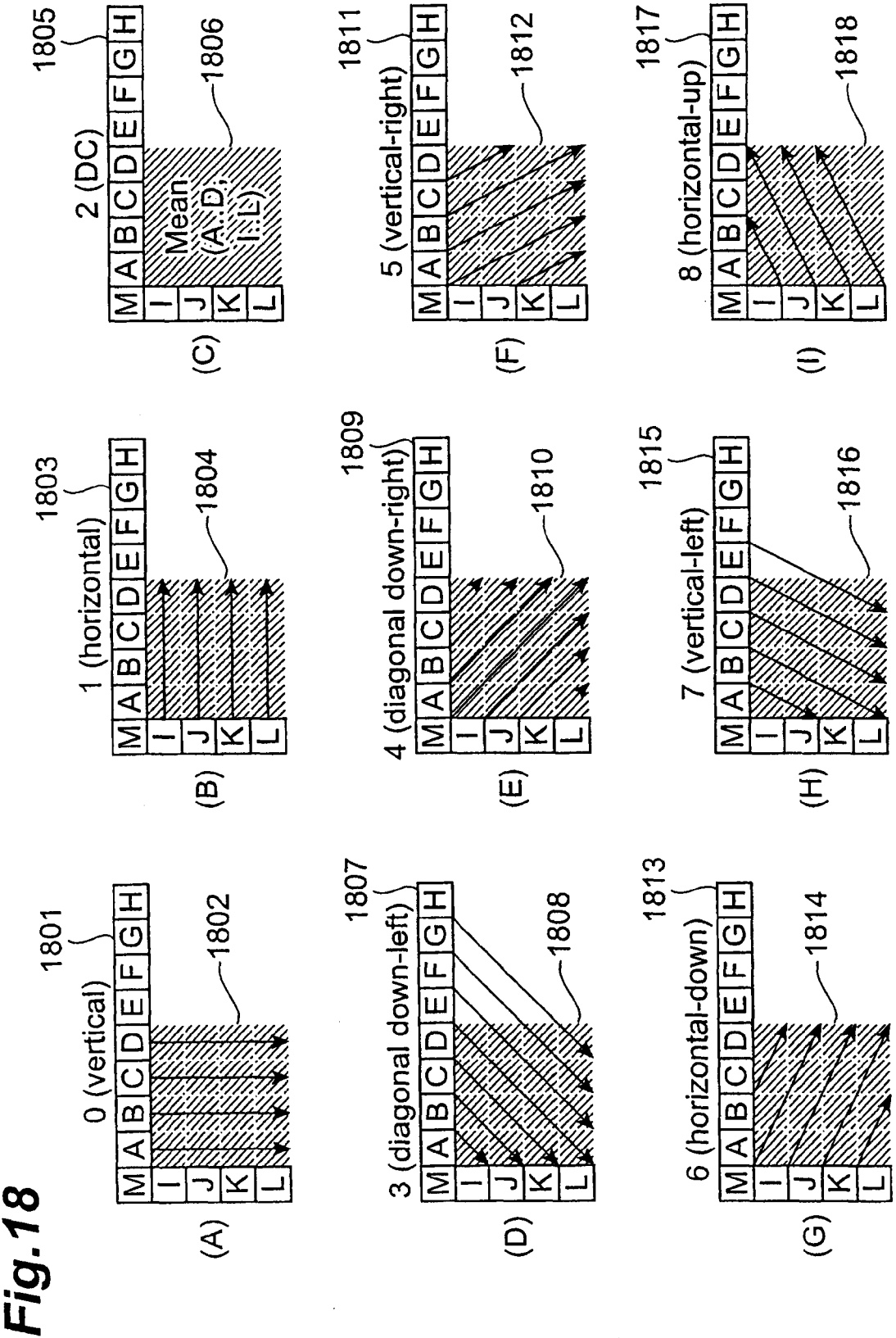
FIGS. 18A to 18I are schematic drawings for illustrating an intra-frame prediction method.

As stated previously, FIG. 17 is a diagram showing the hardware composition of a computer for executing a program stored on a recording medium, and FIG. 18 is a perspective diagram of a computer for executing a program stored on a recording medium. The computer may include a DVD player, set-top box, portable telephone, or the like which is equipped with a CPU and implements processing and control on the basis of software.

As shown in FIG. 17, the computer 30 comprises: reading unit 12, such as a floppy disk drive, a CD-ROM drive, or a DVD drive; a working memory (RAM) 14 where the operating system resides permanently; a memory 16 which stores a program recorded on a recording medium 10; a display apparatus 18 such as a display monitor; a mouse 20 and keyboard 22 forming input apparatuses; a communications apparatus 24 for sending and receiving data, and the like; and a CPU 26 for controlling the execution of the program. When the recording medium 10 is inserted into the reading unit 12, the computer 30 becomes able to access the image predictive encoding and decoding programs stored on the recording medium 10, via the reading unit 12, and therefore is able to operate as an image encoding apparatus or an image decoding apparatus relating to the present invention, in accordance with the image encoding or decoding program.

As shown in FIG. 18, the image predictive encoding program or the image decoding program can also be provided via a network as a computer data signal 40 which is superimposed on a carrier wave. In this case, the computer 30 stores the image predictive encoding program or image decoding program received via a reception apparatus 24, in a memory 16, and is able to execute the image predictive encoding program or image predictive decoding program.

In this way, according to the image predictive encoding apparatus, the image predictive decoding apparatus, the image predictive encoding method, the image predictive decoding method, the image predictive encoding program and the image predictive decoding program of the present invention, it is possible to prevent decline in prediction accuracy in respect of pixels which are situated distantly from the boundaries of the object block when generating an intra-frame prediction signal by means of an extrapolation method which is used in the prior art, and therefore an image signal having a complex pattern can be predicted in a highly efficient manner.

Next, the action and beneficial effects of the image predictive encoding apparatus 100X according to the present embodiment will be described. In the image predictive encoding apparatus 100X according to the present embodiment, an input image which is input via the input terminal 101X is divided into a plurality of regions by the block divider 102X, and the prediction signal generator 103X generates a prediction signal in respect of the object pixel signal of a certain object region which is the object of processing, from among the plurality of divided regions. The subtracter 105X generates a residual signal between the generated prediction signal and the object pixel signal, and the transformer 106X, the quantizer 107X and the entropy encoder 111X are able to encode the residual signal and thereby generate compressed data.

Here, the prediction signal generator 103X generates a texture signal on the basis of an adjacent region comprising an already reproduced pixel signal adjacent to the object pixel signal, and is able to generate a prediction signal by processing the generated texture signal by using a pre-determined texture synthesis method. By this means, since the prediction signal is generated by using an image texture synthesis method, it is possible to prevent decline in the prediction accuracy in relation to pixels which are situated distantly from the boundaries of the object block, and hence a prediction signal can be generated efficiently even in the case of complex texture signals.

Here, the prediction signal generator 103X generates a plurality of texture signals having a high correlation to an adjacent region on the basis of the adjacent region comprising an already reproduced pixel signal adjacent to the object pixel signal, and is able to generate a prediction signal by processing the plurality of generated texture signals by using a pre-determined synthesis method. By this means, it is possible to use characteristics which show a high correlation between the object block and the "object adjacent region" which is adjacent to the object block, and therefore it is possible to prevent decline in prediction accuracy in relation to pixels that are situated distantly from the boundaries of the object block, and a prediction signal can be generated efficiently even in the case of complex texture signals.

Here, the prediction signal generator 103X generates a plurality of texture signals each respectively having a high correlation to one of a plurality of adjacent regions on the basis of the plurality of adjacent regions each comprising an already reproduced pixel signal adjacent to the object pixel signal, and a prediction signal can be generated by processing the plurality of generated texture signals by using a pre-determined synthesis method. By this means, it is possible to use characteristics which show a high correlation between the object block and the "object adjacent region" which is adjacent to the object block, and therefore it is possible to prevent decline in prediction accuracy in relation to pixels that are situated distantly from the boundaries of the object block and a prediction signal can be generated efficiently even in the case of complex texture signals.

Furthermore, the prediction signal generator 103X generates an extrapolated texture signal by forming pixels by repeating an already reproduced pixel value which is adjacent to an object pixel signal, by means of the first extrapolator 309X or the Nth extrapolator 310X, and is able to generate a prediction signal by synthesizing the texture signal and the extrapolated texture signal by using a pre-determined synthesis method. By this means, it is possible to prevent decline in the prediction accuracy in relation to pixels which are situated distantly from the boundaries of the object block, and a prediction signal can be generated efficiently even in the case of complex texture signals.

Furthermore, the prediction signal generator 103X searches in a search region which is a pre-determined image that has already been reproduced to find a predicted adjacent region having a high correlation to the adjacent region comprising an already reproduced pixel signal that is adjacent to the object pixel signal, and is able to set the image region specified on the basis of the predicted adjacent region thus found, as a texture signal. Consequently, by using characteristics which show a high correlation between the object block and the "object adjacent region" adjacent to same, the region having the smallest error with respect to the object adjacent region is determined as a predicted adjacent region from the already reproduced image region, and the group of pixels which correspond to the object block and lie adjacently to this predicted adjacent region are taken as a texture signal for the object block. By this means, it is possible to generate a prediction signal having the same pattern as the object adjacent region, even in the case of complex texture, and furthermore, it is also possible to generate a texture signal of the same pattern even at a distant position from the boundaries of the object block.

Furthermore, the entropy encoder 111X is able to encode the related information which indicates the texture synthesis method (for example, the weighting values, information stating the type of texture generator to use, and so on), and send the encoded related information via the output terminal 112X, together with the encoded signal. By this means, since the image texture synthesis method can be reported to the receiving side and the receiving side can generate a prediction signal by using the image texture synthesis method thus reported, it is possible to prevent decline in the prediction accuracy in relation to pixels which are situated distantly from the boundaries of the object block, and hence a prediction signal can be generated efficiently even in the case of complex texture signals.

Furthermore, the texture synthesizer 201X is able to generate a prediction signal through synthesis by taking a plurality of texture signals relating to the object pixel signal which have been generated by the texture generators 307X and 308X and the first extrapolator 309X to Nth extrapolator 310X, and subjecting these texture signals to a weighted averaging process using pre-determined weighting coefficients in the synthesizer 301X (weighting devices 303X to 306X). By this means, a beneficial effect is obtained in that a prediction signal having low statistical error can be generated, by synthesizing (averaging) texture signals generated by template matching.

Moreover, in respect of the issue of uncertainty in cases where there is no large difference in the differential values found by matching with the already reproduced image region (template matching) on the basis of the "object adjacent region", a beneficial effect is obtained in that a prediction signal having low statistical error can be generated by synthesizing (averaging) the texture signals generated by template matching. Furthermore, according to the present invention, by synthesizing a plurality of texture signals, a beneficial effect is obtained in suppressing coding distortion contained in the respective textures, and hence a prediction signal having low error can be generated.

Furthermore, for example, the texture generator 307X generates at least one texture signal having a high correlation to an adjacent region on the basis of the adjacent region comprising an already reproduced pixel signal that is adjacent to the object pixel signal, from a first search region which is within the same frame as the object pixel signal, and for example, the texture generator 308X generates at least one texture signal having a high correlation to an adjacent region on the basis of the adjacent region comprising an already reproduced pixel signal that is adjacent to the object pixel signal, from a second search region which is in a different frame to the first search region, and a prediction signal can be generated by synthesizing the respectively generated texture signals by using a pre-determined texture synthesis method. By this means, since the prediction signal is generated by using an image texture synthesis method, it is possible to prevent decline in the prediction accuracy in relation to pixels which are situated distantly from the boundaries of the object block, and hence a prediction signal can be generated efficiently even in the case of complex texture signals.

Furthermore, an input image which is input via the input terminal 101X is divided into a plurality of regions by the block divider 102X, and the prediction signal generator 103X generates a prediction signal in respect of the object pixel signal of a certain object region which is the object of processing, from among the plurality of divided regions. The subtracter 105X generates a residual signal between the generated prediction signal and the aforementioned object pixel signal, and the residual signal thus generated can be encoded by the transformer 106X, the quantizer 107X and the entropy encoder 111X to create a compressed signal. Moreover, in the prediction signal generator 103X, the first extrapolator 309X and the Nth extrapolator 310X generate at least one extrapolated texture signal by forming pixels by repeating an already reproduced pixel value which is adjacent to an object pixel signal, and a prediction signal can be generated by synthesizing the extrapolated texture signal in the synthesizer 301X by using a pre-determined synthesis method. By this means, it is possible to prevent decline in the prediction accuracy in relation to pixels which are situated distantly from the boundaries of the object block, and a prediction signal can be generated efficiently even in the case of complex texture signals.

Next, the action and beneficial effects of the image predictive decoding apparatus 900X will be described. In the image predictive decoding apparatus 900X, the data analyzer 902X extracts the residual signal relating to the object region which is the object of processing, from the compressed data which is input via the input terminal 901X, and the inverse quantizer 903X and the inverse transformer 904X restore same to a reproduction residual signal. The texture synthesizer 908X generates a prediction signal relating to the object pixel signal of the object region, the accumulator 905X restores the pixel signal of the object region by adding the generated prediction signal to the restored reproduction residual signal, and the restored pixel signal can be stored in the frame memory 907X as a reference image. Thereupon, a texture signal is generated on the basis of an adjacent region comprising an already reproduced pixel signal adjacent to the object pixel signal, which is stored in the frame memory 907X, and a prediction signal can be generated by processing the generated texture signal by using a pre-determined synthesis method.

Here, the texture synthesizer 908X generates a plurality of texture signals having a high correlation to an adjacent region on the basis of the adjacent region comprising an already reproduced pixel signal adjacent to the object pixel signal, and is able to generate a prediction signal by processing the plurality of generated texture signals by using a pre-determined synthesis method. By this means, it is possible to use characteristics which show a high correlation between the object block and the "object adjacent region" which is adjacent to the object block, and therefore it is possible to prevent decline in prediction accuracy in relation to pixels that are situated distantly from the boundaries of the object block and a prediction signal can be generated efficiently even in the case of complex texture signals.

Here, the texture synthesizer 908X generates a plurality of texture signals each respectively having a high correlation to a one of a plurality of adjacent regions on the basis of the plurality of adjacent regions each comprising an already reproduced pixel signal adjacent to the object pixel signal, and is able to generate a prediction signal by processing the plurality of generated texture signals by using a pre-determined synthesis method. By this means, it is possible to use characteristics which show a high correlation between the object block and the "object adjacent region" which is adjacent to the object block, and therefore it is possible to prevent decline in prediction accuracy in relation to pixels that are situated distantly from the boundaries of the object block and a prediction signal can be generated efficiently even in the case of complex texture signals.

Furthermore, the first extrapolator 1009X or the Nth extrapolator 1010X of the texture synthesizer 908X generates an extrapolated texture signal by forming pixels by repeating an already reproduced pixel value which is adjacent to an object pixel signal, and a prediction signal can be generated by synthesizing the texture signal and the extrapolated texture signal by using a pre-determined synthesis method. By this means, it is possible to prevent decline in the prediction accuracy in relation to pixels which are situated distantly from the boundaries of the object block, and a prediction signal can be generated efficiently even in the case of complex texture signals.

Furthermore, the texture synthesizer 908X searches in a search region which is a pre-determined image that has already been reproduced to find a predicted adjacent region having a high correlation to the adjacent region comprising an already reproduced pixel signal that is adjacent to the object pixel signal, and is able to set the image region specified on the basis of the predicted adjacent region thus found, as a texture signal. Consequently, by using characteristics which show a high correlation between the object block and the "object adjacent region" adjacent to same, the region having the smallest error with respect to the object adjacent region is determined as a predicted adjacent region from the already reproduced image region, and the group of pixels which correspond to the object block and lie adjacently to this predicted adjacent region are taken as a texture signal for the object block. By this means, it is possible to generate a prediction signal having the same pattern as the object adjacent region, even in the case of complex texture, and furthermore, it is also possible to generate a texture signal of the same pattern even at a distant position from the boundaries of the object block.

The texture generator 908X is able to generate a prediction signal by synthesizing the plurality of texture signals relating to the object pixel signal by weighted averaging using pre-determined weighting coefficients. By this means, a beneficial effect is obtained in that a prediction signal having low statistical error can be generated, by synthesizing (averaging) texture signals generated by template matching.

Moreover, in respect of the issue of uncertainty in cases where there is no large difference in the differential values found by matching with the already reproduced image region (template matching) on the basis of the "object adjacent region", a beneficial effect is obtained in that a prediction signal having low statistical error can be generated by synthesizing (averaging) the texture signals generated by template matching. Furthermore, according to the present invention, by synthesizing a plurality of texture signals, a beneficial effect is obtained in suppressing coding distortion contained in the respective textures, and hence a prediction signal having low error can be generated.

Furthermore, in the texture synthesizer 908X, for example, the texture generator 1007X generates at least one texture signal having a high correlation to an adjacent region on the basis of the adjacent region comprising an already reproduced pixel signal that is adjacent to the object pixel signal, from a first search region which is within the same frame as the object pixel signal, and furthermore, for example, the texture generator 1008X generates at least one texture signal having a high correlation to an adjacent region on the basis of the adjacent region comprising an already reproduced pixel signal that is adjacent to the object pixel signal, from a second search region which is in a different frame to the first search region, and the synthesizer 1001X is able to generate a prediction signal by synthesizing the respectively generated texture signals by using a pre-determined texture synthesis method. By this means, since the prediction signal is generated by using an image texture synthesis method, it is possible to prevent decline in the prediction accuracy in relation to pixels which are situated distantly from the boundaries of the object block, and hence a prediction signal can be generated efficiently even in the case of complex texture signals.

Furthermore, in the image predictive decoding apparatus 900X, the data analyzer 902X extracts a texture signal relating to the object region from the compressed data, the inverse quantizer 903X and the inverse transformer 904X restore a reproduction residual signal, and the texture synthesizer 908X generates a prediction signal relating to the object pixel signal of the object region. The accumulator 905X adds together the prediction signal and the reproduction residual signal, thereby restoring a pixel signal for the object region. Furthermore, in the texture synthesizer 908X, the first extrapolator 1009X and the Nth extrapolator 1010X generate at least one extrapolated texture signal by forming pixels by repeating an already reproduced pixel value which is adjacent to an object pixel signal, and a prediction signal can be generated by synthesizing the extrapolated texture signals by using a pre-determined synthesis method. By this means, it is possible to prevent decline in the prediction accuracy in relation to pixels which are situated distantly from the boundaries of the object block, and a prediction signal can be generated efficiently even in the case of complex texture signals.

According to the present embodiment, it is possible to conceive both the image predictive encoding method and the image predictive decoding method described below.

In other words, in an image predictive encoding method, desirably, the prediction signal generating step described above generates a plurality of texture signals having a high correlation to an adjacent region on the basis of the adjacent region comprising an already reproduced pixel signal adjacent to the object pixel signal, and a prediction signal is generated by processing the plurality of generated texture signals by using a pre-determined synthesis method.

Furthermore, in an image predictive encoding method, desirably, the prediction signal generating step described above generates a plurality of texture signals each having a high correlation to one of a plurality of adjacent regions on the basis of the plurality of adjacent regions which each comprise an already reproduced pixel signal adjacent to the object pixel signal, and a prediction signal is generated by processing the plurality of generated texture signals by using a pre-determined synthesis method.

Furthermore, in an image predictive encoding method, desirably, the prediction signal generating step described above also generates an extrapolated texture signal by forming pixels by repeating an already reproduced pixel value which is adjacent to the object pixel signal, and generates a prediction signal by synthesizing the texture signal and the extrapolated texture signal by using a pre-determined synthesis method.

Furthermore, in the image predictive encoding method, desirably, the prediction signal generating step described above searches in a search region which is a pre-determined image that has already been reproduced to find a predicted adjacent region having a high correlation to the adjacent region comprising an already reproduced pixel signal that is adjacent to the object pixel signal, and sets the image region specified on the basis of the predicted adjacent region thus found, as a texture signal.

Furthermore, in an image predictive decoding method, desirably, the prediction signal generating step described above generates a plurality of texture signals having a high correlation to an adjacent region on the basis of the adjacent region comprising an already reproduced pixel signal adjacent to the object pixel signal, and a prediction signal is generated by processing the plurality of generated texture signals by using a pre-determined synthesis method.

Furthermore, in an image predictive decoding method, desirably, the prediction signal generating step described above generates a plurality of texture signals each having a high correlation to one of a plurality of adjacent regions on the basis of the plurality of adjacent regions which each comprise an already reproduced pixel signal adjacent to the object pixel signal, and a prediction signal is generated by processing the plurality of generated texture signals by using a pre-determined synthesis method.

Furthermore, in an image predictive decoding method, desirably, the prediction signal generating step described above also generates an extrapolated texture signal by forming pixels by repeating an already reproduced pixel value which is adjacent to the object pixel signal, and generates a prediction signal by synthesizing the texture signal and the extrapolated texture signal by using a pre-determined synthesis method.

Furthermore, in an image predictive decoding method, desirably, the prediction signal generating step described above searches in a search region which is a pre-determined image that has already been reproduced to find a predicted adjacent region having a high correlation to the adjacent region comprising an already reproduced pixel signal that is adjacent to the object pixel signal, and sets the image region specified on the basis of the predicted adjacent region thus found, as a texture signal.

The invention claimed is:

1. An image predictive encoding apparatus, comprising:
  one or more processing units configured to function as:
    a block divider that divides an input image into a plurality of regions;
    a prediction signal generator that generates a prediction signal for an object pixel signal of an object region which is a processing object, of the plurality of regions divided by the block divider;

a residual signal generator that generates a residual signal between the prediction signal generated by the prediction signal generator and the object pixel signal; and an encoder that encodes the residual signal generated by the residual signal generator, wherein the prediction signal generator includes:

a prediction related information generator that generates, as prediction related information, a method for generating a signal having a high correlation with the object pixel signal of the object region from an already reproduced signal, a texture synthesizer that generates a prediction signal for the object region on the basis of the prediction related information generated by the prediction related information generator, and the texture synthesizer generating a template signal of a specified region which is determined on the basis of the prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method, and the encoder encodes the prediction related information generated by the prediction related information generator.

2. The image predictive encoding apparatus according to claim 1, wherein the specified region and the object region have the same shape.

3. The image predictive encoding apparatus according to claim 2, wherein the prediction signal generator generates at least one texture signal having a high correlation to an adjacent region, on the basis of the adjacent region comprising an already reproduced pixel signal adjacent to the object pixel signal, from a first search region which is inside the same frame as the object pixel signal;

generates at least one texture signal having a high correlation to an adjacent region, on the basis of the adjacent region comprising an already reproduced pixel signal adjacent to the object pixel signal, from a second search region which is in a different frame to the first search region; and generates a prediction signal by synthesizing the respectively generated texture signals by using a pre-determined texture synthesis method.

4. The image predictive encoding apparatus according to claim 1, wherein the texture synthesizer divides the object region into a plurality of small regions, generates a template signal of a specified region determined on the basis of the prediction related information from the already reproduced signal, for each of the small regions obtained by dividing, searches a pre-determined reproduced image to find a plurality of similar regions having a high correlation to the specified region, generates a plurality of texture signals relating to the small regions on the basis of the plurality of similar regions, generates prediction signals for the small regions by processing the plurality of texture signals by using a pre-determined texture synthesis method, and generates a prediction signal for the object region by synthesizing the prediction signals of the respective small regions thus generated.

5. The image predictive encoding apparatus according to claim 1, wherein the template signal is included in the plurality of texture signals.

6. The image predictive encoding apparatus according to claim 1, wherein the texture synthesizer generates the prediction signal by applying a weighted averaging process using pre-determined weighting coefficients to the texture signals.

7. The image predictive encoding apparatus according to claim 1, wherein the prediction related information includes a motion vector indicating the amount of spatial displacement of the object region.

8. The image predictive encoding apparatus according to claim 1, wherein the texture synthesizer searches a pre-determined plurality of already reproduced images to find a plurality of similar regions having a high correlation to the specified region.

9. An image predictive decoding apparatus, comprising:

one or more processing units configured to function as:

a data analyzer that extracts encoded data of prediction related information relating to an object region that is a processing object, and encoded data of a residual signal, from compressed data;

a residual signal restorer that restores a reproduction residual signal from the encoded data of the residual signal extracted by the data analyzer;

a prediction signal generator that generates a prediction signal relating to an object pixel signal of the object region; and an image restorer that restores the pixel signal of the object region by adding the prediction signal generated by the prediction signal generator to the reproduction residual signal restored by the residual signal restorer, wherein the prediction signal generator restores prediction related information from the encoded data of the prediction related information extracted by the data analyzer, generates a template signal of a specified region which is determined on the basis of the restored prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method.

10. The image predictive decoding apparatus according to claim 9, wherein the specified region and the object region have the same shape.

11. The image predictive decoding apparatus according to claim 9, wherein the prediction signal generator restores the prediction related information from the encoded data of the prediction related information, divides the object region into a plurality of small regions, generates a template signal of a specified region determined on the basis of the prediction related information from the already reproduced signal, for each of the small regions obtained by dividing, searches a pre-determined reproduced image to find a plurality of similar regions having a high correlation to the specified region, generates a plurality of texture signals relating to the small regions on the basis of the plurality of similar regions, generates prediction signals for the small regions by processing the plurality of texture signals by using a pre-determined texture synthesis method, and generates a prediction signal for the object region by synthesizing the prediction signals of the respective small regions thus generated.

12. The image predictive decoding apparatus according to claim 9, wherein the template signal is included in the plurality of texture signals.

13. The image predictive decoding apparatus according to claim 9, wherein the prediction signal generator generates the prediction signal by applying a weighted averaging process using pre-determined weighting coefficients to the texture signals.

14. The image predictive decoding apparatus according to claim 9, wherein the prediction related information includes a motion vector indicating the amount of spatial displacement of the object region.

15. The image predictive decoding apparatus according to claim 9, wherein the prediction signal generator searches a pre-determined plurality of already reproduced images to find a plurality of similar regions having a high correlation to the specified region.

16. An image predictive encoding method, comprising:
a region dividing step in which an image predictive encoding apparatus divides an input image into a plurality of regions;
a prediction signal generating step in which the image predictive encoding apparatus generates a prediction signal for an object pixel signal of an object region which is a processing object, of the plurality of regions divided in the region dividing step;
a residual signal generating step in which the image predictive encoding apparatus generates a residual signal between the prediction signal generated in the prediction signal generating step and the object pixel signal; and
an encoding step in which the image predictive encoding apparatus encodes the residual signal generated in the residual signal generating step;
wherein the prediction signal generating step comprises:
a prediction related information generating step of generating, as prediction related information, a method for generating a signal having a high correlation with the object pixel signal of the object region from an already reproduced signal; and
a texture synthesis step of generating a prediction signal for the object region on the basis of the prediction related information generated in the prediction related information generating step;
the texture synthesis step generates a template signal of a specified region which is determined on the basis of the prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method; and
the encoding step encodes the prediction related information generated in the prediction related information generating step.

17. An image predictive decoding method, comprising:
a data analysis step in which an image predictive decoding apparatus extracts encoded data of prediction related information relating to an object region that is a processing object, and encoded data of a residual signal, from compressed data;
a residual signal restoring step in which the image predictive decoding apparatus restores a reproduction residual signal from the encoded data of the residual signal extracted in the data analysis step;
a prediction signal generating step in which the image predictive decoding apparatus generates a prediction signal relating to an object pixel signal of the object region; and
an image restoring step in which the image predictive decoding apparatus restores the pixel signal of the object region by adding the prediction signal generated in the prediction signal generating step to the reproduction residual signal restored in the residual signal restoring step;
wherein the prediction signal generating step restores prediction related information from the encoded data of the prediction related information extracted in the data analysis step, generates a template signal of a specified region which is determined on the basis of the restored prediction related information, from the already reproduced signal, searches a pre-determined reproduced image to find a plurality of similar regions having a high correlation to the specified region, generates a plurality of texture signals relating to the object region on the basis of the plurality of similar regions, and generates a prediction signal by processing the plurality of texture signals by using a pre-determined texture synthesis method.

18. A non-transitory computer-readable medium storing an image predictive encoding program, which when executed by a computer, causes the computer to perform a process comprising:
dividing an input image into a plurality of regions;
generating a prediction signal for an object pixel signal of an object region which is a processing object, of the plurality of regions;
generating a residual signal between the prediction signal and the object pixel signal; and
encoding the residual signal, wherein
the generating a prediction signal includes:
generating, as prediction related information, a method for generating a signal having a high correlation with the object pixel signal of the object region from an already reproduced signal; and
generating a prediction signal for the object region on the basis of the prediction related information;
generating a template signal of a specified region which is determined on the basis of the prediction related information, from the already reproduced signal;
searching a pre-determined reproduced image to find a plurality of similar regions having a high correlation to the specified region;
generating a plurality of texture signals relating to the object region on the basis of the plurality of similar regions; and
generating a prediction signal by processing the plurality of texture signals by using a pre-determined texture synthesis method; and
the encoding includes encoding the prediction related information.

19. A non-transitory computer-readable medium storing an image predictive decoding program, which when executed by a computer, causes the computer to perform a process comprising:
extracting encoded data of prediction related information relating to an object region that is a processing object, and encoded data of a residual signal, from compressed data;
restoring a reproduction residual signal from the encoded data of the residual signal;

generating a prediction signal relating to an object pixel signal of the object region; and restoring the pixel signal of the object region by adding the prediction signal to the reproduction residual signal, wherein the generating the prediction signal includes restoring prediction related information from the encoded data of the prediction related information;

generating a template signal of a specified region which is determined on the basis of the restored prediction related information, from the already reproduced signal;

searching a pre-determined reproduced image to find a plurality of similar regions having a high correlation to the specified region;

generating a plurality of texture signals relating to the object region on the basis of the plurality of similar regions; and generating a prediction signal by processing the plurality of texture signals by using a pre-determined texture synthesis method.

20. An image predictive encoding apparatus, comprising:
one or more processing units configured to function as:

a block divider that divides an input image into a plurality of regions;

a prediction signal generator that generates a prediction signal for an object pixel signal of an object region which is a processing object, of the plurality of regions divided by the block divider;

a residual signal generator that generates a residual signal between the prediction signal generated by the prediction signal generator and the object pixel signal; and an encoder that generates compressed data by encoding the residual signal generated by the residual signal generator, wherein the prediction signal generator generates a texture signal on the basis of an adjacent region comprising an already reproduced pixel signal adjacent to the object pixel signal, and generates a prediction signal by processing the generated texture signal by using a pre-determined texture synthesis method.

21. The image predictive encoding apparatus according to claim 20, wherein the prediction signal generator generates a plurality of texture signals having a high correlation to an adjacent region on the basis of the adjacent region comprising an already reproduced pixel signal adjacent to the object pixel signal, and generates a prediction signal by processing the plurality of generated texture signals by using a pre-determined synthesis method.

22. The image predictive encoding apparatus according to claim 21, wherein the prediction signal generator generates a prediction signal by synthesizing the plurality of texture signals relating to the object pixel signal by applying a weighted averaging process using pre-determined weighting coefficients.

23. The image predictive encoding apparatus according to claim 20, wherein the prediction signal generator generates a plurality of texture signals each having a high correlation to one of a plurality of adjacent regions on the basis of the plurality of adjacent regions comprising an already reproduced pixel signal adjacent to the object pixel signal, and generates a prediction signal by processing the plurality of generated texture signals by using a pre-determined synthesis method.

24. The image predictive encoding apparatus according to claim 20, wherein the prediction signal generator also generates an extrapolated texture signal by forming pixels by repeating an already reproduced pixel value which is adjacent to the object pixel signal; and generates a prediction signal by synthesizing the texture signals and the extrapolated texture signal by using a pre-determined synthesis method.

25. The image predictive encoding apparatus according to claim 20, wherein the prediction signal generator searches a search region being a pre-determined reproduced image to find a predicted adjacent region having a high correlation to the adjacent region comprising an already reproduced pixel signal that is adjacent to the object pixel signal, and sets an image region determined on the basis of the predicted adjacent region thus found, as a texture signal.

26. The image predictive encoding apparatus according to claim 20, wherein the encoder encodes related information indicating the texture synthesis method; and comprises a transmitter that transmits an encoded signal encoded by the encoder as well as the encoded related information.

27. An image predictive encoding apparatus, comprising:
one or more processing units configured to function as:

a block divider that divides an input image into a plurality of regions;

a prediction signal generator that generates a prediction signal for an object pixel signal of an object region which is a processing object, of the plurality of regions divided by the block divider;

a residual signal generator that generates a residual signal between the prediction signal generated by the prediction signal generator and the object pixel signal; and an encoder that generates a compressed signal by encoding the residual signal generated by the residual signal generator, wherein the prediction signal generator generates at least one extrapolated texture signal by forming pixels by repeating an already reproduced pixel value which is adjacent to the object pixel signal, and generates a prediction signal by synthesizing the at least one extrapolated texture signal by using a pre-determined synthesis method.

28. An image predictive decoding apparatus, comprising:
one or more processing units configured to function as:

a residual signal restorer that restores a reproduction residual signal by extracting a residual signal relating to an object region that is an object of processing, from compressed data;

a prediction signal generator that generates a prediction signal relating to an object pixel signal of the object region; and an image restorer that restores the pixel signal of the object region by adding the prediction signal generated by the prediction signal generator to the reproduction residual signal restored by the residual signal restorer, wherein the prediction signal generator generates a texture signal on the basis of an adjacent region comprising an already reproduced pixel signal adjacent to the object pixel signal, and generates a prediction signal by processing the generated texture signal by using a pre-determined texture synthesis method.

29. The image predictive decoding apparatus according to claim 28, wherein the prediction signal generator generates a plurality of texture signals having a high correlation to an adjacent region on the basis of the adjacent region comprising an already reproduced pixel signal adjacent to the object pixel signal, and generates a prediction signal by processing the plurality of generated texture signals by using a pre-determined synthesis method.

30. The image predictive decoding apparatus according to claim 29, wherein the prediction signal generator generates a prediction signal by synthesizing the plurality of texture signals relating to the object pixel signal by applying a weighted averaging process using pre-determined weighting coefficients.

31. The image predictive decoding apparatus according to claim 29,
wherein the prediction signal generator generates at least one texture signal having a high correlation to an adjacent region, on the basis of the adjacent region comprising an already reproduced pixel signal adjacent to the object pixel signal, from a first search region which is inside the same frame as the object pixel signal;
generates at least one texture signal having a high correlation to an adjacent region, on the basis of the adjacent region comprising an already reproduced pixel signal adjacent to the object pixel signal, from a second search region which is in a different frame to the first search region; and
generates a prediction signal by synthesizing the respectively generated texture signals.

32. The image predictive decoding apparatus according to claim 28, wherein the prediction signal generator generates a plurality of texture signals each having a high correlation to one of a plurality of adjacent regions on the basis of the plurality of adjacent regions comprising an already reproduced pixel signal adjacent to the object pixel signal, and generates a prediction signal by processing the plurality of generated texture signals by using a pre-determined synthesis method.

33. The image predictive decoding apparatus according to claim 28,
wherein the prediction signal generator also generates an extrapolated texture signal by forming pixels by repeating an already reproduced pixel value which is adjacent to the object pixel signal; and
generates a prediction signal by synthesizing the texture signals and the extrapolated texture signal by using a pre-determined synthesis method.

34. The image predictive decoding apparatus according to claim 28, wherein the prediction signal generator searches a search region being a pre-determined reproduced image to find a predicted adjacent region having a high correlation to the adjacent region comprising an already reproduced pixel signal that is adjacent to the object pixel signal, and sets an image region determined on the basis of the predicted adjacent region thus found, as a texture signal.

35. The image predictive decoding apparatus according to claim 28,
wherein the compressed data includes related information indicating the texture synthesis method; and
the prediction signal generator forms a texture signal for the object region by using the related information.

36. An image predictive decoding apparatus, comprising:
one or more processing units configured to function as:
a residual signal restorer that restores a reproduction residual signal by extracting a residual signal relating to an object region, from compressed data;
a prediction signal generator that generates a prediction signal relating to an object pixel signal of the object region; and
an image restorer that restores a pixel signal of the object region by adding the prediction signal to the reproduction residual signal, wherein
the prediction signal generator generates at least one extrapolated texture signal by forming pixels by repeating an already reproduced pixel value which is adjacent to the object pixel signal, and generates a prediction signal by synthesizing the at least one extrapolated texture signal by using a pre-determined synthesis method.

37. An image predictive encoding method, comprising:
a region dividing step of dividing an input image into a plurality of regions;
a prediction signal generating step of generating a prediction signal for an object pixel signal of an object region which is a processing object, of the plurality of regions divided in the region dividing step;
a residual signal generating step of generating a residual signal between the prediction signal generated in the prediction signal generating step and the object pixel signal; and
an encoding step of generating compressed data by encoding the residual signal generated in the residual signal generating step;
wherein the prediction signal generating step generates a texture signal on the basis of an adjacent region comprising an already reproduced pixel signal adjacent to the object pixel signal, and generates a prediction signal by processing the generated texture signal by using a pre-determined texture synthesis method.

38. An image predictive encoding method, comprising:
a region dividing step of dividing an input image into a plurality of regions;
a prediction signal generating step of generating a prediction signal for an object pixel signal of an object region which is a processing object, of the plurality of regions divided in the region dividing step;
a residual signal generating step of generating a residual signal between the prediction signal generated in the prediction signal generating step and the object pixel signal; and
an encoding step of generating a compressed signal by encoding the residual signal generated in the residual signal generating step;
wherein the prediction signal generating step:
generates an extrapolated texture signal by forming pixels by repeating an already reproduced pixel value which is adjacent to the object pixel signal; and
generates a prediction signal by synthesizing the extrapolated texture signal by using a pre-determined synthesis method.

39. An image predictive decoding method, comprising:
a residual signal restoring step of restoring a reproduction residual signal by extracting a residual signal relating to an object region that is an object of processing, from compressed data;
a prediction signal generating step of generating a prediction signal relating to an object pixel signal of the object region; and
an image restoring step of restoring the pixel signal of the object region by adding the prediction signal generated in the prediction signal generating step to the reproduction residual signal restored in the residual signal restoring step;

wherein the prediction signal generating step generates a texture signal on the basis of an adjacent region comprising an already reproduced pixel signal adjacent to the object pixel signal, and generates a prediction signal by processing the generated texture signal by using a pre-determined synthesis method.

40. An image predictive decoding method, comprising:
a residual signal restoring step of restoring a reproduction residual signal by extracting a residual signal relating to an object region, from compressed data;
a prediction signal generating step of generating a prediction signal relating to an object pixel signal of the object region; and
an image restoring step of restoring a pixel signal of the object region by adding the prediction signal to the reproduction residual signal;
wherein the prediction signal generating step:
generates an extrapolated texture signal by forming pixels by repeating an already reproduced pixel value which is adjacent to the object pixel signal; and
generates a prediction signal by synthesizing the extrapolated texture signal by using a pre-determined synthesis method.

41. A non-transitory computer-readable medium storing an image predictive encoding program, comprising:
a region dividing module for dividing an input image into a plurality of regions;
a prediction signal generating module for generating a prediction signal for an object pixel signal of an object region which is a processing object, of the plurality of regions divided by the region dividing module;
a residual signal generating module for generating a residual signal between the prediction signal generated by the prediction signal generating module and the object pixel signal; and
an encoding module for generating compressed data by encoding the residual signal generated by the residual signal generating module;
wherein the prediction signal generating module generates a texture signal on the basis of an adjacent region comprising an already reproduced pixel signal adjacent to the object pixel signal, and generates a prediction signal by processing the generated texture signal by using a pre-determined texture synthesis method.

42. A non-transitory computer-readable medium storing an image predictive encoding program, comprising:
a region dividing module for dividing an input image into a plurality of regions;
a prediction signal generating module for generating a prediction signal for an object pixel signal of an object region which is a processing object, of the plurality of regions divided by the region dividing module;
a residual signal generating module for generating a residual signal between the prediction signal generated by the prediction signal generating module and the object pixel signal; and
an encoding module for generating a compressed signal by encoding the residual signal generated by the residual signal generating module;
wherein the prediction signal generating module:
generates an extrapolated texture signal by forming pixels by repeating an already reproduced pixel value which is adjacent to the object pixel signal; and
generates a prediction signal by synthesizing the extrapolated texture signal by using a pre-determined synthesis method.

43. A non-transitory computer-readable medium storing an image predictive decoding program, comprising:
a residual signal restoring module for restoring a reproduction residual signal by extracting a residual signal relating to an object region that is an object of processing, from compressed data;
a prediction signal generating module for generating a prediction signal relating to an object pixel signal of the object region; and
an image restoring module for restoring the pixel signal of the object region by adding the prediction signal generated by the prediction signal generating module to the reproduction residual signal restored by the residual signal restoring module;
wherein the prediction signal generating module generates a texture signal on the basis of an adjacent region comprising an already reproduced pixel signal adjacent to the object pixel signal, and generates a prediction signal by processing the generated texture signal by using a pre-determined synthesis method.

44. A non-transitory computer-readable medium storing an image predictive decoding program, comprising:
a residual signal restoring module for restoring a reproduction residual signal by extracting a residual signal relating to an object region, from compressed data;
a prediction signal generating module for generating a prediction signal relating to an object pixel signal of the object region; and
an image restoring module for restoring a pixel signal of the object region by adding the prediction signal to the reproduction residual signal;
wherein the prediction signal generating module:
generates an extrapolated texture signal by forming pixels by repeating an already reproduced pixel value which is adjacent to the object pixel signal; and
generates a prediction signal by synthesizing the extrapolated texture signal by using a pre-determined synthesis method.

* * * * *